(12) United States Patent
Tamura et al.

(10) Patent No.: US 10,620,510 B2
(45) Date of Patent: Apr. 14, 2020

(54) ACCESSORY, IMAGE PICKUP APPARATUS ON WHICH SAME IS MOUNTABLE, AND CAMERA SYSTEM

(71) Applicant: CANON KABUSHIKI KAISHA, Tokyo (JP)

(72) Inventors: Masahisa Tamura, Utsunomiya (JP); Kunihiko Sasaki, Utsunomiya (JP); Toshinori Yamazaki, Tokyo (JP); Masayasu Shigematsu, Nishitokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/992,785

(22) Filed: May 30, 2018

(65) Prior Publication Data

US 2018/0348610 A1  Dec. 6, 2018

(30) Foreign Application Priority Data

May 31, 2017  (JP) .................. 2017-108262

(51) Int. Cl.

| | |
|---|---|
| *G03B 17/56* | (2006.01) |
| *G02B 27/64* | (2006.01) |
| *G03B 17/04* | (2006.01) |
| *G03B 17/14* | (2006.01) |
| *H01R 13/24* | (2006.01) |
| *H04N 5/225* | (2006.01) |

(52) U.S. Cl.
CPC ......... *G03B 17/565* (2013.01); *G02B 27/648* (2013.01); *G03B 17/04* (2013.01); *G03B 17/14* (2013.01); *G03B 17/56* (2013.01); *G03B 17/566* (2013.01); *H01R 13/2471* (2013.01); *H04N 5/2254* (2013.01)

(58) Field of Classification Search
USPC .................................. 396/531, 532
See application file for complete search history.

(56) References Cited

U.S. PATENT DOCUMENTS

| | | |
|---|---|---|
| 3,758,198 A | 9/1973 | Kanie |
| 4,437,752 A | 3/1984 | Akashi |

(Continued)

FOREIGN PATENT DOCUMENTS

| | | |
|---|---|---|
| CN | 1761910 A | 4/2006 |
| CN | 1764869 A | 4/2006 |

(Continued)

*Primary Examiner* — Clayton E. LaBalle
*Assistant Examiner* — Warren K Fenwick
(74) *Attorney, Agent, or Firm* — Canon U.S.A., Inc. IP Division

(57) ABSTRACT

An accessory configured to be detachably mountable to an image pickup apparatus including a first mount portion including first bayonet claw portions, and first terminals, the accessory including a second mount portion including second bayonet claw portions configured to enable engagement with the first bayonet claw portions, and second terminals configured to enable contact with the first terminals, in which the second terminals are provided at positions that are different from positions of the second bayonet claw portions, and wherein, a half line that extends from a central axis of the second mount portion and passes through a second terminal that determines whether an optical apparatus is mounted on the image pickup apparatus or not, passes through a predetermined second bayonet claw portion.

23 Claims, 27 Drawing Sheets

(56) References Cited

U.S. PATENT DOCUMENTS

| | | |
|---|---|---|
| 4,448,509 A | 5/1984 | Katsuma |
| 4,464,034 A | 8/1984 | Tomino |
| 4,565,434 A | 1/1986 | Notagashira |
| 4,659,203 A | 4/1987 | Niwa |
| 4,766,453 A | 8/1988 | Shiokama |
| 4,853,725 A | 8/1989 | Matsuda |
| 4,922,283 A | 5/1990 | Fukui |
| 4,924,249 A | 5/1990 | Aihara |
| 4,970,558 A | 11/1990 | Matsuda |
| 4,994,829 A | 2/1991 | Tsukamoto |
| 4,999,659 A | 3/1991 | Fukahori |
| 5,021,812 A * | 6/1991 | Kohno ............... G03B 17/14 396/532 |
| 5,041,858 A * | 8/1991 | Yamamichi ............ G03B 17/14 396/532 |
| 5,079,578 A | 1/1992 | Kohno |
| 5,185,622 A | 2/1993 | Yoshibe |
| 5,359,379 A | 10/1994 | Kohno |
| 5,404,190 A | 4/1995 | Kohno |
| 5,734,935 A | 3/1998 | Imanari |
| 5,778,271 A | 7/1998 | Kawasaki |
| 5,889,555 A | 3/1999 | Kawase |
| 6,089,761 A | 7/2000 | Sakurai |
| 6,351,612 B1 | 2/2002 | Misawa |
| 7,519,291 B2 | 4/2009 | Tokiwa |
| 7,567,290 B2 | 7/2009 | Tokiwa |
| 7,599,617 B2 | 10/2009 | Tokiwa |
| 7,988,372 B2 | 8/2011 | Lee et al. |
| 8,430,582 B2 | 4/2013 | Hasuda |
| 8,573,868 B2 | 11/2013 | Hasuda |
| 8,714,844 B2 | 5/2014 | Oikawa et al. |
| 8,770,868 B1 | 7/2014 | Hasuda |
| 9,164,360 B2 | 10/2015 | Hasuda |
| 9,467,612 B2 | 10/2016 | Irie |
| 9,638,987 B2 | 5/2017 | Nishio |
| 9,684,229 B2 | 6/2017 | Nishio |
| 2004/0202464 A1 | 10/2004 | Miyasaka |
| 2005/0025472 A1 | 2/2005 | Sugita |
| 2006/0155401 A1 | 7/2006 | Matsuzaki |
| 2006/0165401 A1 | 7/2006 | Doi |
| 2006/0216023 A1 | 9/2006 | Tokiwa |
| 2007/0047953 A1 | 3/2007 | Kawai |
| 2007/0077063 A1 | 4/2007 | Tokiwa |
| 2008/0002968 A1 | 1/2008 | Arai |
| 2009/0269049 A1 | 10/2009 | Ueda |
| 2010/0091175 A1 | 4/2010 | Shintani |
| 2011/0052185 A1 | 3/2011 | Urakami |
| 2012/0057860 A1 | 3/2012 | Hasuda |
| 2012/0063020 A1 | 3/2012 | Imafuji |
| 2012/0114319 A1 | 5/2012 | Kishida |
| 2012/0195587 A1 | 8/2012 | Hasuda |
| 2012/0201532 A1 | 8/2012 | Hasuda et al. |
| 2012/0229923 A1 | 9/2012 | Koyama |
| 2013/0077954 A1 | 3/2013 | Oikawa |
| 2013/0077957 A1 | 3/2013 | Oikawa |
| 2013/0266303 A1 | 10/2013 | Nishio |
| 2013/0266304 A1 | 10/2013 | Nishio |
| 2013/0287388 A1 * | 10/2013 | Nishio ............... G03B 17/14 396/532 |
| 2015/0104164 A1 | 4/2015 | Yasuda |
| 2015/0378244 A1 | 12/2015 | Hasuda |
| 2016/0041453 A1 | 2/2016 | Pizzo |
| 2016/0085138 A1 | 3/2016 | Awazu |
| 2016/0105593 A1 | 4/2016 | Amino |
| 2017/0075200 A1 | 3/2017 | Nishio |
| 2018/0203213 A1 | 7/2018 | Ueki |
| 2018/0348597 A1 * | 12/2018 | Tamura ............... G03B 17/04 |
| 2018/0348610 A1 | 12/2018 | Tamura |
| 2018/0348611 A1 | 12/2018 | Yamazaki |
| 2019/0129123 A1 | 5/2019 | Funaoka |
| 2019/0129127 A1 | 5/2019 | Goto |
| 2019/0212634 A1 | 7/2019 | Kondo |
| 2019/0222730 A1 | 7/2019 | Kondo |

FOREIGN PATENT DOCUMENTS

| | | |
|---|---|---|
| CN | 102385140 A | 3/2012 |
| CN | 103064234 A | 4/2013 |
| CN | 203773216 U | 8/2014 |
| CN | 103389611 B | 10/2016 |
| EP | 0363968 A2 | 4/1990 |
| EP | 0372459 A2 | 6/1990 |
| EP | 0788021 A1 | 8/1997 |
| EP | 2648043 A2 | 10/2013 |
| EP | 2725418 A1 | 4/2014 |
| JP | S32-015569 Y | 12/1957 |
| JP | 58-095721 A | 6/1983 |
| JP | S63-172257 A | 7/1988 |
| JP | 63-280229 A | 11/1988 |
| JP | H03-042647 A | 2/1991 |
| JP | 03-039768 Y2 | 8/1991 |
| JP | 3039768 Y2 | 8/1991 |
| JP | 06-047943 U | 6/1994 |
| JP | 0647943 U | 6/1994 |
| JP | 2864384 B2 | 3/1999 |
| JP | 2000047308 A | 2/2000 |
| JP | 2004-341265 A | 12/2004 |
| JP | 2005-70712 A | 3/2005 |
| JP | 2008-15016 A | 1/2008 |
| JP | 2008-15267 A | 1/2008 |
| JP | 2008197372 A | 8/2008 |
| JP | 2010-049174 A | 3/2010 |
| JP | 2010-271418 A | 12/2010 |
| JP | 2011-175191 A | 9/2011 |
| JP | 2012058708 A | 3/2012 |
| JP | 2013-008059 A | 1/2013 |
| JP | 2014-13331 A | 1/2014 |
| JP | 2014-21348 A | 2/2014 |
| JP | 2015035002 A | 2/2015 |
| JP | 2016-130748 A | 7/2016 |
| TW | I495947 B | 8/2015 |
| TW | 201606414 A | 2/2016 |
| WO | 2014/143162 A1 | 9/2014 |
| WO | 2017038272 A1 | 3/2017 |

\* cited by examiner

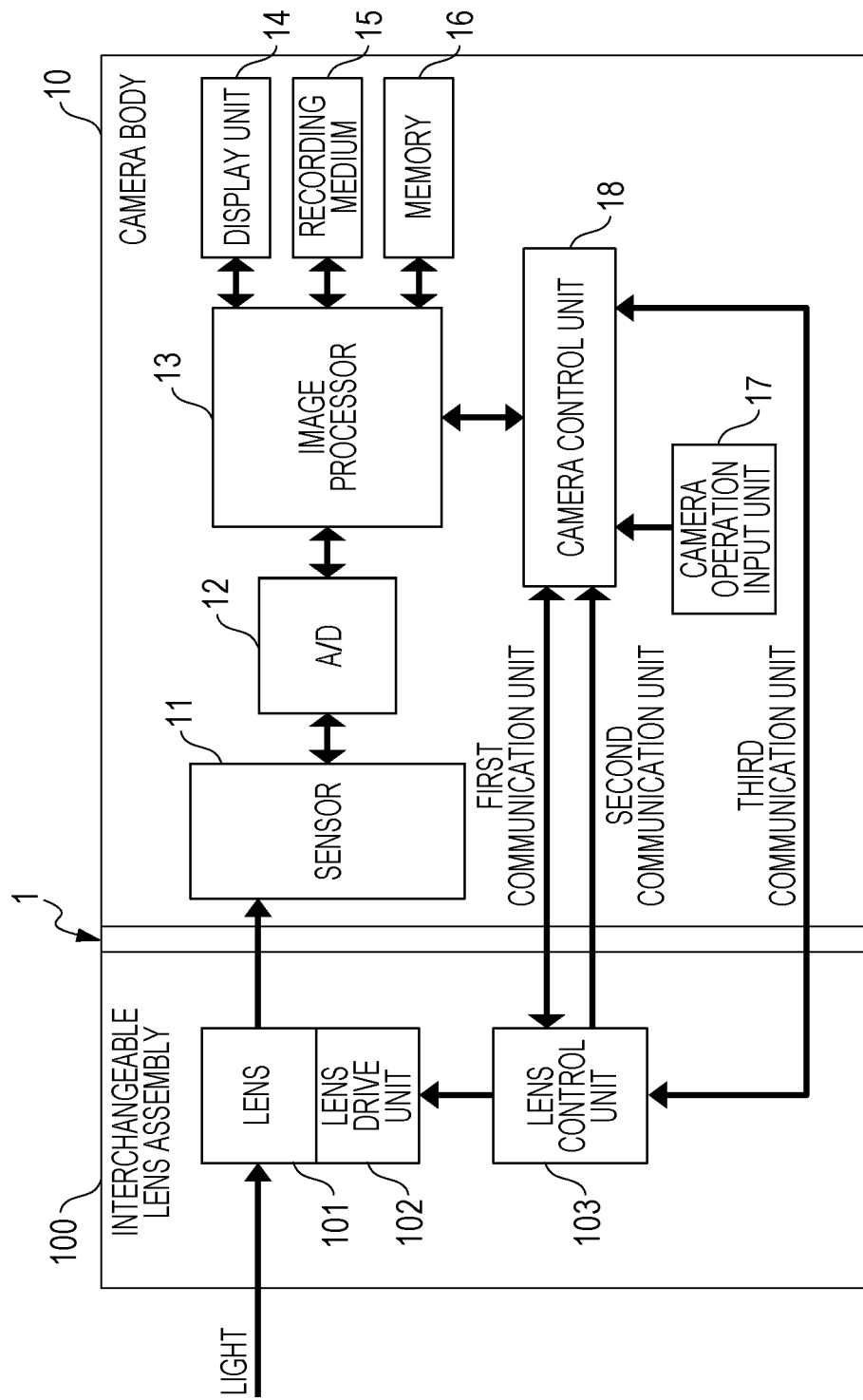

ACCESSORY, IMAGE PICKUP APPARATUS ON WHICH SAME IS MOUNTABLE, AND CAMERA SYSTEM

BACKGROUND OF THE INVENTION

Field of the Invention

The present disclosure relates to an accessory, an image pickup apparatus on which the accessory is mountable, and a camera system.

Description of the Related Art

A camera and a camera accessory is described in U.S. Pat. No. 9,684,229, in which the camera includes a plurality of terminal pins. The document also discloses a camera accessory, such as an interchangeable lens assembly (an interchangeable lens) mountable with respect to the camera, that includes a plurality of terminal surfaces that come in contact with the plurality of terminal pins to communicate with the camera.

The interchangeable lens assembly described in U.S. Pat. No. 9,684,229 includes a plurality of bayonet claw portions capable of being connected to a plurality of bayonet claw portions provided on a camera side. In U.S. Pat. No. 9,684,229, when the interchangeable lens assembly is mounted on the camera, a terminal surface on the interchangeable lens assembly side that comes in contact with a terminal pin, (among the plurality of terminal pins on the camera side that determines the type of interchangeable lens assembly) is positioned within an angle range in which a predetermined bayonet claw portion on the interchangeable lens assembly side is provided. By including such a configuration, the interchangeable lens assembly described in U.S. Pat. No. 9,684,229 is capable of determining, in a more stable manner, the type of interchangeable lens assembly mounted on the camera.

We will now discuss a case wherein, other than the terminal pin described above (that determines the type of interchangeable lens assembly mounted on the camera), a terminal pin (MIF terminal, that determines whether the interchangeable lens assembly has been mounted on the camera), is provided in the plurality of terminal pins on the camera side. When a terminal pin equivalent to a camera-side MIF terminal comes into contact with a terminal surface equivalent to an MIF terminal on the interchangeable lens assembly side, and when mounting of the interchangeable lens assembly on the camera is detected, supply of power from the camera to the interchangeable lens assembly is started and communication between the camera and the interchangeable lens assembly is started. Accordingly, it is desirable that in a state in which the interchangeable lens assembly is mounted on the camera, the terminal pin equivalent to the camera-side MIF terminal be in contact with the terminal surface equivalent to the MIF terminal on the interchangeable lens assembly side in a more stable manner. However, U.S. Pat. No. 9,684,229 does not disclose a configuration having the terminal pin equivalent to the camera-side MIF terminal come into contact with the terminal surface equivalent to the MIF terminals on the interchangeable lens assembly side in a more stable manner.

SUMMARY OF THE INVENTION

Accordingly, the present disclosure provides an accessory in which a terminal on the image pickup apparatus side that determines whether the accessory has been mounted on the image pickup apparatus is capable of coming in contact with a terminal on the accessory side in a more stable manner, an image pickup apparatus on which the accessory can be mounted, and a camera system.

An accessory of the present disclosure is an accessory configured to be detachably mountable to an image pickup apparatus including a first mount portion including a plurality of first bayonet claw portions, and a plurality of first terminals, the accessory including a second mount portion including a plurality of second bayonet claw portions configured to enable engagement with the plurality of first bayonet claw portions, and a plurality of second terminals configured to enable contact with the plurality of first terminals, wherein the plurality of second terminals are provided at positions that are different from positions of the plurality of second bayonet claw portions, and when viewed in a central axis direction of the second mount portion, a half line that extends from a central axis of the second mount portion and passes through a second terminal, among the plurality of second terminals, that determines whether the accessory is mounted on the image pickup apparatus or not, passes through a predetermined second bayonet claw portion among the plurality of second bayonet claw portions.

Further features of the present invention will become apparent from the following description of exemplary embodiments with reference to the attached drawings. Each of the embodiments of the present invention described below can be implemented solely or as a combination of a plurality of the embodiments. Also, features from different embodiments can be combined where necessary or where the combination of elements or features from individual embodiments in a single embodiment is beneficial.

BRIEF DESCRIPTION OF THE DRAWINGS

FIG. 1A is a block diagram of a camera and an interchangeable lens assembly according to an exemplary embodiment.

DESCRIPTION OF THE EMBODIMENTS

Configuration of Camera System

Figure 1B:
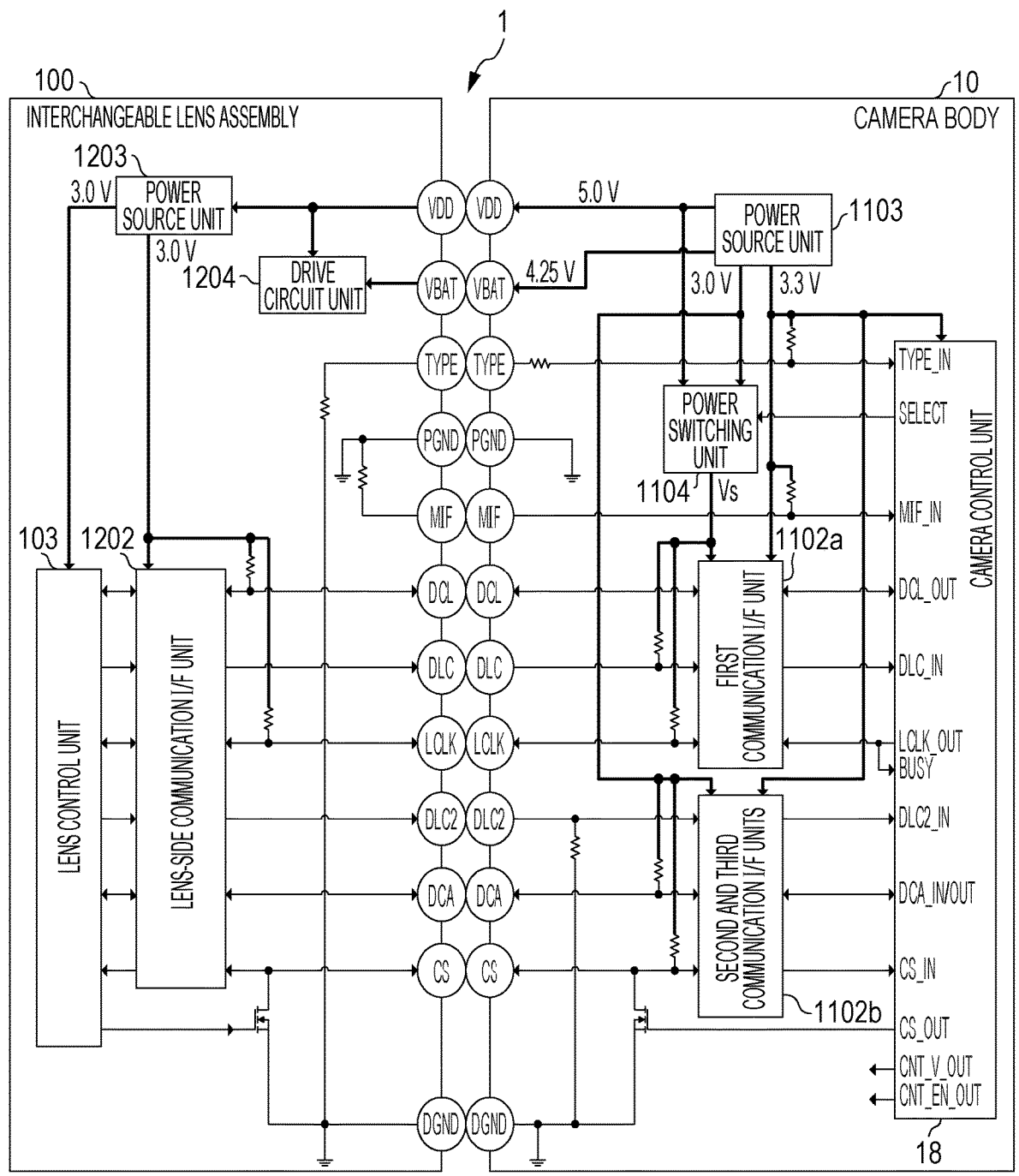
FIG. 1B is a block diagram of terminals of the camera and the interchangeable lens assembly according to the exemplary embodiment.

Referring first to FIG. 1A, a camera system that is an exemplary embodiment of the present disclosure will be described. As illustrated in FIG. 1A, the camera system according to the present exemplary embodiment includes an interchangeable lens assembly (an optical apparatus, an accessory, a lens apparatus) 100 that is a camera accessory, and a camera body (an image pickup apparatus) 10 on which the interchangeable lens assembly 100 is detachably mounted. In other words, the interchangeable lens assembly 100 can be mounted and dismounted from the camera body 10.

Configuration of Interchangeable Lens Assembly 100

The interchangeable lens assembly 100 includes a lens 101, and a lens drive unit 102 including an actuator that moves and operates optical members, such as a lens unit and an aperture (both not shown), included in the lens 101. Furthermore, the interchangeable lens assembly 100 includes a lens control unit 103 including a microcomputer that controls communication between a camera control unit 18 through a mount 1 and that controls the lens drive unit 102. Note that the lens 101 may include only a single lens unit or may include a plurality of lens unit. The same applies to the aperture.

Herein, the lens unit is a term denoting a single lens element, a single cemented lens, or a collective plurality of lenses, in which an interval with an adjacent lens unit changes when zooming or focusing. Furthermore, the lens 101 includes a zooming lens unit that is a lens unit that moves in an optical axis direction to perform zooming, and a focusing lens unit that moves in the optical axis direction to perform focusing. The lens 101 further includes a shift lens unit that moves in directions different from the optical axis direction to perform camera shake correction. Note that the lens 101 does not have to include the zooming lens unit and the shift lens unit.

Configuration of Camera Body 10

The camera body 10 includes an image sensor (an image pickup element) 11 that is a charge-storage type solid-state image pickup element that outputs an electric signal after photoelectrically converting an image of a subject, which is an optical image formed by the lens 101 in the interchangeable lens assembly 100. The camera body 10 further includes an A/D conversion unit 12 that converts an analog electrical signal output from the image sensor 11 into a digital signal, and an image processor 13 that generates an image signal by performing various types of image processing on the digital signal converted by the A/D conversion unit 12.

The image signal (a still image or a moving image) generated with the image processor 13 is displayed on a display unit 14 or is recorded in a recording medium 15. Furthermore, the camera body 10 includes a memory 16 that functions as a buffer when processing is performed on the image signal. The memory 16 stores an operation program used by the camera control unit 18 described later. The camera body 10 further includes a camera operation input unit 17 including a power switch that turns the power source on and off, a photographing switch that starts recording of an image signal, and a selecting/setting switch to perform setting of various menus.

The camera body 10 further includes the camera control unit 18 that includes a microcomputer. The camera control unit 18 performs various settings based on signals input from the camera operation input unit 17, and controls the communication between the lens control unit 103 included in the interchangeable lens assembly 100 through the mount 1.

Configuration of Electrical Connection Between Camera Body 10 and Interchangeable Lens Assembly 100

Referring next to FIG. 1B, a configuration of the electrical connection between the camera body 10 and the interchangeable lens assembly 100 will be described. FIG. 1B illustrates an electric circuit configuration when the camera body 10 and the interchangeable lens assembly 100 are connected to each other through the mount 1, terminals (electrical contacts) provided in the mount 1 to electrically connect the camera body 10 and the interchangeable lens assembly 100 to each other, and a state in which the terminals are connected to each other.

The mount 1 in the camera system includes a mount portion (a first mount portion) A on the camera body 10 side and a mount portion (a second mount portion) B on the interchangeable lens assembly 100 side. The mount portion A and the mount portion B include a plurality of terminals (contact points or electrical contacts) that are capable of being electrically connected to the counterparts. More specifically, the mount 1 includes VDD terminals and VBAT terminals that supply power to the interchangeable lens assembly 100 from the camera body 10, DGND terminals and PGND terminals that are ground terminals. The mount 1 further includes LCLK terminals, DCL terminals, DLC terminals, DLC2 terminals, CS terminals, and DCA terminals that are communication terminals for the camera control unit 18 and the lens control unit 103 to communicate with each other. As other terminals, the mount 1 further includes MIF terminals that detect that the interchangeable lens assembly 100 has been mounted on the camera body 10, and TYPE terminals that distinguish the type of camera accessory that has been mounted on the camera body 10. Hereinafter, a more detailed description of the terminals will be given.

Power Terminals

The VDD terminals are terminals that supply communication control power (VDD), which is communication power used mainly to control communication, to the interchangeable lens assembly 100 from the camera body 10. In the present exemplary embodiment, the communication control power is 5.0 V. The VBAT terminals are terminals that supply driving power (VBAT), which is driving power used in operations other than the above communication control, such as operations of mechanical drive systems and the like mainly including a motor and the like, to the interchangeable lens assembly 100 from the camera body 10. In the present exemplary embodiment, the driving power is 4.25 V.

Ground Terminals

The DGND terminals are terminals that connect the camera body 10 and the communication control system of the interchangeable lens assembly 100 to the ground. In other words, the DGND terminals are ground (GND) terminals corresponding to the VDD power source described above. Grounding herein is setting to a level that is the same as the level of the negative electrode-side of the power source such as a battery. The PGND terminals are terminals that connect the camera body 10 and the mechanical drive system, such as a motor, provided in the interchangeable lens assembly 100 to the ground. In other words, the PGND terminals are grounding (GND) terminals that correspond to the VBAT power source described above.

Communication Terminals

The communication terminals include a terminal unit (the LCLK, DCL, and DLC terminals) that is a first communication unit that performs the first communication, and terminals (the DLC2 terminals) that are a second communication unit that performs the second communication independent of the first communication. The communication terminals further include a terminal unit (the CS, and DCA terminals) that is a third communication unit that performs the third communication independent of the first and second communications. The camera control unit 18 and the lens control unit 103 are capable of performing the first, second, and third communications that are independent of each other through the above communication terminals.

The LCLK terminals are terminals for communication clock signals output from the camera body 10 to the interchangeable lens assembly 100, and are also terminals in which the camera body 10 monitors a busy state of the interchangeable lens assembly 100. The DCL terminals are terminals for two-way communication data between the camera body 10 and the interchangeable lens assembly 100, and are CMOS interfaces. The DLC terminals are terminals for communication data that is output from the interchangeable lens assembly 100 to the camera body 10, and are CMOS interfaces.

The DLC2 terminals are terminals for communication data that is output from the interchangeable lens assembly 100 to the camera body 10, and are CMOS interfaces. The DCA terminals are terminals for two-way communication data between the camera body 10 and the interchangeable lens assembly 100, and are CMOS interfaces. The CS terminals are terminals for a communication request signal between the camera body 10 and the interchangeable lens assembly 100, and are open interfaces.

Other Terminals

MIF terminals are terminals for detecting whether the interchangeable lens assembly 100 has been mounted on the camera body 10, and whether the interchangeable lens assembly 100 has been dismounted from the camera body 10. After detecting that the interchangeable lens assembly 100 has been mounted on the camera body 10 by detecting the change in the voltage level of the MIF terminals, the camera control unit 18 starts supplying power to the VDD terminals and the VBAT terminals, and starts communication. In other words, the MIF terminals are triggers that start the supply of power from the camera body 10 to the interchangeable lens assembly 100.

As described above, the TYPE terminals are terminals that distinguish the type of camera accessory mounted on the camera body 10. The camera control unit 18 detects the voltages of the signals of the TYPE terminals, and based on the value of the voltages, distinguishes the type of camera accessory mounted on the camera body 10. The interchangeable lens assembly 100 is pull-down connected to the DGND terminals at a predetermined resistance value described later. In the present exemplary embodiment, in a case in which the interchangeable lens assembly 100 is mounted on the camera body 10, communication is performed while the interface voltages of the first communication unit, the second communication unit, and the third communication unit are set to 3.0 V.

Configuration of Mechanical Connection Between Camera Body 10 and Interchangeable Lens Assembly 100

Figure 2A:
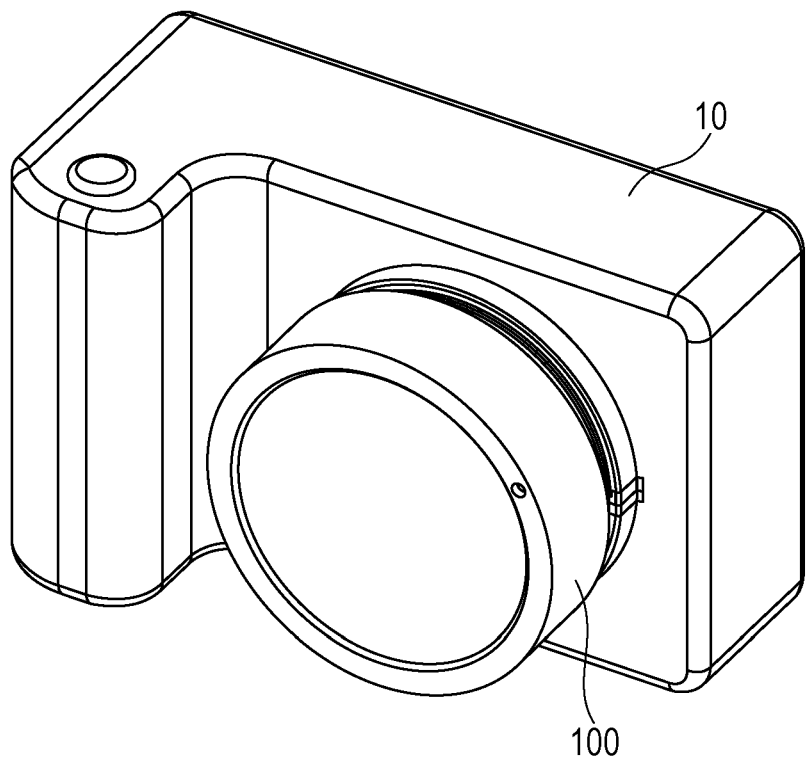
FIG. 2A is an overall schematic view of the camera and the interchangeable lens assembly according to the exemplary embodiment.
Figure 2B:
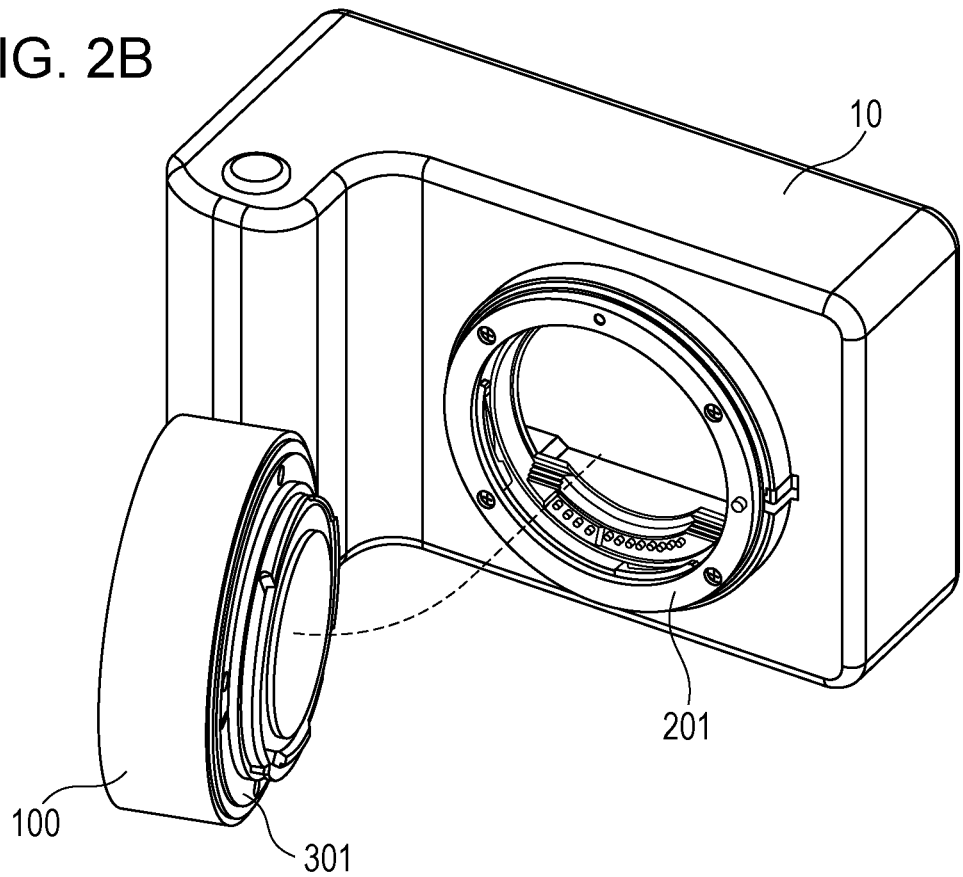
FIG. 2B is an overall schematic view illustrating a state in which the interchangeable lens assembly according to the exemplary embodiment has been dismounted from the camera.

FIGS. 2A and 2B are perspective views of external appearances of the camera body 10 and the interchangeable lens assembly 100. FIG. 2A illustrates a state in which the interchangeable lens assembly 100 is mounted on the camera body 10. FIG. 2B illustrates a state in which the interchangeable lens assembly 100 has been dismounted from the camera body 10. The camera body 10 and the interchangeable lens assembly 100 are connected to each other by moving the interchangeable lens assembly 100 in the unlocking position to the locking position while reference surfaces of a camera mount 201 and a lens mount 301 are in contact with each other. Note that herein, the camera mount 201 is a mount portion (a first mount portion) on an image pickup apparatus side, and the lens mount 301 is a mount portion (a second mount portion) on an optical apparatus side. Note that in the following description, a second conversion adapter 70 has a camera mount 1201 same as the camera mount 201 of the camera body 10. And, note that in the following description, a first conversion adapter 40 has a lens mount 1301 same as the lens mount 301 of the first lens 100. And note that the camera mount 201 and the lens mount 301 have the ring-shaped, but this is not restrictive in the present embodiments. For example, a configuration may be employed where this is realized by each of the camera mount 201 and lens mount 301 have an arc-shaped contact faces, may be employed in the configuration. In other words, a configuration may be employed where this is realized by the camera mount 201 and the lens mount 301 are lacked a part of the contact face.

Figure 3A:
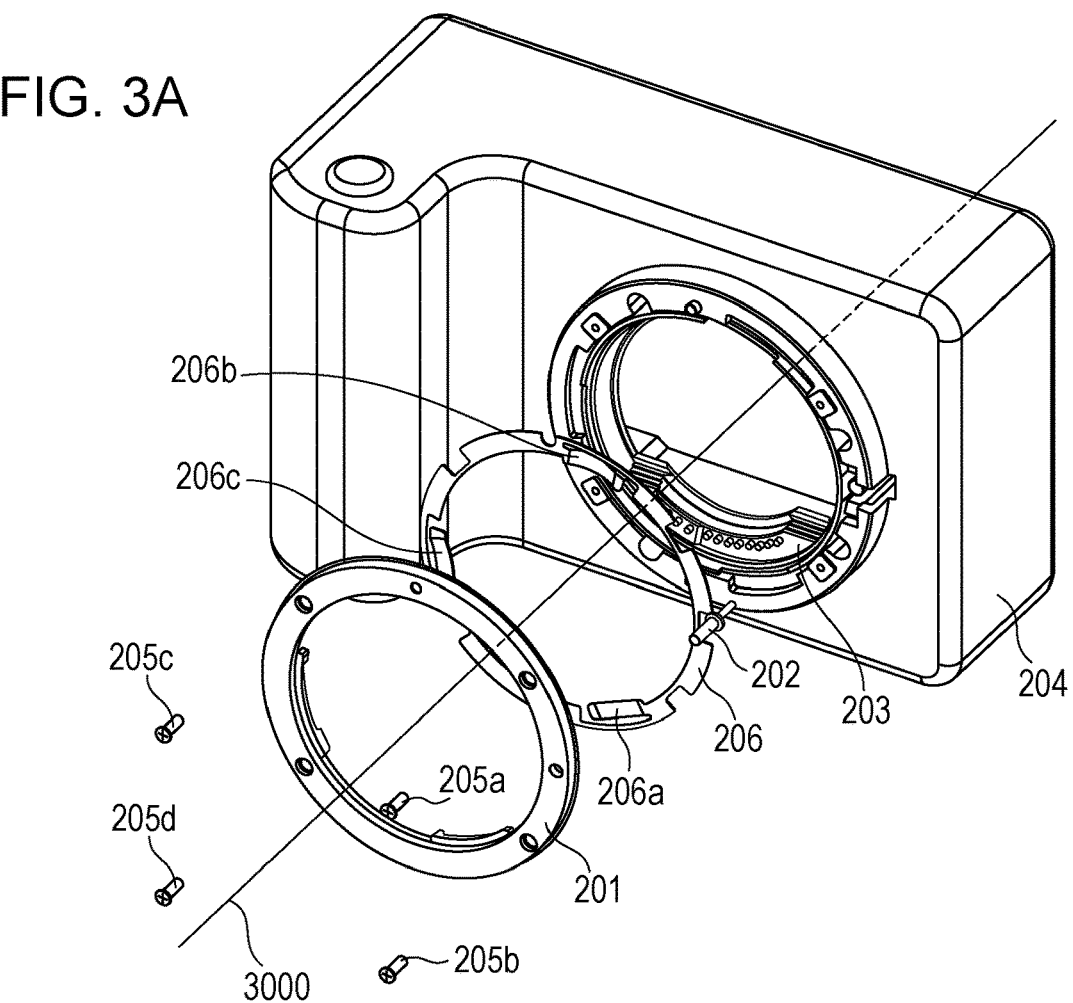
FIG. 3A is an exploded perspective view of the camera according to the present exemplary embodiment.
Figure 3B:
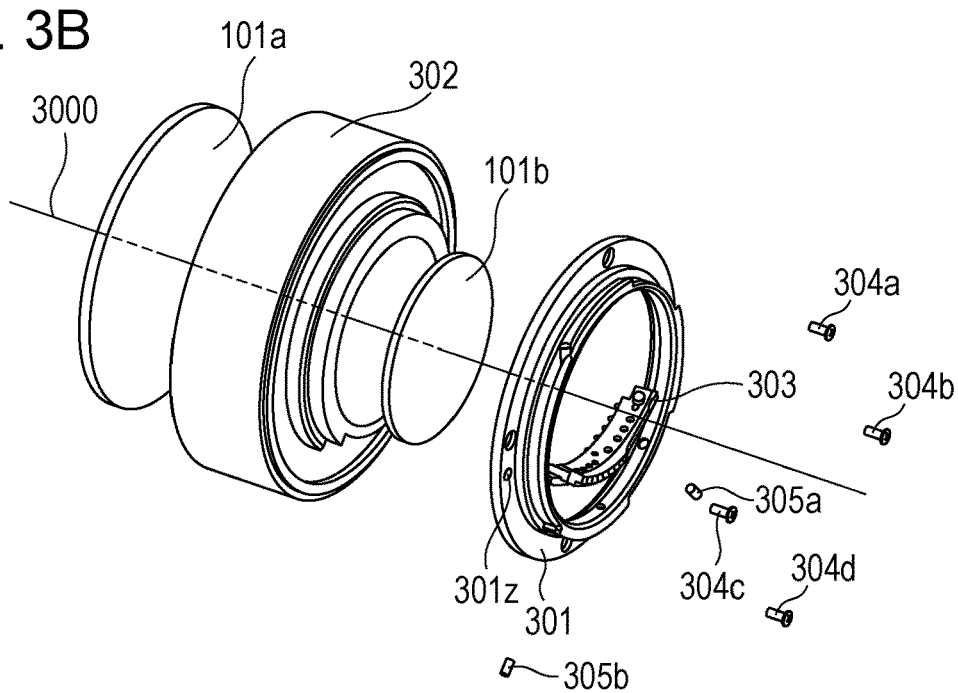
FIG. 3B is an exploded perspective view of the interchangeable lens assembly according to the present exemplary embodiment.

FIGS. 3A and 3B are exploded perspective views of the camera body 10 and the interchangeable lens assembly 100. FIG. 3A illustrates an exploded perspective view of the camera body 10, and FIG. 3B illustrates an exposed perspective view of the interchangeable lens assembly 100. An optical axis 3000 is an optical axis of the lens 101 included in the interchangeable lens assembly 100, and in a state in which the interchangeable lens assembly 100 is mounted on the camera body 10, a light flux for imaging passing along the optical axis 3000 can enter the image sensor 11.

Members Included in Camera Body 10

Members included in the camera body 10 will each be described next.

A lock pin 202 is a restriction member (a locking member, a convex portion) that restricts (locks) a mounted state of the camera body 10 and the camera accessory. Note that the lock pin 202 can be advanced and retreated in a direction parallel to the optical axis 3000. Specifically, when the interchangeable lens assembly 100 is mounted on the camera body 10, the lock pin 202 enters a lock pin groove (a concave portion, a groove portion, a recess) 301z of the lens mount 301 to lock the state in which the interchangeable lens assembly 100 and the camera body 10 are locked to each other.

A holding member 203 is a camera-side terminal holding member that holds a plurality of terminal pins 203a to 203k, and 203m provided on the camera body 10 side.

A camera body member 204 is a camera housing that holds the members of the camera body 10. Specifically, the camera mount 201 and the holding member 203 described above are fastened to the camera body member 204 with fastening screws 205a to 205d for the camera mount 201 and fastening screws for the holding member 203 (not shown). Note that the camera body member 204 holds an image pickup unit (not shown) on which the image sensor 11 is mounted and a shutter unit (not shown).

A lens mount biasing member 206 is a camera-side biasing member that draws in described-later first to third lens claw portions (a plurality of second engagement portions and a plurality of second bayonet claw portions) 301d to 301f provided in the lens mount 301 towards a camera mount 201 side. The lens mount biasing member 206 is interposed in a space between the camera mount 201 and the camera body member 204.

Members Included in Interchangeable Lens Assembly 100

Members included in the interchangeable lens assembly 100 will each be described next.

A front lens 101a and a rear lens 101b are optical members included in the lens 101. Naturally, the lens 101 may include lenses other than the front lens 101a and the rear lens 101b.

The lens mount 301 is a mount portion on the interchangeable lens assembly 100 side. A lens barrel (an accessory main body) 302 is a lens holding member that holds the lens 101. The lens mount 301 is fastened to the lens barrel 302 with lens mount fastening screws (mount fixing members) 304a to 304d.

A holding member 303 is a lens-side terminal holding member that holds a plurality of terminal surfaces 303a to 303k, and 303m provided on the interchangeable lens assembly 100 side. The holding member 303 is fasted to the lens mount 301 with lens contact portion holding portion fastening screws 305a and 305b.

Configuration of Camera Mount 201

Referring next to FIGS. 4A to 6B, a configuration of the camera mount 201 will be described.

Figure 4A:
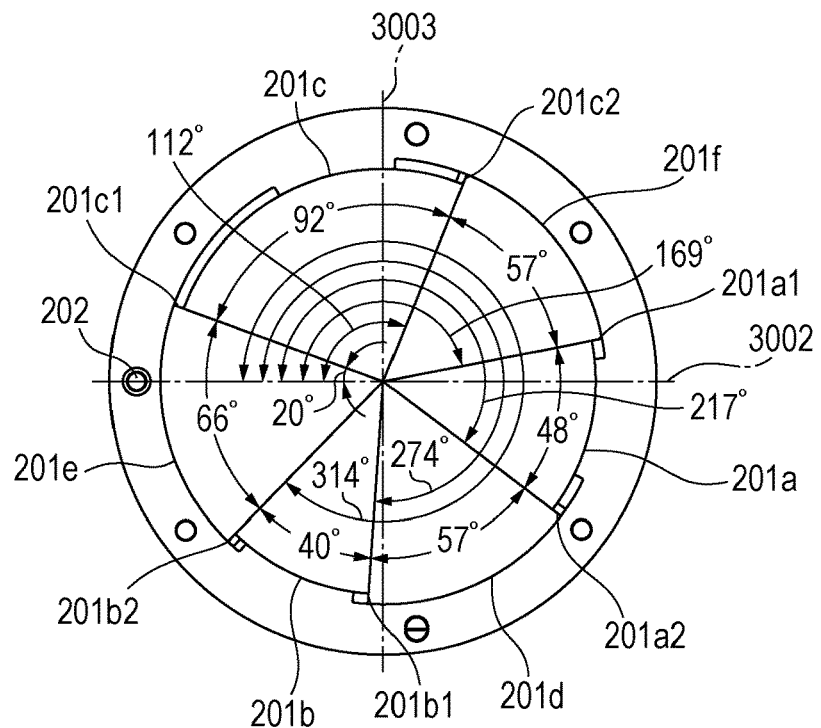
FIGS. 4A and 4B are detailed diagrams of a camera mount according to the present exemplary embodiment.
Figure 4B:
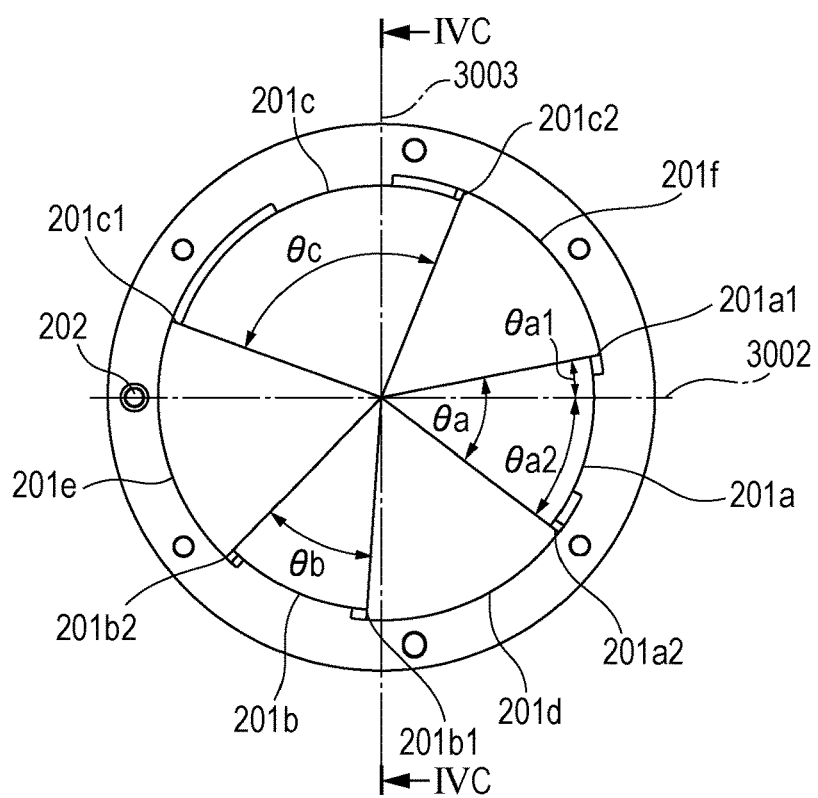
Figure 5A:
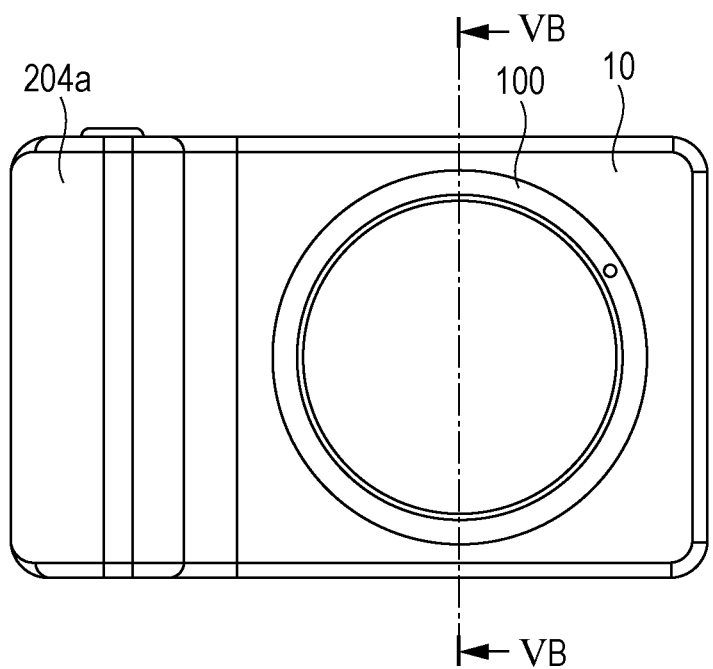
FIG. 5A is a front view of the camera according to the present exemplary embodiment in a normal position state.

FIGS. 4A and 4B are drawings of the camera mount 201 viewed from a photographer side (a rear side of the camera body 10) of the camera body 10. FIG. 5A is a drawing illustrating a normal position state, which is a state most frequently used when the interchangeable lens assembly 100 is mounted on the camera body 10. In the normal position state, a camera grip 204a of the camera body 10 is positioned on the left side when viewed from a subject side.

Figure 5B:
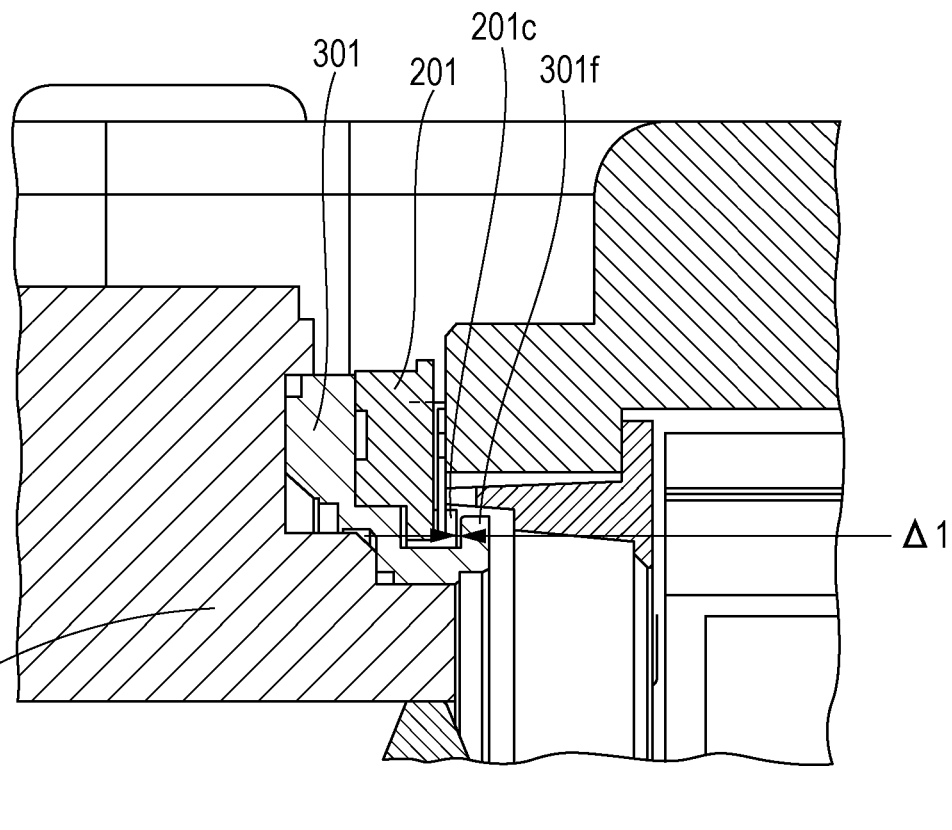
FIG. 5B is a cross-sectional view of the camera according to the present exemplary embodiment in the normal position state taken along line VB-VB.
Figure 6A:
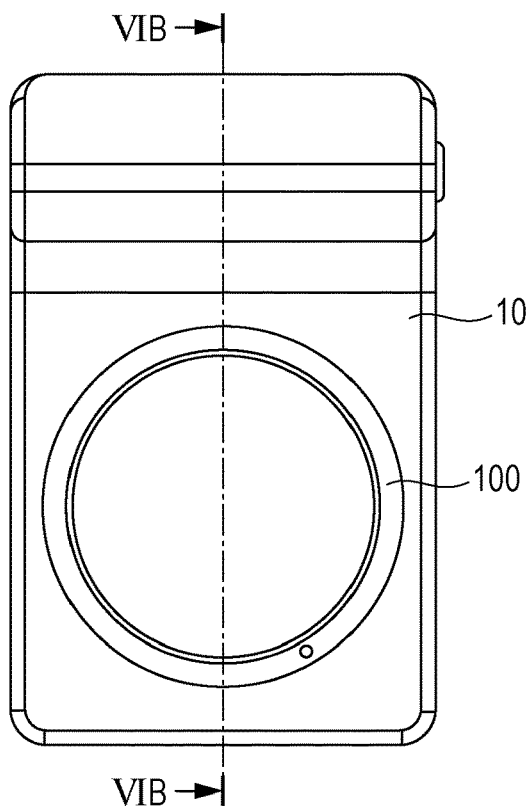
FIG. 6A is a front view of the camera according to the present exemplary embodiment in a vertical position state.
Figure 6B:
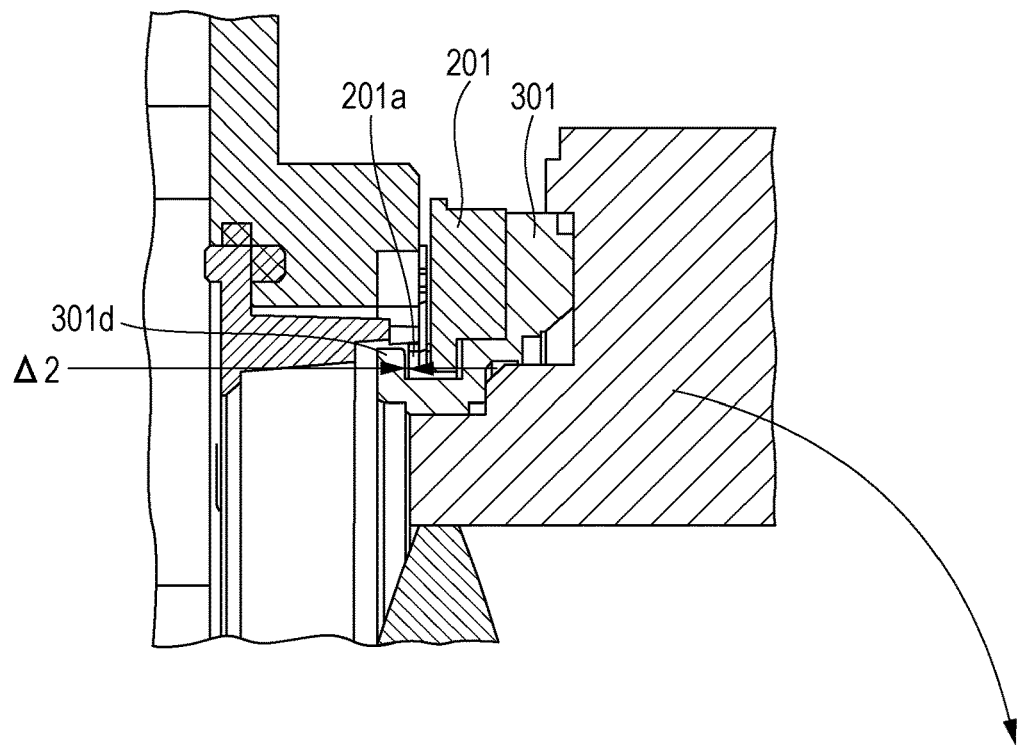
FIG. 6B is a cross-sectional view of the camera according to the present exemplary embodiment in the vertical position state taken along line VIB-VIB.

FIG. 5B is a partially enlarged cross-sectional view of the camera body 10 taken along line VB-VB. In FIG. 5B, the interchangeable lens assembly 100 is mounted and the camera body 10 is in the normal position state. Line VB-VB extends in the vertical direction that passes the middle of the camera mount 201. FIG. 6A is a drawing illustrating a vertical position state, which is a state used second most frequently with respect to the normal position state when the interchangeable lens assembly 100 is mounted on the camera body 10. In the vertical position state, the camera body 10 is set so that the camera grip 204a is on the upper side (the lock pin 202 being positioned on the lower side when the camera mount 201 is viewed from the photographer side). FIG. 6B is a partially enlarged cross-sectional view of the camera body 10 taken along line VIB-VIB. In FIG. 6B, the interchangeable lens assembly 100 is mounted and the camera body 10 is in the vertical position state. Line VIB-VIB passes the middle of the camera mount 201, extends in the vertical direction, and is orthogonal to line VB-VB.

As illustrated in FIGS. 4A and 4B, a plurality of camera claw portions are provided in the camera mount 201. The plurality of camera claw portions are a plurality of first engagement portions (a plurality of first bayonet claw portions) included in the camera mount 201 and each have widths in a radial direction and a circumferential direction of the opening. The plurality of camera claw portions herein are a first camera claw portion (a camera-side bayonet claw portion) 201a, a second camera claw portion 201b, and a third camera claw portion 201c.

In FIGS. 4A and 4B, a space between the first camera claw portion 201a and the second camera claw portion 201b is referred to as a first camera cutaway (a first camera concave portion, a first camera recess) 201d, and a space between the second camera claw portion 201b and the third camera claw portion 201c is referred to as a second camera cutaway 201e. Furthermore, a space between the third camera claw portion 201c and the first camera claw portion 201a is referred to as a third camera cutaway 201f.

Herein, two ends of the first camera claw portion 201a are referred to as a first end 201a1 and a second end 201a2, and two ends of the second camera claw portion 201b are referred to as a third end 201b1 and a fourth end 201b2. Furthermore, two ends of the third camera claw portion 201c are referred to as a fifth end 201c1 and a sixth end 201c2.

Furthermore, an angle formed by a line connecting a center of the camera mount 201 and the first end 201a1, and a line connecting the center of the camera mount 201 and the second end 201a2 is assumed to be θa. An angle formed by a line connecting the center of the camera mount 201 and the third end 201b1, and a line connecting the center of the camera mount 201 and the fourth end 201b2 is assumed to be θb. Furthermore, an angle formed by a line connecting the center of the camera mount 201 and the fifth end 201c1, and a line connecting the center of the camera mount 201 and the sixth end 201c2 is assumed to be θc. As illustrated in FIGS. 4A and 4B, in the present exemplary embodiment, θa=48°, θb=40°, θc=92° are satisfied. Each of θa, θb, and θc are angles of the corresponding camera claw portions in the circumferential direction.

Furthermore, assuming that an angle formed by the line connecting the center of the camera mount 201 and the second end 201a2, and the line connecting the center of the camera mount 201 and the third end 201b1 is an angle of the first camera cutaway 201d in the circumferential direction, the above angle is 57° in the present exemplary embodiment. Similarly, an angle of the second camera cutaway 201e in the circumferential direction is 66°, an angle of the third camera cutaway 201f in the circumferential direction is 57°.

Furthermore, a line segment connecting the center of the camera mount 201 and a center of the lock pin 202 is referred to as a reference line. Furthermore, an angle in which the first camera claw portion 201a is disposed is assumed to be in the range of an angle formed between the line connecting the center of the camera mount 201 and the first end 201a1 and the reference line to an angle formed between the line connecting the center of the camera mount 201 and the second end 201a2 and the reference line. The angle in which the first camera claw portion 201a is disposed is in the range of 169° to 217°. Similarly, an angle in which the second camera claw portion 201b is disposed is in the range of 274° to 314°, and an angle in which the third camera claw portion 201c is disposed is in the range of 20° to 112°.

Herein, θa is divided by a center line 3002 that is a line that passes the center of the lock pin 202 and the center of the camera mount 201 into an angle θa1 on the upper side of the center line 3002 and an angle θa2 on the lower side. In the present exemplary embodiment, the camera claw portions and the camera cutaways are disposed so that relationships θc≥θa+θb, and θa1+θc>θa2+θb are satisfied.

By employing such a configuration, the strength of the camera claw portion above the center line 3002 of the camera mount 201, or the center line 3002 that extends in the horizontal direction, can be increased. Accordingly, in the camera body 10 in the normal position state on which the interchangeable lens assembly 100 has been mounted, deformation of the camera claw portions supporting the weight of the interchangeable lens assembly 100 can be suppressed and tilting of the interchangeable lens assembly 100 in the vertical direction can be reduced.

Furthermore, in the present exemplary embodiment, the third camera claw portion 201c is disposed so that a center line 3003 passing the center of the camera mount 201 passes at least a portion of third camera claw portion 201c when the camera body 10 is in the normal position state. The center line 3003 passing the center of the camera mount 201 is a line orthogonal to the center line 3002 that passes the center of the lock pin 202 and the center of the camera mount 201. The center line 3003 extends in the vertical direction from a center axis parallel with the optical axis 3000. In other words, the center line 3003 is a vertical line that passes though the center axis of the camera mount 201 and orthogonal to the center axis of the camera mount 201 when the camera body 10 is placed on a horizontal plane.

With the above configuration, as illustrated in FIG. 5B, in the normal position state, a space Δ1, described later, in a direction parallel to the optical axis 3000 between the third lens claw portion 301f and the third camera claw portion 201c can be reduced. Accordingly, when the camera body 10 and the interchangeable lens assembly 100 are in the normal position state, the space created by the interchangeable lens assembly 100 in the gravity direction (a direction orthogonal to the optical axis) with the camera body 10 while the camera mount 201 supports the weight of the interchangeable lens assembly 100 can be reduced.

Furthermore, in the present exemplary embodiment, the first camera claw portion 201a is disposed so that the center line 3002 passing the center of the camera mount 201 when the camera body 10 is in the normal position state passes at least a portion of the first camera claw portion 201a.

With the above configuration, as illustrated in FIG. 6B, in the vertical position state, a space Δ2 in a direction parallel to the optical axis 3000 between the first lens claw portion 301d and the first camera claw portion 201a can be reduced. Accordingly, in the camera body 10 in the vertical position state on which the interchangeable lens assembly 100 has been mounted, the space created by the interchangeable lens assembly 100 in the gravity direction with the camera body 10 while the camera mount 201 supports the weight of the interchangeable lens assembly 100 can be reduced.

Configuration of Lens Mount 301

A configuration of the lens mount 301 will be described with reference to FIGS. 7 to 9B.

Figure 7A:
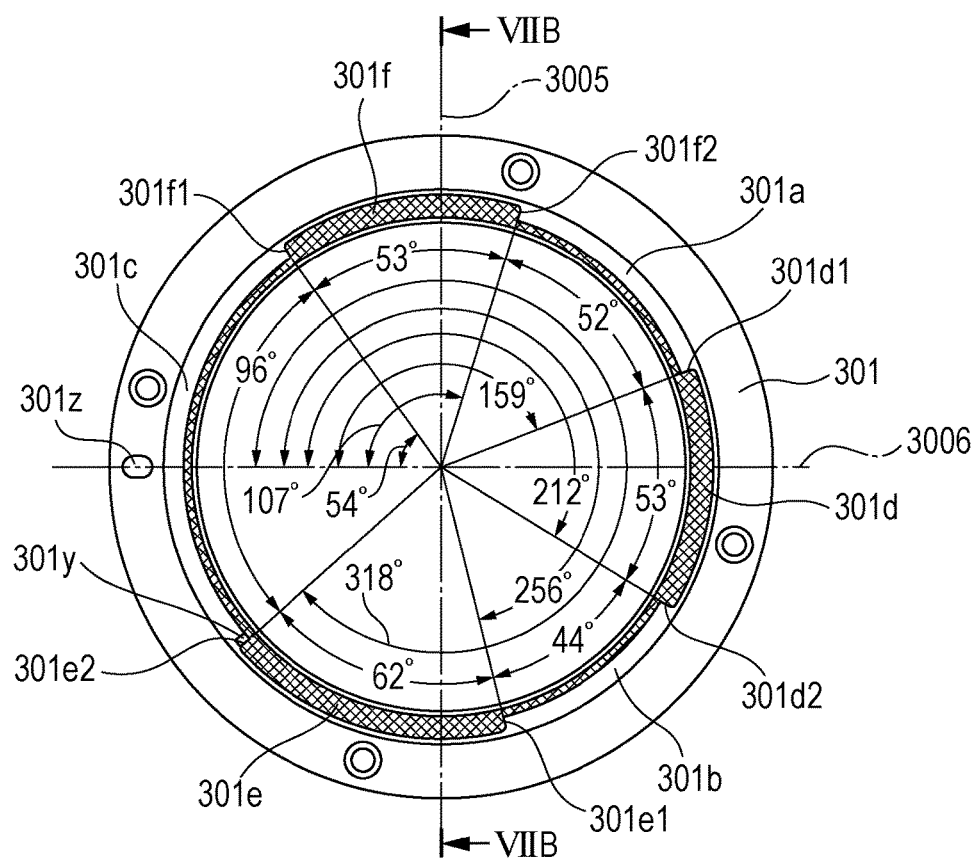
FIG. 7A is a front view of a lock phase state of a lens mount according to the present exemplary embodiment.

FIG. 7 is a diagram of the lens mount 301 of the interchangeable lens assembly 100, viewed from the photographer side, in a state (a lock phase state) in which the lens mount 301 is locked to the camera body 10 that is in the normal position state, which is a state in which the lock pin groove 301z is positioned on the left side when viewed from the photographer side.

The lens mount 301 are provided with the first lens claw portion (a lens-side bayonet claw portion) 301d, the second lens claw portion 301e, and the third lens claw portion 301f as a plurality of second engagement portions having widths in the radial direction and the circumferential direction of the opening included in the lens mount 301. The lens mount 301 is further provided with a circumferential-direction positioning pin 301y that prevents the interchangeable lens assembly 100 from rotating excessively from the desired position when the interchangeable lens assembly 100 is mounted on the camera body 10. By having the positioning pin 301y come in contact with the fourth end 201b2, the interchangeable lens assembly 100 is stopped from rotating past the desired position described above.

Referring to FIG. 7, a space between the third lens claw portion 301f and the first lens claw portion 301d is referred to as a first lens cutaway 301a, and a space between the first lens claw portion 301d and the second lens claw portion 301e is referred to as a second lens cutaway 301b. Furthermore, a space between the second lens claw portion 301e and the third lens claw portion 301f is referred to as a third lens cutaway 301c.

Furthermore, two ends of the first lens claw portion 301d are referred to as a first end 301d1 and a second end 301d2, and two ends of the second lens claw portion 301e are referred to as a third end 301e1 and a fourth end 301e2. Furthermore, two ends of the third lens claw portion 301f are referred to as a fifth end 301f1 and a sixth end 301f2.

As illustrated in FIG. 7, an angle of the first lens claw portion 301d in the circumferential direction is 53°, an angle of the second lens claw portion 301e in the circumferential direction is 62°, and an angle of the third lens claw portion 301f in the circumferential direction is 53°. The angle of the first lens claw portion 301d in the circumferential direction herein is an angle formed between a line connecting a center of the lens mount 301 and the first end 301d1, and a line that connects the center of the lens mount 301 and the second end 301d2. The angles of the second lens claw portion 301e and the third lens claw portion 301f in the circumferential direction can be defined in a similar manner to the definition of the angle of the first lens claw portion 301d in the circumferential direction.

Furthermore, assuming that an angle formed by a line connecting the center of the lens mount 301 and the fifth end 301f1, and a line connecting the center of the lens mount 301 and the first end 301d1 is an angle of the first lens cutaway 301a in the circumferential direction, the above angle is 52° in the present exemplary embodiment. Similarly, an angle of the second lens cutaway 301b in the circumferential direction is 44°, an angle of the third lens cutaway 301c in the circumferential direction is 96°.

Furthermore, a line segment connecting the center of the lens mount 301 and a center of the lock pin groove 301z is referred to as a reference line. Furthermore, an angle in which the first lens claw portion 301d is disposed is assumed to be in the range of an angle formed between the line connecting the center of the lens mount 301 and the first end 301d1 and the reference line to an angle formed between a line connecting the center of the lens mount 301 and the second end 301d2 and the reference line. The angle in which the first lens claw portion 301d is disposed is in the range of 159° to 212°. Similarly, an angle in which the second lens claw portion 301e is disposed is in the range of 256° to 318°, and an angle in which the third lens claw portion 301f is disposed is in the range of 54° to 107°.

Note that in the normal position state, a center line that passes the center of the lens mount 301 and that is orthogonal to a center line 3006 that passes the center of the lock pin groove 301z and the center of the lens mount 301 is referred to as a center line 3005. The center line 3005 passes at least a portion of the second lens claw portion 301e and at least a portion of the third lens claw portion 301f. With the above, deformation of the lens claw portions due to the above-described space Δ1 illustrated in FIG. 5B and the interchangeable lens assembly 100 attempting to tilt in the vertical direction can be reduced. The center line 3005 is a vertical line that passes through a center axis of the lens mount 301 and orthogonal to the center axis of the lens mount 301 when the camera body 10 which is attached the interchangeable lens assembly 100 is placed on a horizontal plane.

Furthermore, the first lens claw portion 301d is disposed so that the center line 3006 passes at least a portion of the first lens claw portion 301d. With the above, deformation of the lens claw portions due to the above-described space Δ2 illustrated in FIG. 6B and the interchangeable lens assembly 100 attempting to tilt in the vertical direction can be reduced.

Dispositional Relationship Between Camera Mount 201 and Camera-Side Terminals

Figure 8A:
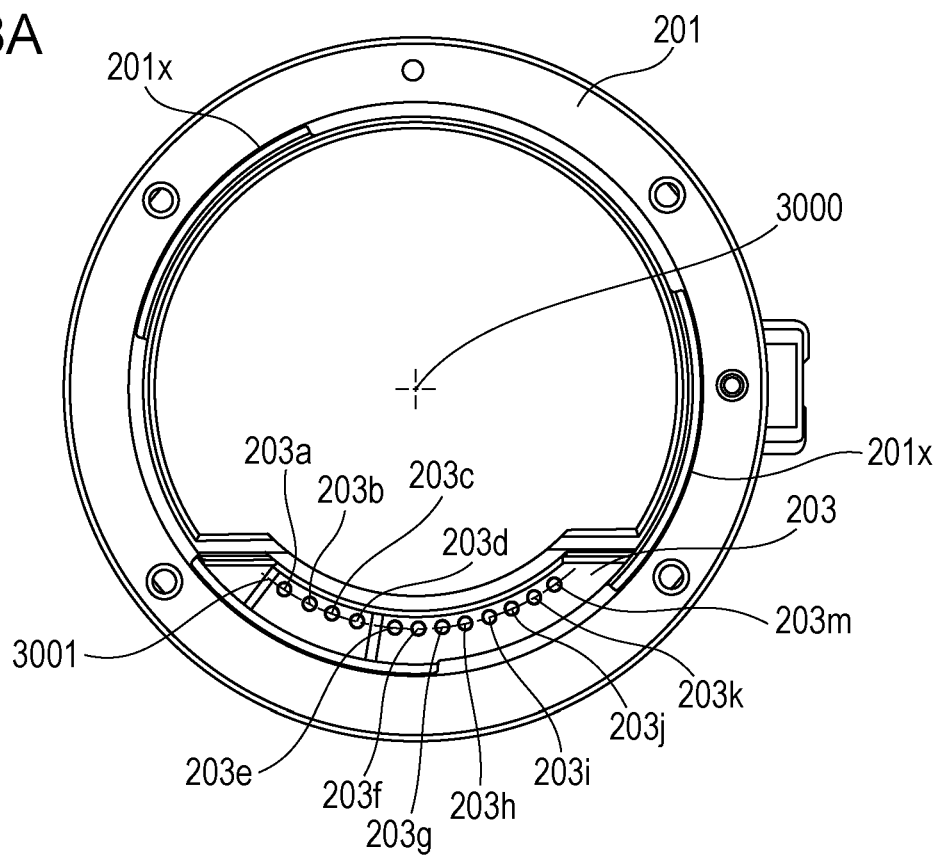
FIG. 8A is a detailed diagram illustrating a dispositional relationship of a camera contact pin according to the present exemplary embodiment.
Figure 8B:
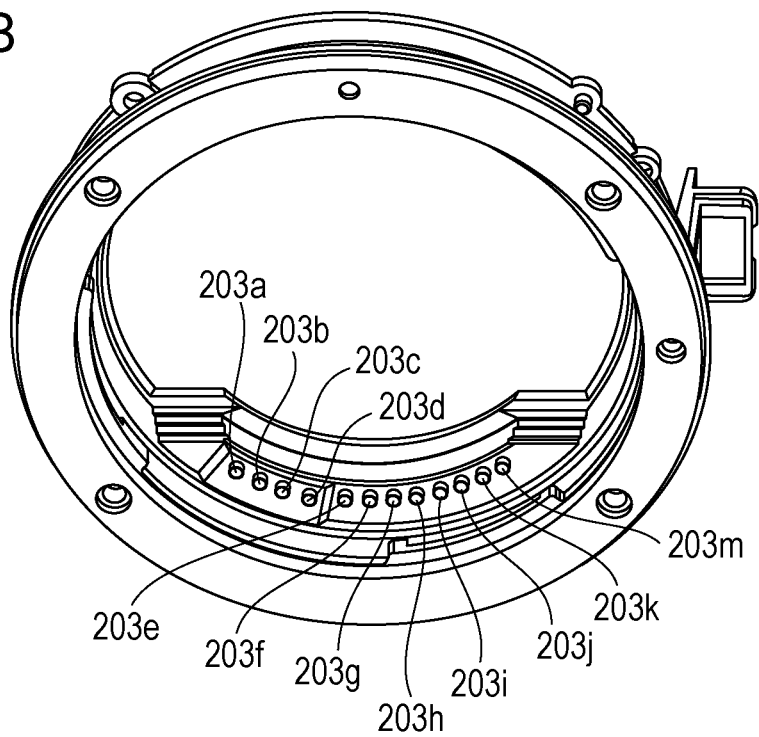
FIG. 8B is a perspective view illustrating a dispositional relationship of a camera contact pin according to the present exemplary embodiment.

Referring next to FIGS. 8A and 8B, the dispositional relationship between the camera mount 201 and camera-side terminals described above will be described.

FIG. 8A is a diagram of the dispositional relationship between the camera mount 201, the plurality of terminal pins 203a to 203k, and 203m that are the plurality of camera-side terminals (first terminals), and the holding member 203 viewed from the subject side (a front side of the camera body 10). FIG. 8B is a diagram of the camera mount 201, the terminal pins 203a to 203k, and 203m, and the holding member 203 viewed from obliquely above and from the subject side (the front side of the camera body 10).

As illustrated in FIG. 8A, in the holding member 203, the terminal pins 203a to 203k, and 203m are arranged on a camera terminal pin arrangement line 3001. The terminal pins 203a to 203k, and 203m are each a movable terminal that can be advanced and retreated in a direction parallel to the optical axis 3000, and are biased towards the interchangeable lens assembly 100 side with springs (not shown).

The relationship between the terminals illustrated in FIG. 1B described above and the terminal pins is as follows. In other words, the terminal pin 203a is the camera-side VDD terminal, the terminal pin 203b is the camera-side VBAT terminal, the terminal pin 203c is the camera-side TYPE terminal, the terminal pin 203d is the camera-side PGND terminal, and the terminal pin 203e is the camera-side MIF terminal. Furthermore, the terminal pin 203f is the camera-side DCL terminal, the terminal pin 203g is the camera-side DLC terminal, the terminal pin 203h is the camera-side LCLK terminal, the terminal pin 203i is the camera-side DLC2 terminal, and the terminal pin 203j is the camera-side DCA terminal. Furthermore, the terminal pin 203k is the camera-side CS terminal, the terminal pin 203m is the camera-side DGND terminal.

As illustrated in FIG. 8B, heights of the terminal pins 203a, 203b, 203c, and 203d in an optical axis 3000 direction are higher than heights of the terminal pins 203e, 203f, 203g, 203h, 203i, 203j, 203k, and 203m in the optical axis 3000 direction. The above is because the holding member 203 includes two surfaces that have different heights in the optical axis 3000 direction in which the terminal pins 203a, 203b, 203c, and 203d are provided in the higher surface and the rest of the terminal pins are provided in the lower surface.

In other words, all of the terminal pins of the present exemplary embodiment are not provided in surfaces at the same height. By having such a configuration, the present exemplary embodiment is capable of suppressing abrasion of the terminals caused by the camera-side terminals sliding against the lens-side terminals when the interchangeable lens assembly 100 is mounted on the camera body 10. More specifically, when the interchangeable lens assembly 100 is rotated from the locking position to the unlocking position to mount the interchangeable lens assembly 100 on the camera body 10, there is a period in which the terminal pins 203e to 203k, and 203m are not in contact with the lens-side terminals. Accordingly, the abrasion of the terminals described above can be suppressed.

Relationship Between Lens Mount 301 and Lens-Side Terminals

Figure 9A:
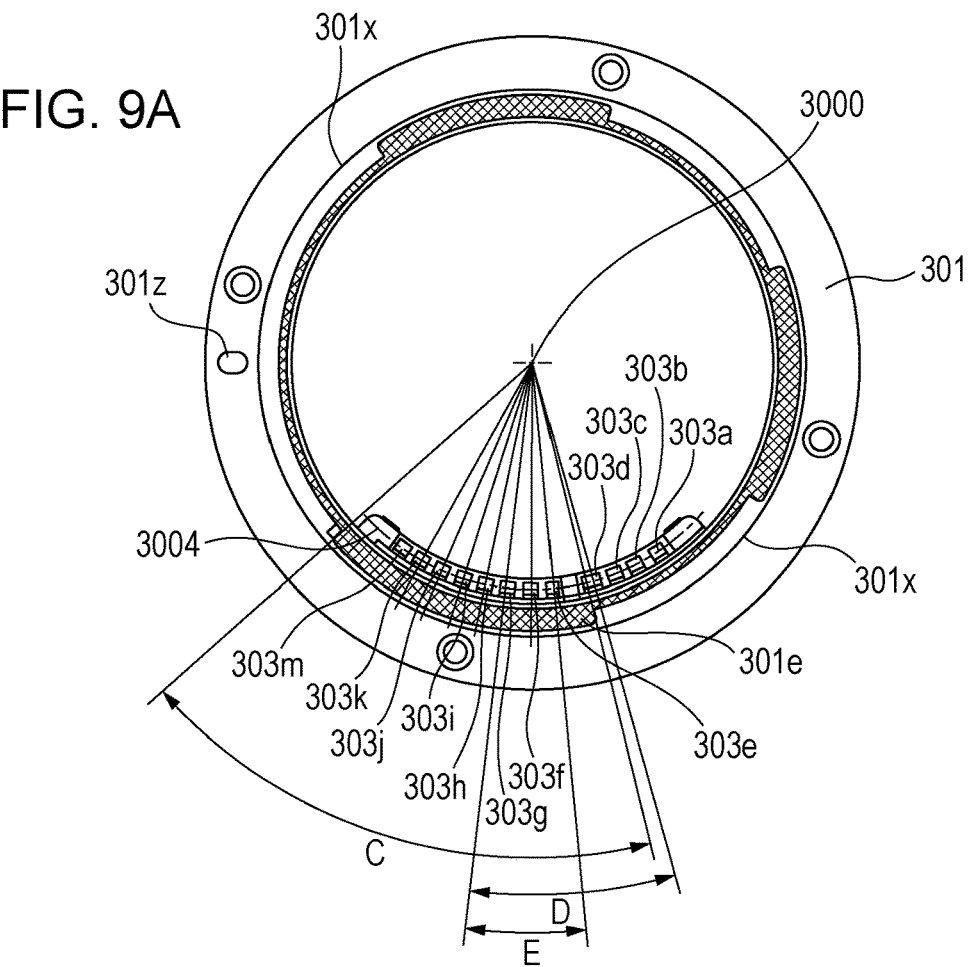
FIG. 9A is a detailed diagram illustrating a dispositional relationship of lens contact portions according to the present exemplary embodiment.
Figure 9B:
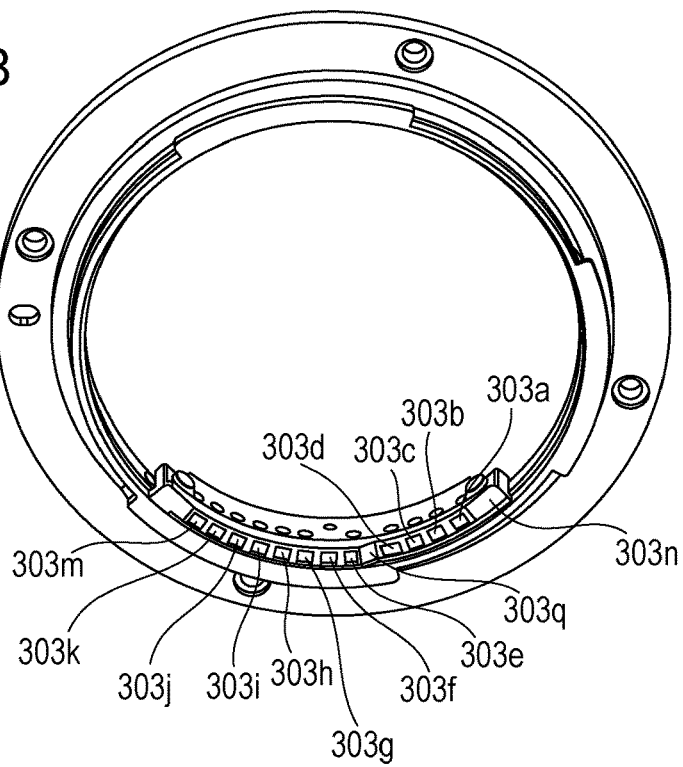
FIG. 9B is a perspective view illustrating a dispositional relationship of the lens contact portions according to the present exemplary embodiment.

Referring next to FIGS. 9A and 9B, the dispositional relationship between the lens mount 301 and lens-side terminals described above will be described. FIG. 9A is a diagram of the dispositional relationship between the lens mount 301 in which the interchangeable lens assembly 100 is in the lock phase state, the terminal surfaces 303a to 303k, and 303m that are the plurality of lens-side terminals (second terminals), and the holding member 303 viewed from the photographer side. FIG. 9B is a diagram of the lens mount 301, the terminal surfaces 303a to 303k, and 303m, and the holding member 303 viewed from obliquely above from the photographer side in a case in which the interchangeable lens assembly 100 is in the lock phase state and in which the interchangeable lens assembly 100 is mounted on the camera body 10.

As illustrated in FIG. 9A, in the holding member 303, the terminal surfaces 303a to 303k, and 303m are arranged on a lens contact point arrangement line 3004. The relationship between the terminals illustrated in FIG. 1B described above and the terminal surfaces is as follows. In other words, the terminal surface 303a is the lens-side VDD terminal, the terminal surface 303b is the lens-side VBAT terminal, the terminal surface 303c is the lens-side TYPE terminal, the terminal surface 303d is the lens-side PGND terminal, and the terminal surface 303e is the lens-side MIF terminal.

Furthermore, the terminal surface 303f is the lens-side DCL terminal, the terminal surface 303g is the lens-side DLC terminal, the terminal surface 303h is the lens-side LCLK terminal, the terminal surface 303i is the lens-side DLC2 terminal, and the terminal surface 303j is the lens-side DCA terminal. Furthermore, the terminal surface 303k is the lens-side CS terminal, and the terminal surface 303m is the lens-side DGND terminal.

As illustrated in FIG. 9B, heights of the terminal surfaces 303a, 303b, 303c, and 303d in the optical axis 3000 direction are lower than heights of the terminal surfaces 303e, 303f, 303g, 303h, 303i, 303j, 303k, and 303m in the optical axis 3000 direction. The above is because the holding member 303 includes two surfaces that have different heights in the optical axis 3000 direction in which the terminal surfaces 303a, 303b, 303c, and 303d are provided on the lower surface and the rest of the terminal surfaces are provided on the higher surface. By having the lens-side terminals have the above configuration that corresponds to the configuration of the camera-side terminals described above, the abrasion of the terminals described above can be suppressed.

Reference numerals 303n and 303p are guiding inclined faces (inducing oblique surfaces) for mounting the interchangeable lens assembly 100 on the camera body 10 by pushing the terminal pins towards the image sensor 11 side when the interchangeable lens assembly 100 is rotated. By providing the guiding inclined faces, the contact pressure against the lens mount 301 of the terminal pins provided on the camera body 10 side changes in a gentle and stepwise manner; accordingly, deformation of the terminal pins provided on the camera body 10 side can be reduced.

Operation of Attaching Interchangeable Lens Assembly 100 on Camera Body 10

Figure 10A:
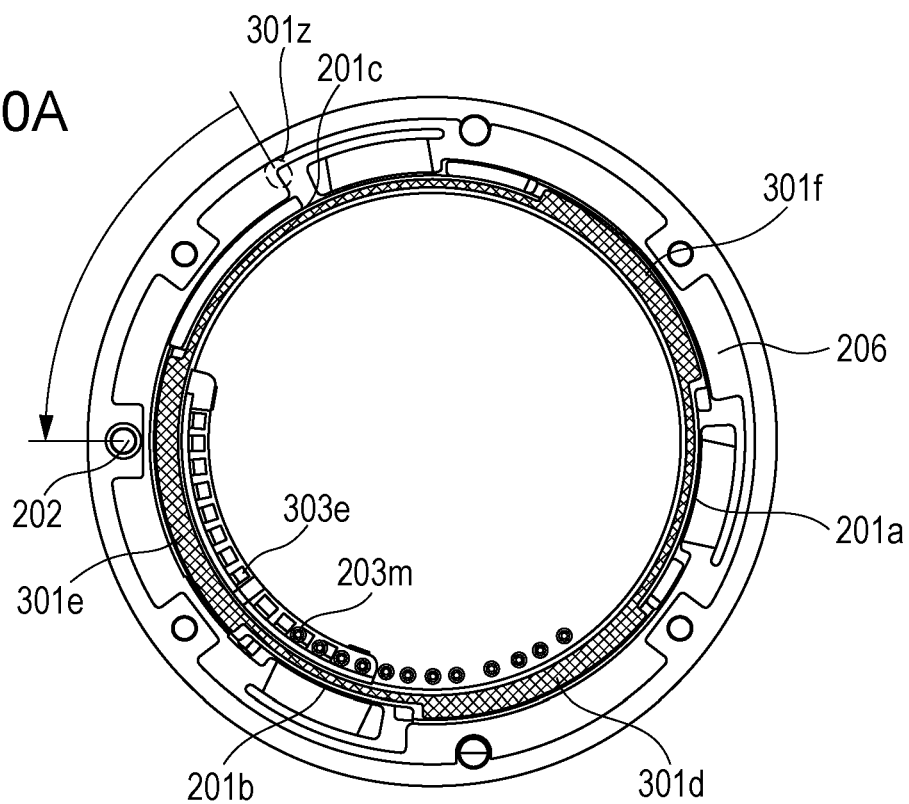
FIG. 10A is a diagram illustrating an insertion phase state when the interchangeable lens assembly is attached to the camera according to the present exemplary embodiment viewed from the camera photographer side.
Figure 10B:
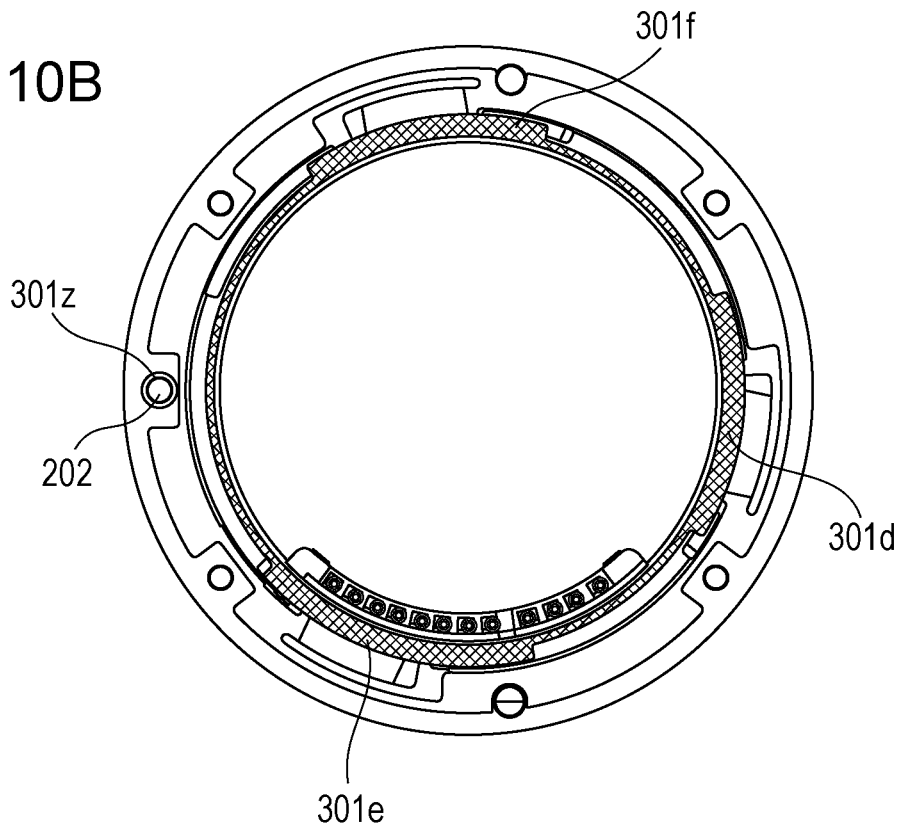
FIG. 10B is a diagram illustrating a lock phase state when the interchangeable lens assembly is attached to the camera according to the present exemplary embodiment viewed from the camera photographer side.

Referring next to FIGS. 10A and 10B, an operation of fitting the interchangeable lens assembly 100 on the camera body 10 will be described.

The operation of mounting a camera accessory, such as the interchangeable lens assembly 100, on the camera body 10 can be broadly separated into a first operation and a second operation described next.

Figure 4C:
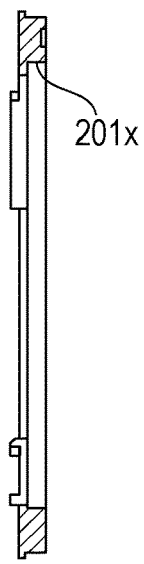
FIG. 4C is a cross sectional view of a camera mount according to the present exemplary embodiment.
Figure 7B:
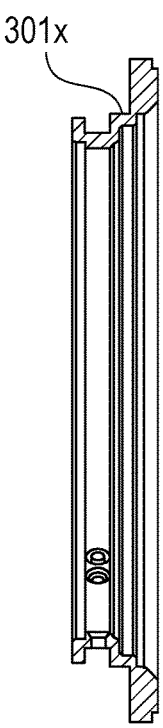
FIG. 7B is a cross-sectional view of a lock phase state of a lens mount according to the present exemplary embodiment in the vertical position state taken along line VIIB-VIIB.

The first operation is an operation in which the interchangeable lens assembly 100 is inserted into the camera body 10 by setting the positions of the camera body 10 and the interchangeable lens assembly 100 to predetermined positions in the rotation direction so as to allow the lens claw portions enter the camera cutaways and is an operation in which a lens-side diameter fitting portion 301x in FIG. 7B and a camera-side diameter fitting portion 201x in FIG. 4C are diametrically fitted to each other. Furthermore, the second operation is an operation in which, while the lens-side diameter fitting portion 301x and the camera-side diameter fitting portion 201x are diametrically fitted to each other, relatively rotating the camera body 10 and the interchangeable lens assembly 100 towards the locking position, and is an operation bringing the camera body 10 and the interchangeable lens assembly 100 to a bayonet coupled state.

FIG. 10A is a diagram illustrating an insertion phase state (a first state) when the camera body 10 is attached to the interchangeable lens assembly 100 of the present exemplary embodiment viewed from the camera mount 201 side (the photographer side). Note that the insertion phase state refers to a state in which the first lens claw portion 301d is inserted in the first camera cutaway 201d, the second lens claw portion 301e is inserted in the second camera cutaway 201e, and the third lens claw portion 301f is inserted in the third camera cutaway 201f. The lens-side diameter fitting portion 301x and the camera-side diameter fitting portion 201x are diametrically fitted to each other in the above state.

FIG. 10B is a diagram illustrating a lock phase state (a second state) when the camera body 10 is attached to the interchangeable lens assembly 100 of the present exemplary embodiment viewed from the camera mount 201 side (the photographer side). Note that the lock phase state is a state in which the interchangeable lens assembly 100 is, from the insertion phase state illustrated in FIG. 10A described above, rotated 60° in the clockwise direction when viewed from the subject side of the interchangeable lens assembly 100 to engage the lens claw portions and the camera claw portions to each other.

More specifically, in the lock phase state, the first lens claw portion 301d is positioned on the image sensor 11 side of the first camera claw portion 201a, and the second lens claw portion 301e is positioned on the image sensor 11 side of the second camera claw portion 201b. Furthermore, the third lens claw portion 301f is positioned on the image sensor 11 side of the third camera claw portion 201c. The lens claw portions and the camera claw portions are engaged with each other in the above state, and the lock pin 202 is inserted in the lock pin groove 301z; accordingly, rotation of the interchangeable lens assembly 100 is locked. Furthermore, in the lock phase state, the lens claw portions are biased towards the image sensor 11 with the lens mount biasing member 206. Note that in place of the lens mount biasing member 206, a flat spring portion may be provided in each camera claw portion.

Furthermore, when the interchangeable lens assembly 100 is transitioned from the insertion phase state to the lock phase state, the terminal pins on the camera body 10 side are pressed towards the image sensor 11 side with the guiding inclined faces 303n and 303q described above.

Furthermore, while being continuously pressed, each of the terminal pins on the camera body 10 side come in contact with the corresponding terminal surfaces 303a to 303k, and 303m. Note that the terminal pin 203m and the terminal surface 303e come in contact with each other first.

Dispositional Relationship Between Lens Claw Portions and Lens-Side MIF Terminals As illustrated in FIG. 9A, in the present exemplary embodiment, the terminal surface 303e, which is the lens-side MIF terminal, is inside an angle range C that is where the second lens claw portion 301e is provided. The angle range C herein is, viewed in the direction in which the optical axis 3000 extends (viewed in a central axis direction of the optical apparatus), a range between a half line extending from the optical axis 3000 (the central axis of the optical apparatus) and passing the third end 301e1, and a half line extending from the optical axis 3000 and passing the fourth end 301e2. The terminal surfaces 303e being inside angle range C, which is where the second lens claw portion 301e is provided, can be paraphrased as bellow. In other words, in a case in which, when viewed in the optical axis 3000 direction, a first line is assumed to be a half line in which the optical axis 3000 is an end thereof and is a half line that passes the third end 301e1, and a second line is assumed to be a half line in which the optical axis 3000 is and end thereof and is a half line that passes the fourth end 301e2, the terminal surface 303e is in the region surrounded by the outer periphery of the lens-side diameter fitting portion 301x, the first line, and the second line. Note that the expression of angle ranges D and E described later can be paraphrased in a similar manner to angle range C described above.

As described above, the MIF terminal is a terminal that detects that the interchangeable lens assembly 100 has been mounted on the camera body 10. Furthermore, when it is detected with the MIF terminal that the interchangeable lens assembly 100 has been mounted on the camera body 10, supply of power to the VDD terminal and the VBAT terminal is started and communication between the camera body 10 and the interchangeable lens assembly 100 is started. Accordingly, it is desirable that the terminal pin 203e that is the MIF terminal on the camera side and the terminal surface 303e that is the MIF terminal on the lens side are in contact with the counterparts in a stable manner.

Accordingly, in the present exemplary embodiment, the camera-side MIF terminal, which determines whether the interchangeable lens assembly 100 has been mounted on the camera body 10, can be in contact with the lens-side MIF terminal in a more stable manner with the configuration described above illustrated in FIG. 9A. Since the camera-side MIF terminal and the lens-side MIF terminal are in contact with each other in a stable manner, communication between the camera body 10 and the interchangeable lens assembly 100 can be stated in a stable manner. Furthermore, operation of the communication protocol between the camera body 10 and the interchangeable lens assembly 100 becomes stable and high-speed communication can be performed.

As described above, according to the present exemplary embodiment, communication between the camera body 10 and the interchangeable lens assembly 100 can be performed in a stable manner. As a result, through further increase in the communication speed, usability of the camera body 10 and the interchangeable lens assembly 100 can be improved and new pieces of information can be exchanged between the camera body 10 and the interchangeable lens assembly 100; accordingly, a new function can be added to the camera system.

Note that the terminal surfaces 303e, which is a lens-side MIF terminal, being inside angle range C, which is where the second lens claw portion 301e is provided, can be paraphrased as bellow. In other words, as illustrated in FIG. 9A, when viewed in the central axis direction of the lens mount 301, a half line that passes the terminal surface 303e, which is the lens-side MIF terminal, and the central axis of the lens mount 301 passes the second lens claw portion 301e, which is a predetermined second bayonet claw portion.

Furthermore, when the accessory is the interchangeable lens assembly, the central axis of the lens mount 301 may be the optical axis of the interchangeable lens assembly, or may be the central axis of the opening of the lens mount 301.

Furthermore, as illustrated in FIG. 9A, in the present exemplary embodiment, the plurality of lens-side terminals are provided at positions that are different from those of the plurality of lens-side bayonet claw portions. More specifically, while the plurality of lens-side bayonet claw portions are positioned outside the opening included in the lens mount 301, the plurality of lens-side terminals are positioned inside the opening.

Dispositional Relationship Between Lens Claw Portions and Lens-Side Communication Terminals In the present exemplary embodiment, in addition to the terminal surface 303e that is the lens-side MIF terminal, the lens-side communication terminals are also provided inside angle range C that is where the second lens claw portion 301e is provided. The lens-side communication terminals herein are the terminal surface 303f, the terminal surface 303g, the terminal surface 303h, the terminal surface 303i, the terminal surface 303j, and the terminal surface 303k. As illustrated in FIG. 9A, in the present exemplary embodiment, all of the above-described lens-side communication terminals are inside angle range C, which is where the second lens claw portion 301e is provided. With such a configuration, when the interchangeable lens assembly 100 is attached to the camera body 10, the lens-side communication terminals are positioned in the region or near the region that is stable due to the bayonet coupling between the camera claw portions and the lens claw portions. Accordingly, when imaging is actually carried out, communication between the interchangeable lens assembly 100 and the camera body 10 can be performed in a further stable manner. Note that in the present exemplary embodiment, all of the lens-side communication terminals are inside angle range C, which is where the second lens claw portion 301e is provided. However, for example, it is only sufficient that half or more of the lens-side communication terminals, more preferably, 80 percent or more thereof are inside angle range C, where the second lens claw portion 301e is provided.

Note that all of the above-described lens-side communication terminals being inside angle range C, where the second lens claw portion 301e is provided, can be paraphrases as follows. In other words, as illustrated in FIG. 9A, when viewed in the central axis direction of the lens mount 301, half lines that pass the plurality of lens-side communication terminals and the central axis of the lens mount 301 all pass the second lens claw portion 301e, which is a predetermined second bayonet claw portion.

Furthermore, as illustrated in FIGS. 9A and 9B, in the present exemplary embodiment, a length of the holding member 303, which is a lens-side terminal holding portion, in the circumferential direction is longer than a length of a single lens-side bayonet claw portion. Accordingly, all of the lens-side terminals cannot be disposed inside angle range C. Accordingly, in the present exemplary embodiment, as described above, the terminal surface 303e, which is the lens-side MIF terminal that is especially important, and all of the lens-side communication terminals are priority disposed inside angle range C.

Dispositional Relationship Between Lens Claw Portions and Positioning Pin 303p

Figure 11:
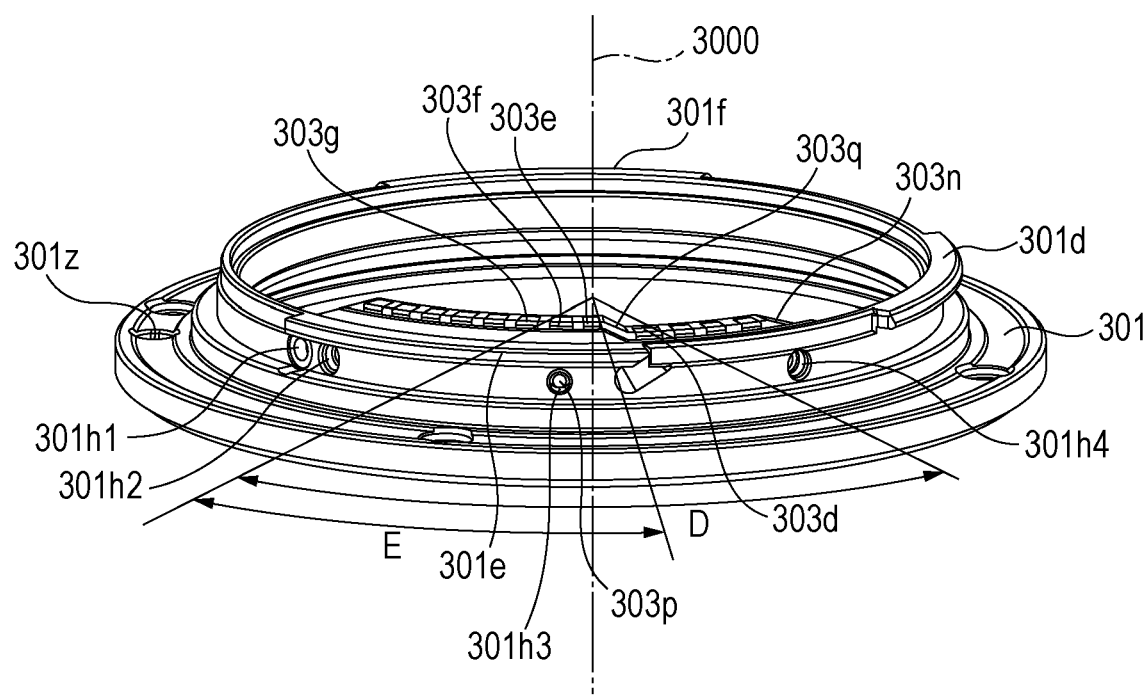
FIG. 11 is a perspective view of the lens mount and a lens-side terminal holding member.

Referring next to FIG. 11, a dispositional relationship between the lens claw portions and the positioning pin (a protrusion) 303p will be described.

The positioning pin 303p is provided in the holding member 303, and is a pin that extends outwardly in the radial direction of the opening included in the lens mount 301. By inserting the positioning pin 303p in a hole portion 301h3 provided in the lens mount, the position of the holding member 303 with respect to the lens mount 301 is determined. In a state in which the positioning pin 303p is inserted in the hole portion 301h3, by using hole portions 301h2 and 301h4 provided in the lens mount 301 and screws (not shown), the holding member 303 can be fixed to the lens mount 301. Note that a hole portion 301h1 is a hole portion in which the positioning pin 301y described above is inserted to suppress the interchangeable lens assembly 100 from rotating past the desired position. Note that in the present exemplary embodiment, the hole portions are through holes; however, for example, the hole portion 301h3 may be a recess with a bottom and does not have to be a through hole as long as the hole portion 301h3 engages with the positioning pin 303p.

As described above, in the present exemplary embodiment, the terminal surface 303e, which is the lens-side MIF terminal, is inside an angle range C that is where the second lens claw portion 301e is provided. In addition to the above, as illustrated in FIG. 11, in the present exemplary embodiment, the positioning pin 303p is also inside angle range C (FIG. 9A), where the second lens claw portion 301e is provided. With such a configuration, when the interchangeable lens assembly 100 is attached to the camera body 10, the positioning pin 303p is positioned in the region or near the region that is stable due to the bayonet coupling between the camera claw portions and the lens claw portions. Accordingly, when imaging is actually carried out, in a case in which external force such as a vibration or an impact when dropped is applied to the interchangeable lens assembly 100 or the camera body 10, deviation in the position of the holding member 303 can be suppressed.

Note that the above-described positioning pin 303p as well as being inside angle range C, where the second lens claw portion 301e is provided, can also be described as follows. In other words, when viewed in the central axis direction of the lens mount 301, a half line that passes the positioning pin 303p and the central axis of the lens mount 301 passes the second lens claw portion 301e, which is a predetermined second bayonet claw portion.

Dispositional Relationship Between Terminal Surface 303e and Positioning Pin 303p Furthermore, as described above, when the interchangeable lens assembly 100 transitions from the insertion phase state to the lock phase state, the first terminal pin and the terminal surface that come into contact with each other are the terminal pin 203m and the terminal surface 303e. Accordingly, when the interchangeable lens assembly 100 is attached to the camera body 10, it is desirable that the terminal surface 303e is stable. Accordingly, in the present exemplary embodiment, the terminal surface 303e is provided near to the positioning pin 303p in the circumferential direction of the lens mount 301. With the above arrangement, when the interchangeable lens assembly 100 transitions from the insertion phase state to the lock phase state, the terminal surface 303e, which is the terminal surface that comes in contact with the terminal pin first, and the terminal pin are in contact with each other in a more stable manner.

As described above, the terminal surface 303e being provided near the positioning pin 303p, can also be described as follows. In other words, in an interchangeable lens assembly 100 in the normal position state (the lock pin groove 301z on the left side), the positioning pin 303p is provided within the angle range D between a line passing a center of the terminal surface 303d and the optical axis 3000, and a line passing a center of the terminal surface 303g and the optical axis 3000. Note that the terminal surface 303d is a terminal surface next to the terminal surface 303e in an anticlockwise direction, and the terminal surface 303g is a terminal surface that is two terminal surfaces next to the terminal surface 303e in the clockwise direction. Furthermore, it is desirable that positioning pin 303p be positioned in angle range E between a line passing a center of the terminal surface 303e and the optical axis 3000, and a line passing the center of the terminal surface 303g and the optical axis 3000.

The dispositional relationship between the terminal surface 303e and the positioning pin 303p can also be described as follows. In other words, while having the terminal surface 303e that is a lens-side MIF terminal as a reference terminal, among the plurality of lens-side terminals, a lens-side terminal that is, when viewed from the terminal surface 303e, nearest to the terminal surface 303e in a first direction (the anticlockwise direction in FIG. 9A) is referred to as a first adjacent terminal. In the present exemplary embodiment, the first adjacent terminal is the terminal surface 303d. Furthermore, among the plurality of lens-side terminals, a lens-side terminal that is, when viewed from the terminal surface 303e, nearest to the terminal surface 303e in a second direction (the clockwise direction in FIG. 9A), which is a direction opposite to the first direction, is referred to as a second adjacent terminal. In the present exemplary embodiment, the second adjacent terminal is the terminal surface 303f. Furthermore, among the plurality of lens-side terminals, a lens-side terminal that is nearest to the second adjacent terminal in the second direction is referred to as a third adjacent terminal. In the present exemplary embodiment, the third adjacent terminal is the terminal surface 303g.

In the above description, the positioning pin 303p and the hole portion 301h3 are inside angle range D from the terminal surface 303d to the terminal surface 303g. Furthermore, more preferably, the positioning pin 303p and the hole portion 301h3 (FIG. 11) are inside angle range E from the terminal surface 303e to the terminal surface 303g (FIG. 9A). The angle range D herein is, when viewed in the optical axis 3000 direction, a half line extending from the optical axis 3000 and passing the center of the terminal surface 303d, and a half line extending from the optical axis 3000 and passing the center of the terminal surface 303g. Using the optical axis 3000, the center of the terminal surface 303e, and the center of the terminal surface 303g, angle range E can be defined in a similar manner to angle range D.

The dispositional relationship above can also be described as follows. In other words, when viewed in the central axis direction of the lens mount 301, the positioning pin 303p and the hole portion 301h3 are inside a region between a half line that passes the central axis of the lens mount 301 and the first adjacent terminal, and a half line that passes the central axis of the lens mount 301 and the third adjacent terminal.

Furthermore, when viewed in the central axis direction of the lens mount 301, the positioning pin 303p and the hole portion 301h3 are inside a region between a half line that passes the central axis of the lens mount 301 and the reference terminal, and a half line that passes the central axis of the lens mount 301 and the third adjacent terminal.

Note that the center of the terminal surface is, when the terminal surface is rectangular, an intersection of the two diagonal lines of the terminal surface when viewed in the optical axis direction. In a case in which the terminal surface is rectangular, or is not rectangular and has a round shape, or the like, the center of the terminal surface may be, when viewed in the optical axis direction, the center of gravity of the terminal surface.

Furthermore, in the present exemplary embodiment, as illustrated in FIGS. 9A, 9B, and 11, the terminal surface 303c that is the lens-side TYPE terminal is not inside angle range C. In other words, when viewed in the central axis direction of the lens mount 301, a half line that passes the terminal surface 303c that is the lens-side TYPE terminal that distinguishes the type of accessory mounted on the camera, and the central axis of the lens mount 301 passes the cutaway between the plurality of second bayonet claw portions.

Modifications

While a preferable embodiment of the present disclosure has been described above, the present disclosure is not limited to the embodiment and may be deformed and modified within the gist of the present disclosure.

For example, in the present exemplary embodiment, the configuration of the interchangeable lens assembly 100 has been described by exemplifying an interchangeable lens assembly 100 serving as the optical apparatus; however, the optical apparatus of the present disclosure is not limited to the interchangeable lens assembly 100. For example, an adapter that can be interposed between the interchangeable lens assembly 100 and the camera body 10 may serve as the optical apparatus (the accessory) of the present disclosure, and a mount of the adapter on the interchangeable lens assembly 100 side may be the mount having the same configuration as that of the interchangeable lens assembly 100. Whether in the interchangeable lens assembly 100, or in the adapter, a member to which the lens mount 301 is fixed with the fastening screws 304a to 304d is referred to as the accessory main body.

Furthermore, in the present exemplary embodiment, a configuration in which the holding member 303 includes the positioning pin 303p, and the lens mount 301 includes the hole portion 301h3 has been described. However, the present disclosure is not limited to such a configuration, and the holding member 303 may include a hole portion or a recess, and the lens mount 301 may include a protrusion that engages with the hole portion or the recess. In other words, between the holding member 303 and the lens mount 301, either one may include a protrusion, and the other one may include a hole portion or a recess.

Furthermore, the three bayonet claw portions provided in the mounts in the exemplary embodiment described above may each be divided so as to be further divided into segments. In other words, a single bayonet claw portion may be formed as a collection of a plurality of bayonet claw portions (a group of bayonet claw portions). For example, the above corresponds to a case in which a groove portion is provided in a single bayonet claw portion. In such a case, the angle range of the group of bayonet claw portions arranged in the circumferential direction of each mount is as in the exemplary embodiment described above.

Furthermore, in the exemplary embodiment described above, a configuration has been described in which a device that includes either one of the camera mount and the accessory mount is actually rotated relative to a device that includes the other one of the camera mount and the accessory mount to bayonet couple the devices to each other; however, the configuration is not limited to the above configuration. For example, a configuration that allows the camera mount and the accessory mount to be bayonet coupled to each other by having the camera mount and the accessory mount be relatively rotated against each other may be employed. Hereinafter, the detail of the above will be described specifically.

Figure 12:
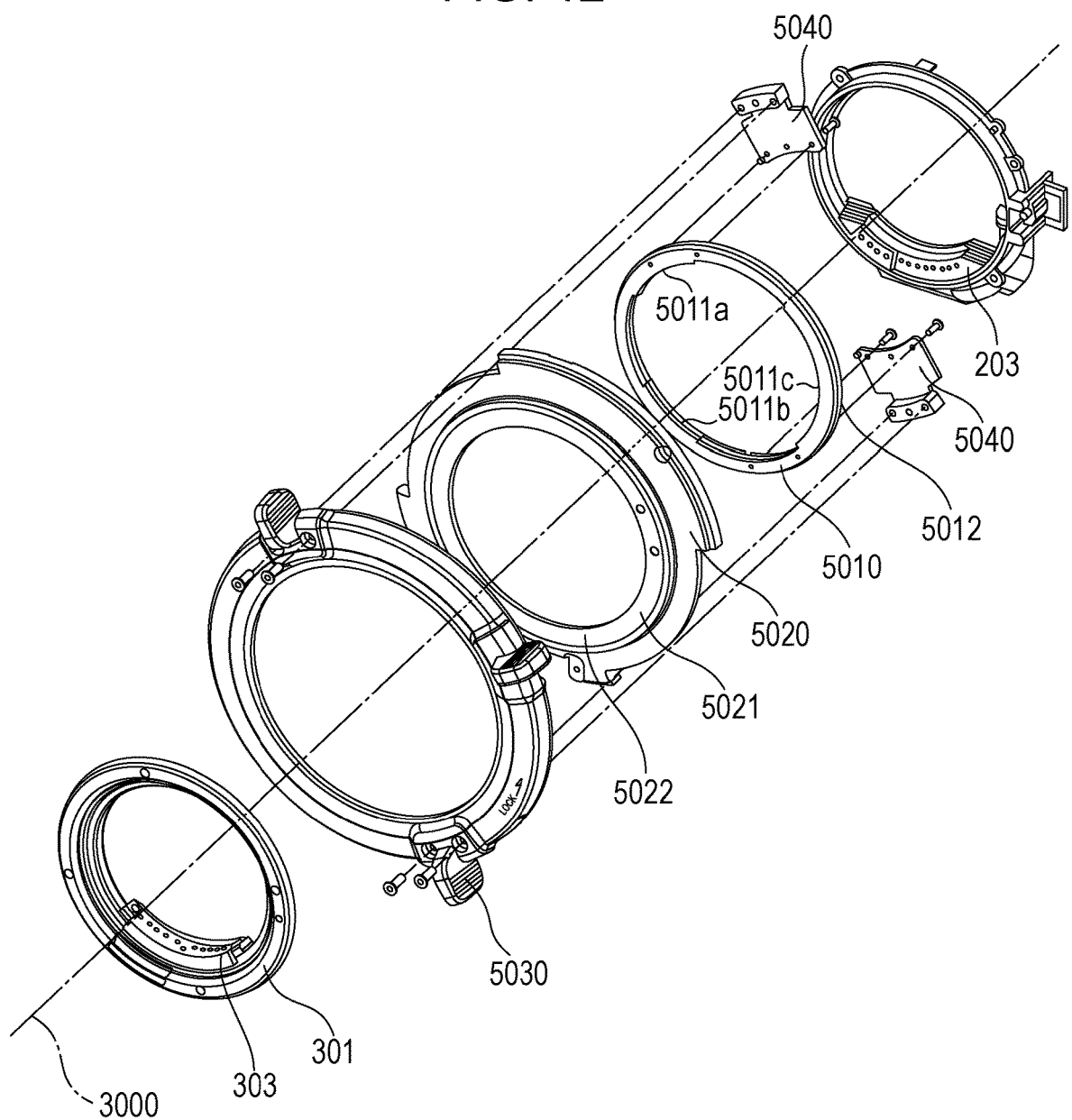
FIG. 12 is an exploded perspective view of a mount mechanism according to a modification.
Figure 13A:
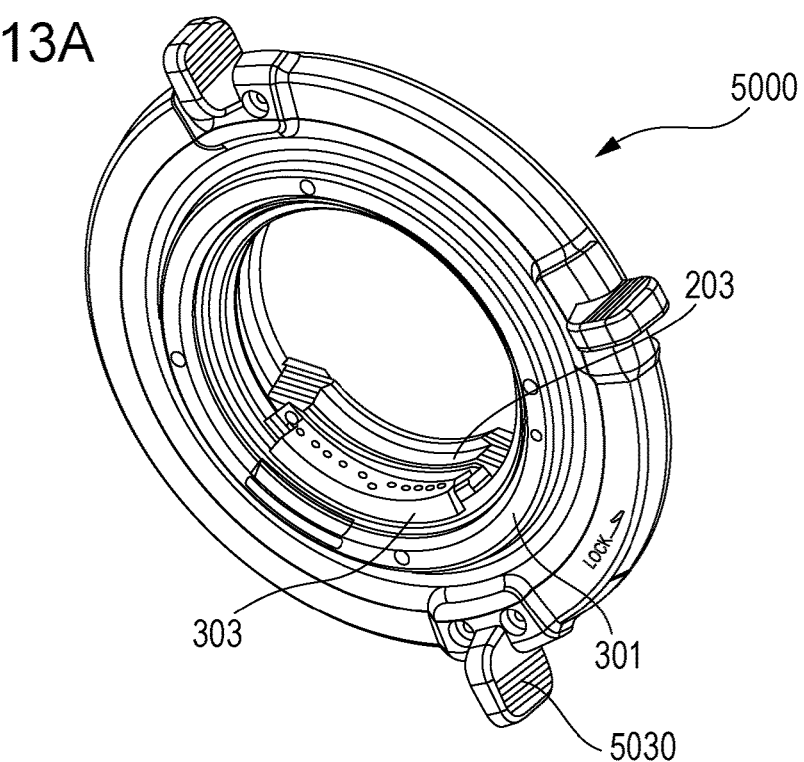
FIGS. 13A to 13C are drawings illustrating a mount mechanism according to the modification in a non-connected state.
Figure 13B:
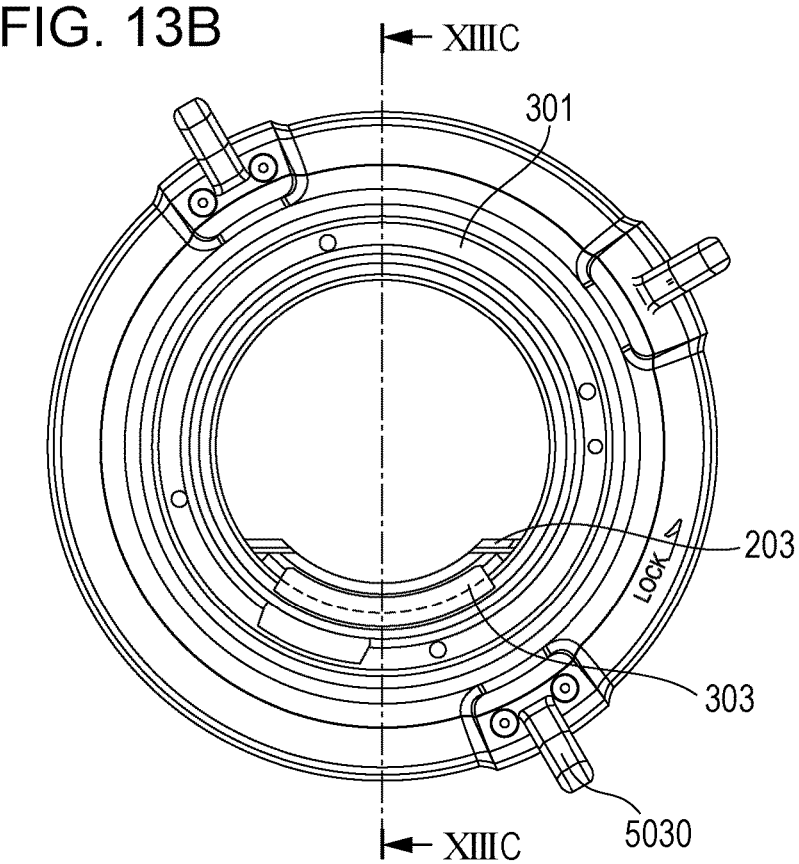
Figure 13C:
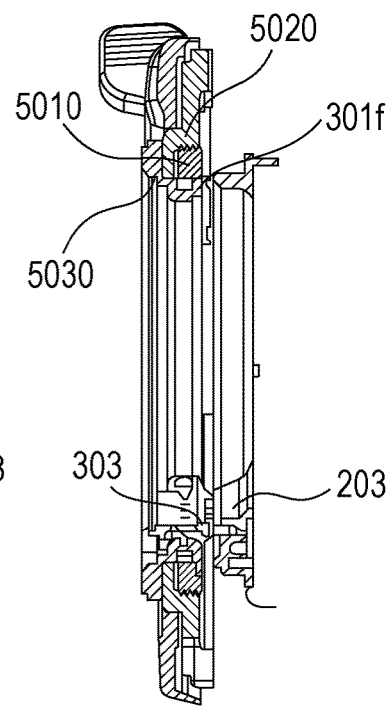
Figure 14A:
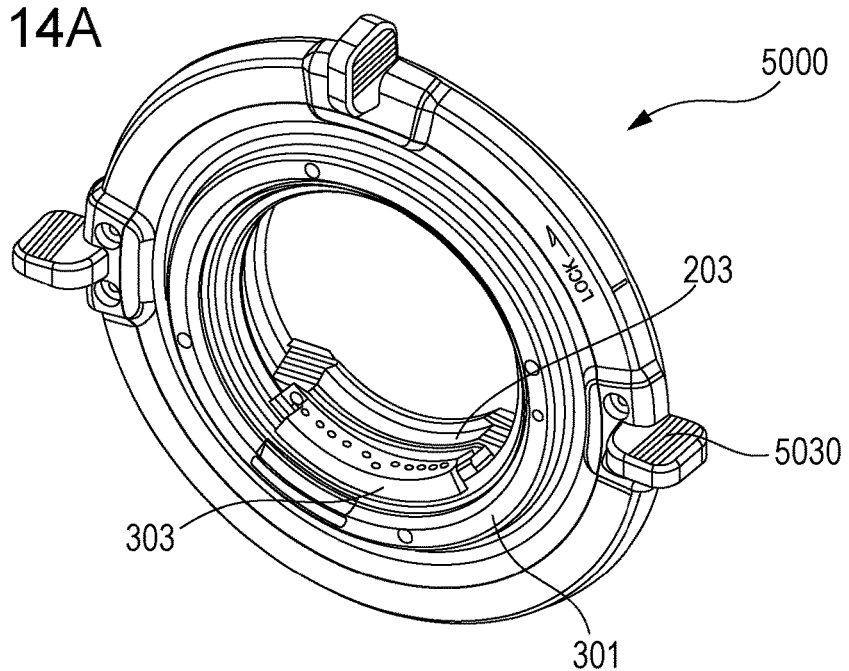
FIGS. 14A to 14C are diagrams illustrating the mount mechanism according to the modification in a connected state.
Figure 14B:
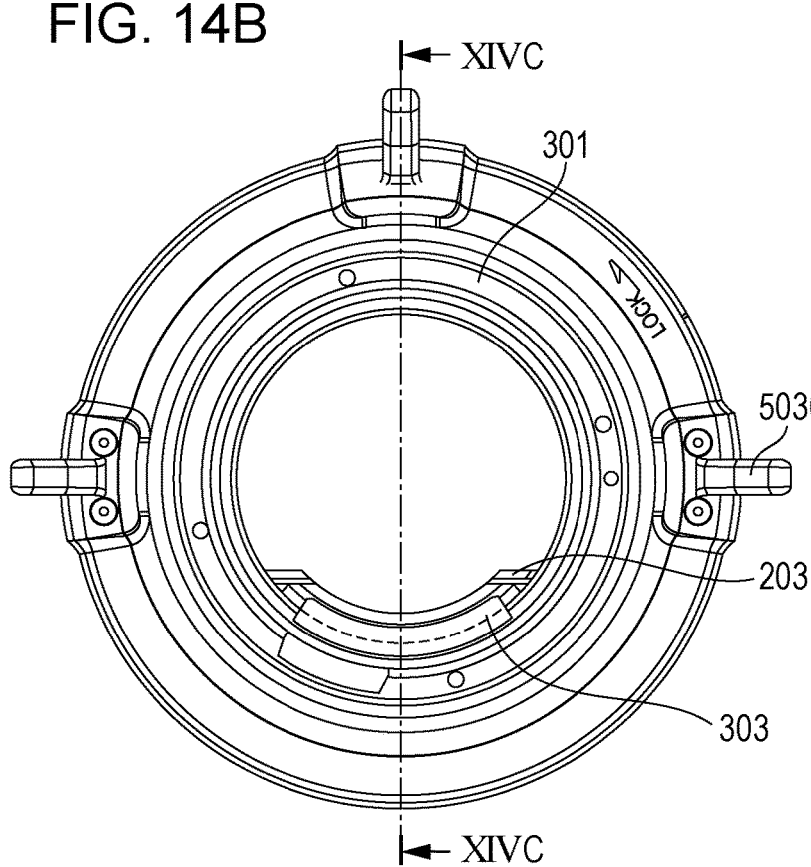
Figure 14C:
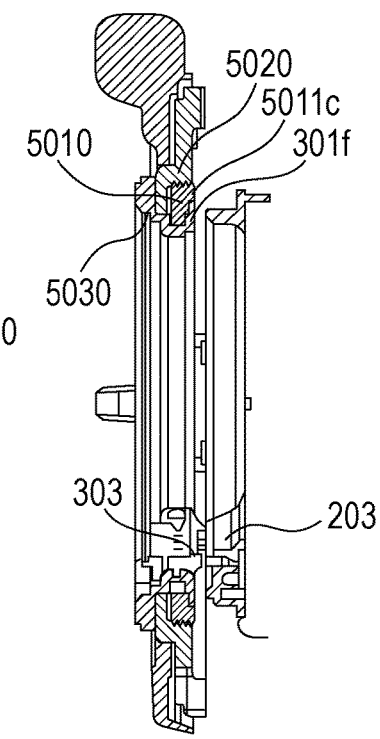

FIG. 12 is an exploded perspective view of a mount mechanism 5000 according to a modification of the present disclosure. FIGS. 13A to 13C are diagrams that exemplify a non-connected state of the mount mechanism 5000 according to the modification of the present disclosure. FIGS. 14A to 14C are diagrams that exemplify a connected state of the mount mechanism 5000 according to the modification of the present disclosure. Note that in FIGS. 12 to 14C, for the sake of description, a movable mount portion 5010 of the mount mechanism 5000, and a lens mount 301 that is capable of being bayonet coupled to the movable mount portion 5010 of the mount mechanism 5000 are illustrated at the same time. Furthermore, description of members that are the same as those of the exemplary embodiment is omitted and the same reference numerals are attached to the members.

As illustrated in FIG. 12, in the mount mechanism 5000 of the present modification, an operation portion 5030, a fixed mount portion 5020, the movable mount portion 5010, a contact point holding member 203 that have an optical axis 3000 as the central axis are disposed in that order from the side on which the lens mount 301 is attached. The operation member 5030 is a ring-shaped operation member rotatable about the central axis, and is connected to the movable mount portion 5010 with arm portions 5040 and screws. Note that in the present modification, the operation portion 5030 and the movable mount portion 5010 are fixed to each other at two portions using two arm portions 5040 disposed in a direction orthogonal to the central axis. With the above configuration, the movable mount portion 5010 is also rotated about the central axis in accordance with the rotating operation of the operation portion 5030 in an integrated manner.

Movable mount claw portions 5011a, 5011b, and 5011c capable of being bayonet coupled to bayonet claw portions 301a to 301c provided in the lens mount 301 are provided in the movable mount portion 5010. Furthermore, a screw portion 5012 threaded about the central axis is provided in the movable mount portion 5010. The state in which the screw portion 5012 and a screw portion 5022 of the fixed mount portion 5020 described later are screwed to each other changes in accordance with the rotation of the movable mount portion 5010 about the central axis.

The fixed mount portion 5020 includes a camera mount surface 5021 that abuts against a mount surface of the lens mount 301, and the screw portion 5022 that is screwed to the screw portion 5012 of the movable mount portion 5010 described above. Different from the movable mount portion 5010 described above, the fixed mount portion 5020 does not rotate about the central axis in accordance with the rotating operation of the operation portion 5030.

Referring next to FIGS. 13A to 14C, a bayonet coupling method of the mount mechanism according to the present modification will be described. Note that while in a state in which the bayonet claw portions are inserted in an opening portion of the operation member 5030 and an opening portion of the fixed mount portion 5020, the bayonet claw portions provided on the lens mount 301 are engageable with the movable mount claw portions 5011a to 5011c of the movable mount portion 5010. In the state illustrated in FIGS. 13A to 13C, the operation portion 5030 is positioned in the unlocking position. In the above state, while a lens mount surface of the lens mount 301 and the camera mount surface 5021 of the fixed mount portion 5020 abut against each other, the claw portions of the lens mount 301 and the claw portions of the movable mount portion 5010 do not engage or overlap each other when viewed in the central axis direction. FIG. 13C is a cross-sectional diagram taken along cross-section XIIIC-XIIIC in FIG. 13B. FIGS. 14A to 14C illustrate an exemplification of the mount mechanism 5000 in a state in which the rotation operation has been performed on the operation portion 5030 from the above state.

In the state illustrated in FIGS. 14A to 14C, the operation portion 5030 is positioned in the locking position. In the above state, when viewed in the central axis direction, the claw portions of the lens mount 301 and the claw portions of the movable mount portion 5010 overlap each other to engage with each other in the central axis direction. FIG. 14C is a cross-sectional diagram taken along cross-section XIVC-XIVC in FIG. 14B. As illustrated in FIGS. 13C and 14C, the movable mount portion 5010 moves away from the fixed mount portion 5020 in a center axis direction of the mount depend on a non-locking state of the mount mechanism 5000 changing in a lock state of the mount mechanism 5000. Furthermore, in the above state, in accordance with the rotating operation of the operation member 5030, the state in which the screw portion 5022 of the fixed mount portion 5020 and the screw portion of the movable mount portion 5010 are screwed to each other changes and the movable mount portion 5010 moves in the central axis direction towards the image pickup apparatus side. With the above configuration, the movable mount claw portions 5011a to 5011c engaged with the bayonet claw portions on the lens mount 301 side each move towards the image pickup apparatus side.

As described above, in the mount mechanism 5000 of the present modification, by having the movable mount portion including the claw portions that can be engaged with the claw portions on the lens mount side be rotated about the central axis, the movable mount portion can be moved in the central axis direction relative to the fixed mount portion. With such a configuration, in a state in which the lens mount and the camera-side mount are connected to each other, the mount mechanism 5000 of the present modification can reduce the occurrence of the gap (the space) created between the lens mount and the camera-side mount.

Note that in the modification described above, a configuration in which the mount mechanism 5000 is provided on the image pickup apparatus side has been described; however, the present disclosure can be applied to, for example, a configuration in which the mount mechanism 5000 is provided on the camera accessory side such as the interchangeable lens assembly side.

As described above, for example, in the present exemplary embodiment, the configuration of the interchangeable lens assembly 100 has been described by exemplifying an interchangeable lens assembly 100 serving as the optical apparatus; however, the optical apparatus of the present disclosure is not limited to the interchangeable lens assembly 100. For example, an adapter that can be interposed between the interchangeable lens assembly 100 and the camera body 10 may serve as the optical apparatus (the accessory) of the present disclosure. Hereinafter, a more detailed description of this adapter will be given.

Figure 15A:
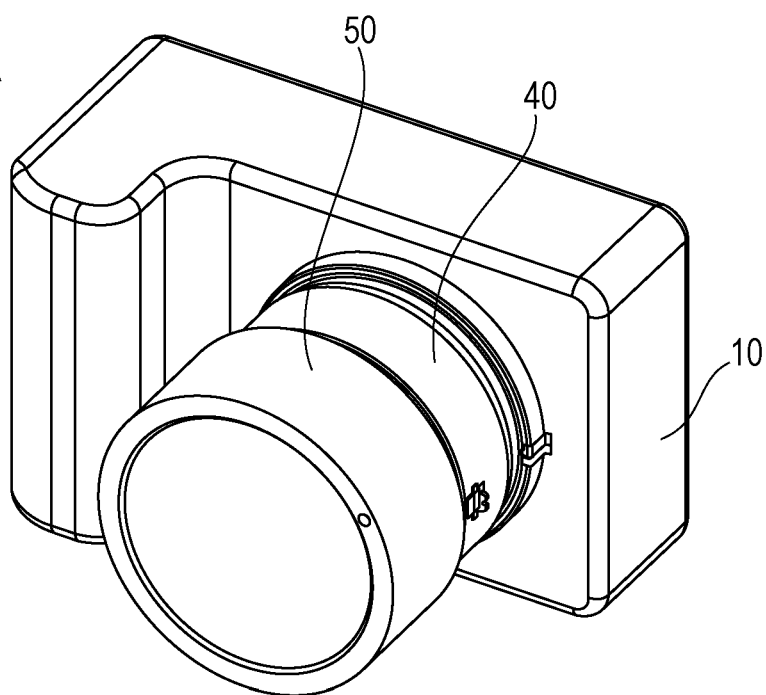
FIGS. 15A and 15B are diagrams describing a first conversion adapter that is mountable to the camera body, and a second interchangeable lens assembly.
Figure 15B:
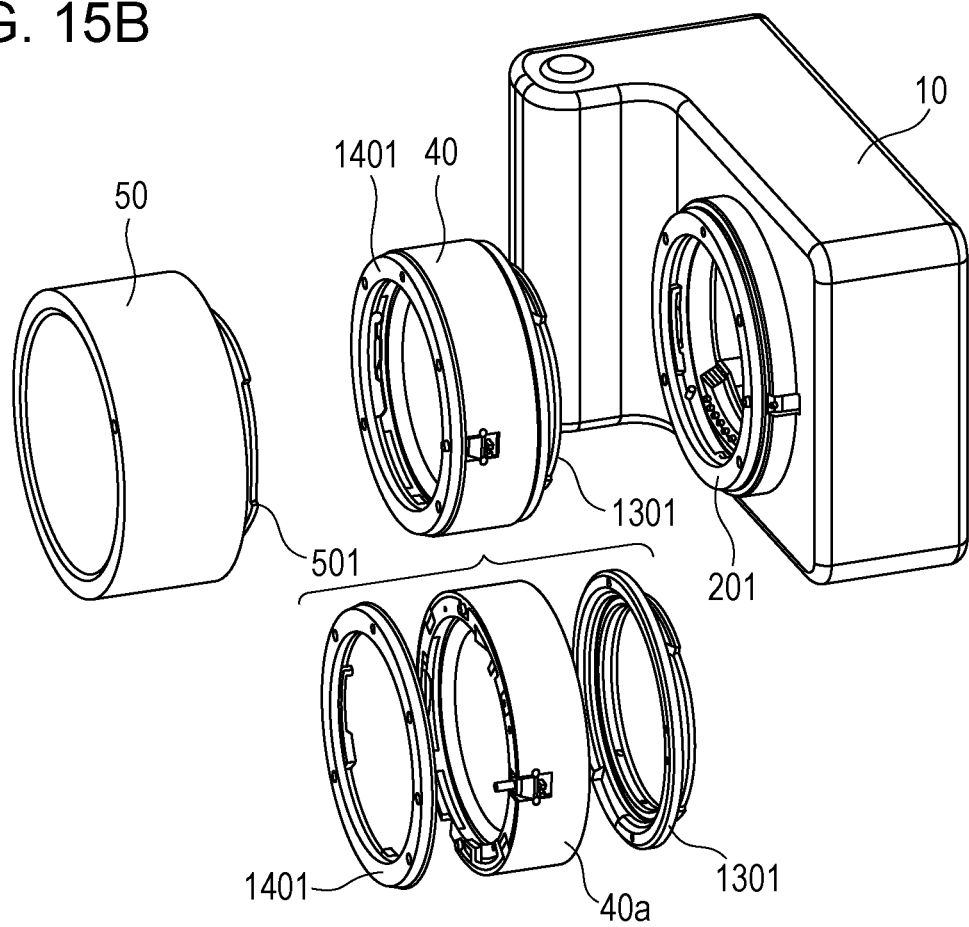

Firstly, the basic configuration of a conversion adapter (adapter device) that is a camera accessory mountable to the camera mount 201 of the above-described camera body 10 will be described with reference to FIGS. 15A through 16B. FIGS. 15A and 15B are diagrams describing a first conversion adapter 40 that is mountable to the camera body 10, and a second interchangeable lens assembly 50. FIG. 15A illustrates an external perspective view of the second interchangeable lens assembly 50 having been mounted to the camera body 10 via the first conversion adapter 40. FIG. 15B illustrates an external perspective view of a state where the camera body 10, first conversion adapter 40, and second interchangeable lens assembly 50 have each been detached. Note that the second interchangeable lens assembly (hereinafter referred to as second lens) 50 has a lens mount 501 that is short in flange focal distance, but has the same mount diameter as the camera mount 201, as to the camera body 10. That is to say, the second lens 50 has the same mount diameter as the above-described first lens 100, but unlike the first lens 100, is a camera accessory that is not compatible with direct mounting to the camera body 10.

Figure 16A:
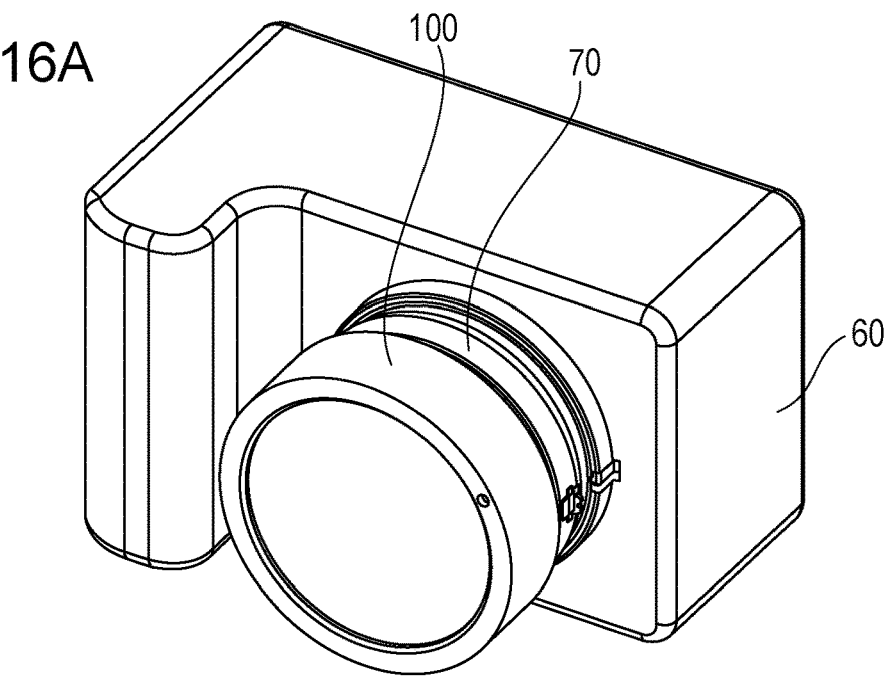
FIGS. 16A and 16B are diagrams describing a second conversion adapter that is mountable to a camera body, and the first interchangeable lens assembly.
Figure 16B:
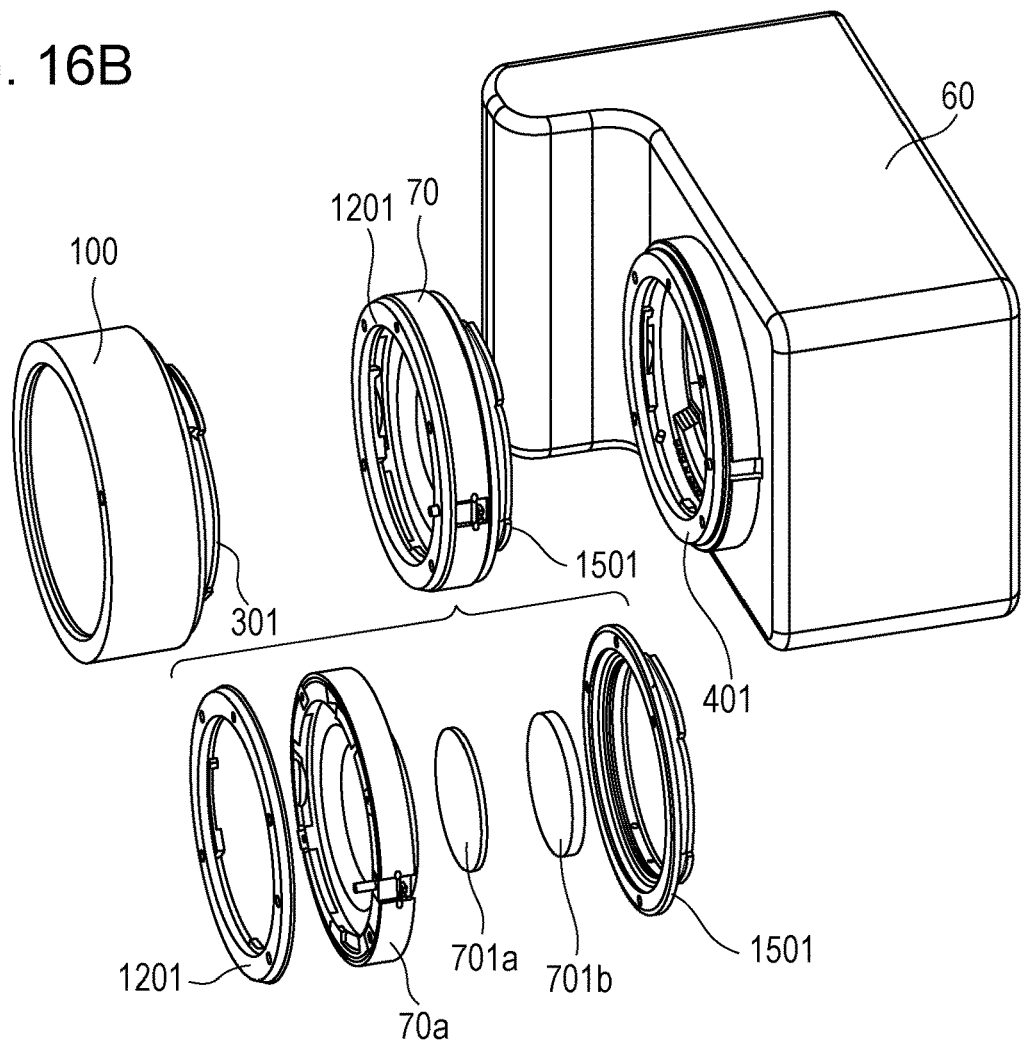

FIGS. 16A and 16B are diagrams for describing a second conversion adapter 70 that is mountable to a camera body 60 and the first lens 100. FIG. 16A illustrates an external perspective view of a state where the first lens 100 is mounted to the camera body 60 via the second conversion adapter 70, and FIG. 16B illustrates an external perspective view where the camera body 60, second conversion adapter 70, and first lens 100 have each been detached.

Now, in a case where an interchangeable lens assembly with a long flange focal distance is directly mounted to an imaging apparatus with a short flange focal distance, trouble will occur such as the focal point not being formed at an accurate position or the like, and imaging a subject in this way will result in an unnatural image being obtained. For example, the above problem will occur if the second lens 50 that has a long flange focal distance is mounted to the above-described camera body 10.

In the same way, in a case where an interchangeable lens assembly with a short flange focal distance is directly mounted to an imaging apparatus with a long flange focal distance, trouble will occur such as the focal point not being formed at an accurate position or the like, and imaging a subject in this way will result in an unnatural image being obtained. For example, the above problem will occur if the first lens 100 that has a short flange focal distance is mounted to the camera body 60 serving as a second imaging apparatus that has a longer flange focal distance than the above-described camera body 10.

Particularly, the camera body 10 and camera body 60, and the first lens 100 and second lens 50, have the same mount diameter, it is difficult for a user to judge which imaging apparatuses and which interchangeable lens assemblies have flange focal distances that are compatible for direct mounting.

Accordingly, it is preferable that only interchangeable lens assemblies that are compatible can be directly mounted to a certain imaging apparatus, so that imaging apparatuses and interchangeable lens assemblies that have mutually incompatible flange focal distances are not erroneously directly mounted.

Also, in a case of mounting an incompatible interchangeable lens assembly to an imaging apparatus, a conversion adapter needs to be interposed between the two to adjust the flange focal distance. However, in a case where one side of the conversion adapter is mounted to the imaging apparatus and an interchangeable lens assembly compatible with direct mounting to the imaging apparatus is mounted to the other side of the conversion adapter, the focal point may not be accurately formed, as described above. Accordingly, the one side and other side of the conversion adapter preferably have configurations to restrict imaging apparatuses and camera accessories that are directly mountable.

Specifically, in a case of mounting an interchangeable lens assembly having a long flange focal distance to an imaging apparatus having a short flange focal distance, a conversion adapter is preferable where one end side is only mountable to this imaging apparatus, and the other end side is only mountable to this interchangeable lens assembly. Also, in a case of mounting an interchangeable lens assembly having a short flange focal distance to an imaging apparatus having a long flange focal distance, a conversion adapter is preferable where one end side is only mountable to this imaging apparatus, and the other end side is only mountable to this interchangeable lens assembly.

The first conversion adapter 40 has the lens mount 1301 attached to an adapter barrel 40a by fastening screws (omitted from illustration), at one end side in the optical axis direction. This lens mount 1301 is an accessory mount that is detachable from the camera mount 201 provided to the camera body 10 described above.

A camera mount 1401 is attached to the adapter barrel 40a by fastening screws (omitted from illustration), at the other end side of the first conversion adapter 40 in the optical axis direction. This camera mount 1401 is a camera mount that is detachable from the lens mount 501 of the second lens 50. Note that the camera mount 1401 of the first conversion adapter 40 is attached so that the imaging plane of the imaging sensor 11 of the will be situated at a position corresponding to the flange focal distance of the second lens 50.

The second conversion adapter 70 has the lens mount 1501 attached to an adapter barrel 70a by fastening screws (omitted from illustration), at one end side in the optical axis direction. This lens mount 1501 is an accessory mount that is detachable from the camera mount 401 provided to the camera body 60.

The camera mount 1201 is attached to the adapter barrel 70a by fastening screws (omitted from illustration), at the other end side of the second conversion adapter 70 in the optical axis direction. This camera mount 1201 is a camera mount that is detachable from the lens mount 301 of the first lens 100, as described above.

Note that a first optical member 701a and a second optical member 701b are provided to the second conversion adapter 70, between the adapter barrel 70a and the lens mount 1501 in the optical axis direction. The first optical member 701a and second optical member 701b enable the second conversion adapter 70 to extend length of the flange focal distance of the first lens 100 in accordance with the imaging plane of the imaging sensor disposed in the camera body 60. While the optical members have been illustrated as two lenses for the sake of convenience, this is not restrictive.

Figure 17A:
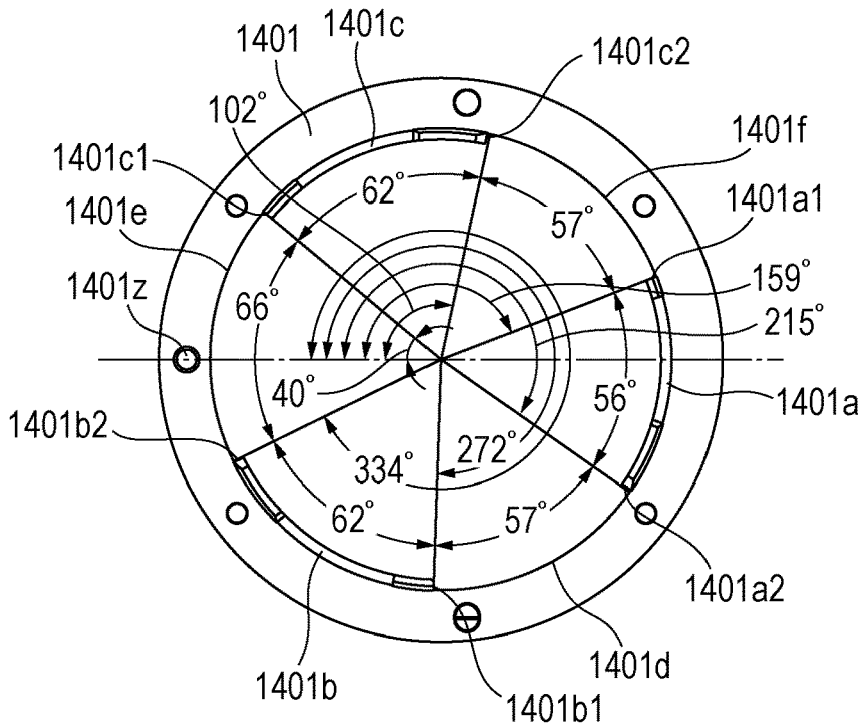
FIGS. 17A through 17C is a diagram for exemplarily describing angle so disposing bayonet claw portions in a camera mount provided on one end of the first conversion adapter.
Figure 17B:
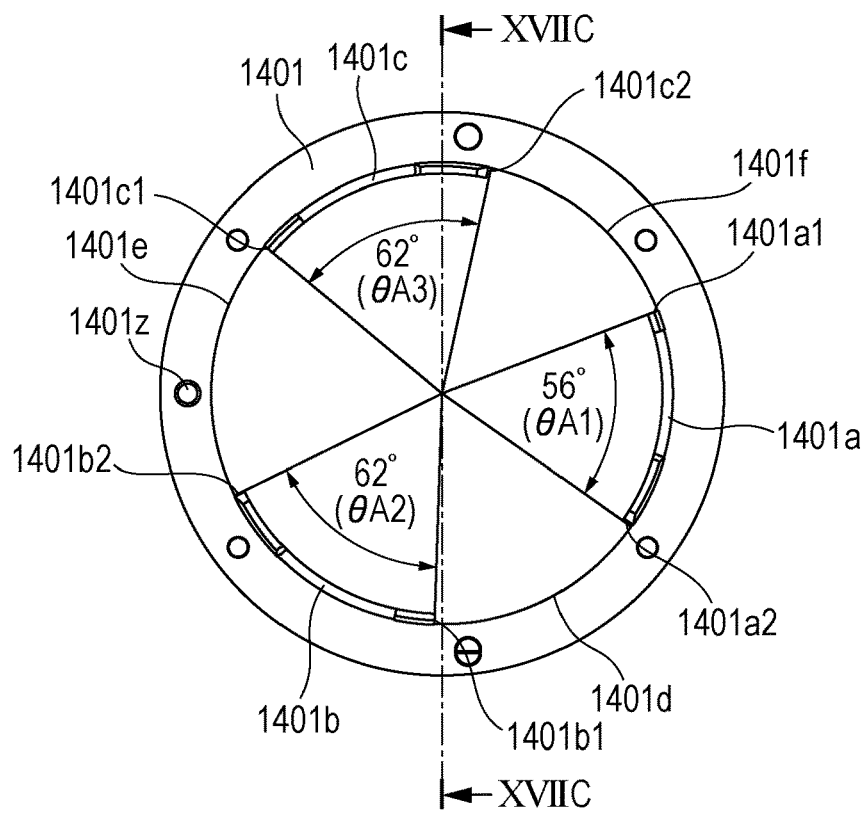
Figure 17C:
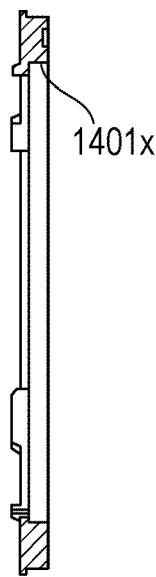

Next, the angles (phases) at which bayonet claw portions are disposed on the circumferential direction of the camera mount and lens mount of the first conversion adapter 40 will be described with reference to FIG. 17A through FIG. 21D. FIGS. 17A through 21D are diagrams for exemplarily describing displacement angles of bayonet claw portions in the camera mount 1401 provided on one end of the first conversion adapter 40. FIG. 17A is a diagram illustrating angle ranges that camera claw portions and camera cutaways occupy in the circumferential direction of the camera mount 1401 with the lock pin 1401z as a reference, as viewed from the rear face side (camera body 10 side). FIG. 17B is a diagram illustrating angle ranges that multiple camera claw portions 1401a through 1401c occupy in the circumferential direction of the camera mount 1401, as viewed from the rear face side (camera body 10 side). FIG. 17C is a cross-sectional diagram taken along cross-section XVIIB-XVIIB in FIG. 17B.

The first conversion adapter 40 is a mount adapter used for mounting the second lens 50 that has a long flange focal distance to the camera body 10 that has a short flange focal distance. Accordingly, it is preferable for the first conversion adapter 40 to be configured such that the camera body 60 that has a long flange focal distance cannot be directly mounted to the lens mount 1301, and the first lens 100 that has a short flange focal distance cannot be directly mounted to the camera mount 1401. According to this configuration, the positional relation of claw portions and cutaways can be satisfied so that the lens mount 1301 provided to one end (first end) of the first conversion adapter 40 and the camera mount 1401 provided to the other end (second end) cannot each be directly mounted.

A first camera claw portion 1401a, second camera claw portion 1401b, and third camera claw portion 1401c, are provided in order, to the camera mount 1401 in the circumferential direction (inner radial direction). When viewing the camera mount 1401 from the rear face side as illustrated in FIG. 17A, the camera claw portion that is provided at a position farthest from the lock pin 1401z is the first camera claw portion 1401a. The second camera claw portion 1401b and third camera claw portion 1401c are then consecutively provided in order from the first camera claw portion 1401a in a clockwise direction.

Also, cutaways which are a first camera cutaway 1401d, second camera cutaway 1401e, and third camera cutaway 1401f are provided in order, to the camera mount 1401 in the circumferential direction (inner radial direction). When viewing the camera mount 1401 from the rear face side as illustrated in FIG. 17A, the cutaway that is provided at a position nearest to the lock pin 1401z is the second camera cutaway 1401e. The third camera cutaway 1401f and first camera cutaway 1401d are then consecutively provided in order from the second camera cutaway 1401e in a clockwise direction.

As illustrated in FIG. 17C, a fitting member 1401x that restricts movement of the camera accessory in a direction parallel to the optical axis when the camera accessory is mounted, is provided to the camera mount 1401 side. In the present embodiment, the diameter of the fitting member 1401x in a direction orthogonal to the optical axis at the camera mount 1401 side is the mount diameter.

The way of bayonet coupling of the first conversion adapter 40 and second lens 50 is the generally the same as the way of bayonet coupling of the camera body 10 and first lens 100 described above, so description will be omitted.

Note that the end portions of the camera claw portions 1401a, 1401b, and 1401c, in the circumferential direction, will be referred to as first end portion 1401a1, second end portion 1401a2, third end portion 1401b1, fourth end portion 1401b2, fifth end portion 1401c1, and end portion 1401c2, for the sake of description. The end portions are denoted with part numerals in order from the first camera claw portion 1401a in the clockwise direction, when viewing the camera mount 1401 from the rear face side, as described above.

As illustrated in FIG. 17A, the angles that the camera claw portions and camera cutaways occupy in the circumferential direction of the camera mount 1401 (angle ranges) in the first conversion adapter 40 according to the present embodiment are stipulated as follows. For the first camera claw portion 1401a, the angle θA1=56°, for the second camera claw portion 1401b, the angle θA2=62°, and for the third camera claw portion 1401c, the angle θA3=62°. Also, for the first camera cutaway 1401d, the angle is 57°, for the second camera cutaway 1401e, the angle is 66°, and for the third camera cutaway 1401f, the angle is 57°. That is to say the camera mount 1401 has different angles for the camera claw portions with respect to the above-described camera mount 201 of the camera body 10, but the angles of the camera cutaways are the same.

Also, when viewing the camera claw portions from the rear face side of the first conversion adapter 40, the angles where the camera claw portions are disposed on the circumferential direction of the camera mount 1401 with the position of the lock pin 402 (referred to as reference position) as a reference are stipulated as follows. The first camera claw portion 1401a is disposed between 159° to 215° with the reference position as a start point. The second camera claw portion 1401b is disposed between 272° to 334° with the reference position as a start point. The third camera claw portion 1401c is disposed between 40° to 102° with the reference position as a start point.

Figure 18A:
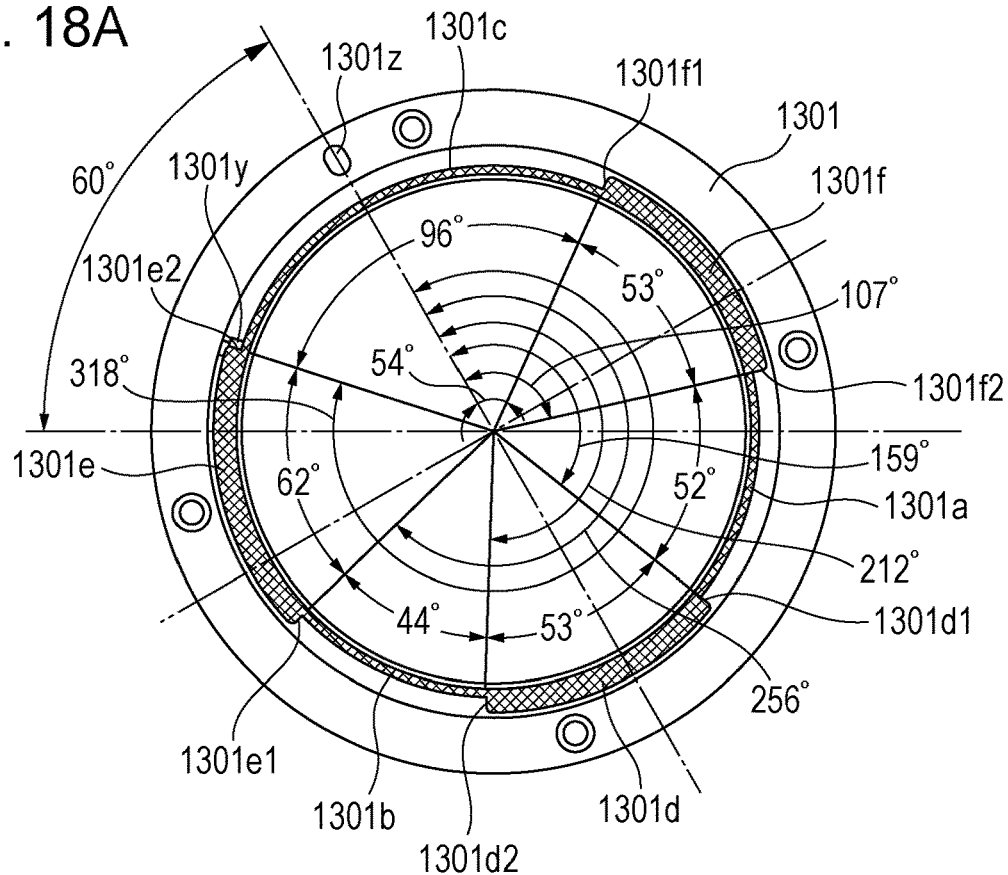
FIGS. 18A and 18B are diagrams exemplarily describing angle so disposing bayonet claw portions in the lens mount provided on the other end of the first conversion adapter.
Figure 18B:
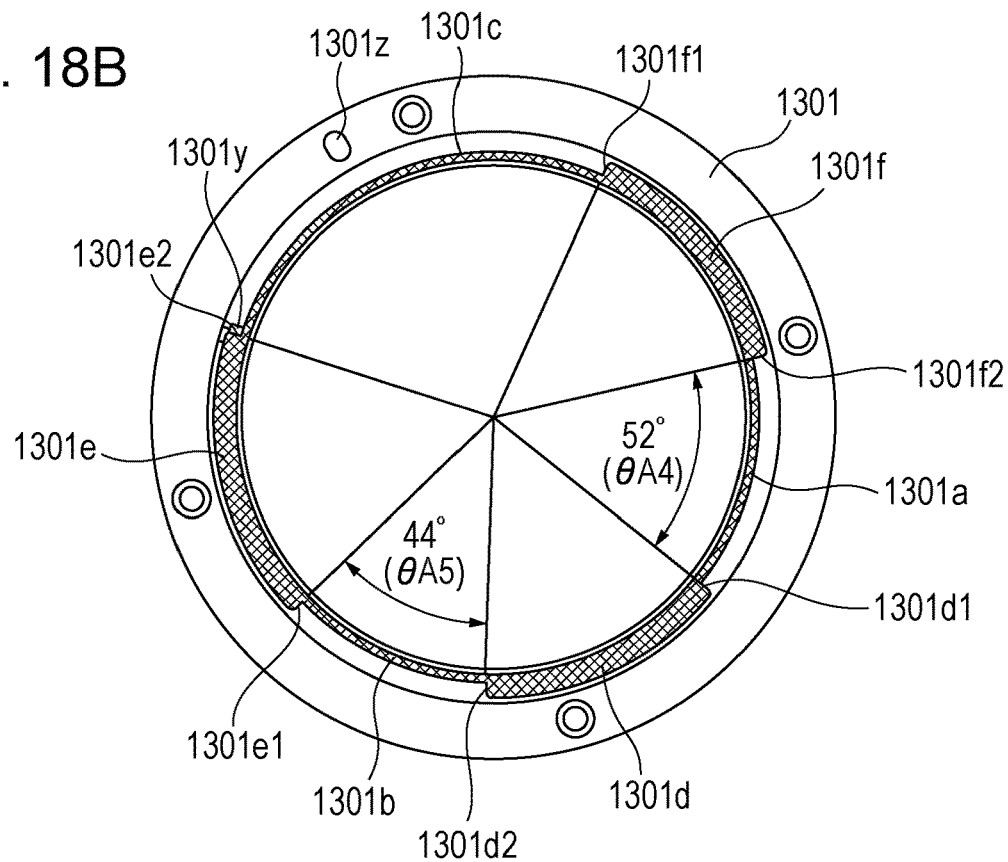

Next, FIGS. 18A and 18B are diagrams exemplarily describing angles of disposing the bayonet claw portions on the lens mount 1301 provided to the other end of the first conversion adapter 40. FIG. 18A is a diagram illustrating angle ranges that camera claw portions and camera cutaways occupy in the circumferential direction of the camera mount 1401 with the lock groove 1301z as a reference, as viewed from the rear face side. FIG. 18B is a diagram illustrating angle ranges that multiple lens cutaways 1301a through 1301c occupy in the circumferential direction of the lens mount 1301, as viewed from the rear face side.

The angles (angle ranges) that the lens cutaways occupy in the circumferential direction of the lens mount 1301 are, represented by θA4 as the angle of the first lens cutaway 1301a and θA5 as the angle of the second lens cutaway 1301b, as illustrated in FIG. 18B. Note that the angle so disposing the claw portions and cutaways on the lens mount 1301 of the first conversion adapter 40 is the same as the lens mount 301 of the first lens 100 described above, and accordingly description will be omitted.

The angles of the claw portions and cutaways in the circumferential direction, on the lens mount 1301 and camera mount 1401 provided to the first conversion adapter 40, will be compared. For example, at the lens mount 1301 side, the angle θA5 of the second lens cutaway 1301b having the smallest angle is 44°, whereas, at the camera mount 1401 side, the angle θA1 of first camera claw portion 1401a having the smallest angle is 56°. That is to say, the claw portion having the smallest angle at the camera mount 1401 side is larger than the cutaway having the smallest angle at the lens mount 1301 side (θA5<θA1). In this case, of the cutaways on the lens mount 1301 side and the claw portions on the camera mount 1401 side, at least one or more lens cutaway and camera claw portions will interfere with each other. Accordingly, even if an attempt is made to mount the interchangeable lens assembly to the camera body so that the optical axis at the camera mount 1401 side and lens mount 1301 side are generally parallel, the claw portions and cutaways interfere, so the interchangeable lens assembly cannot be mounted to the camera body.

Figure 19A:
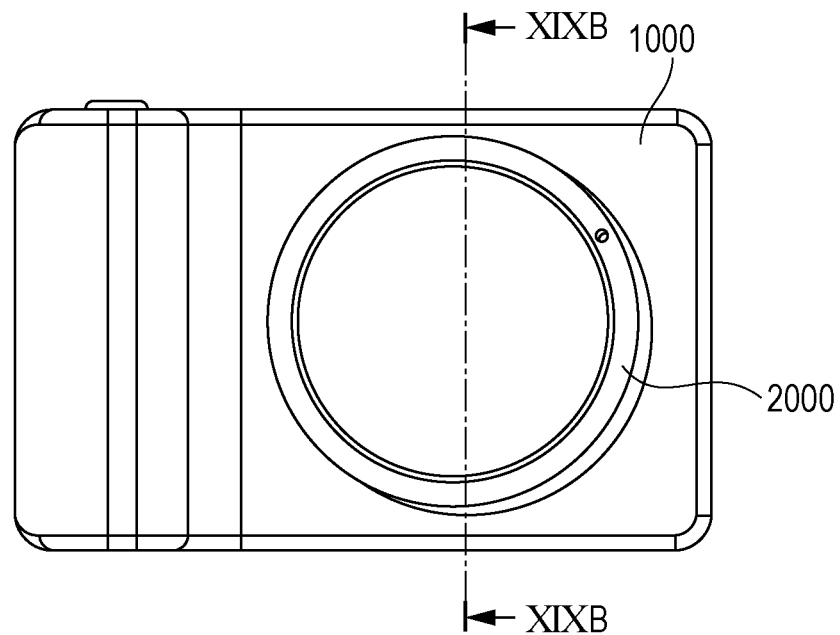
FIGS. 19A and 19B are diagrams exemplarily describing a mounting method of a predetermined imaging apparatus and a predetermined interchangeable lens assembly having claw portions and recesses that interfere with each other.
Figure 19B:
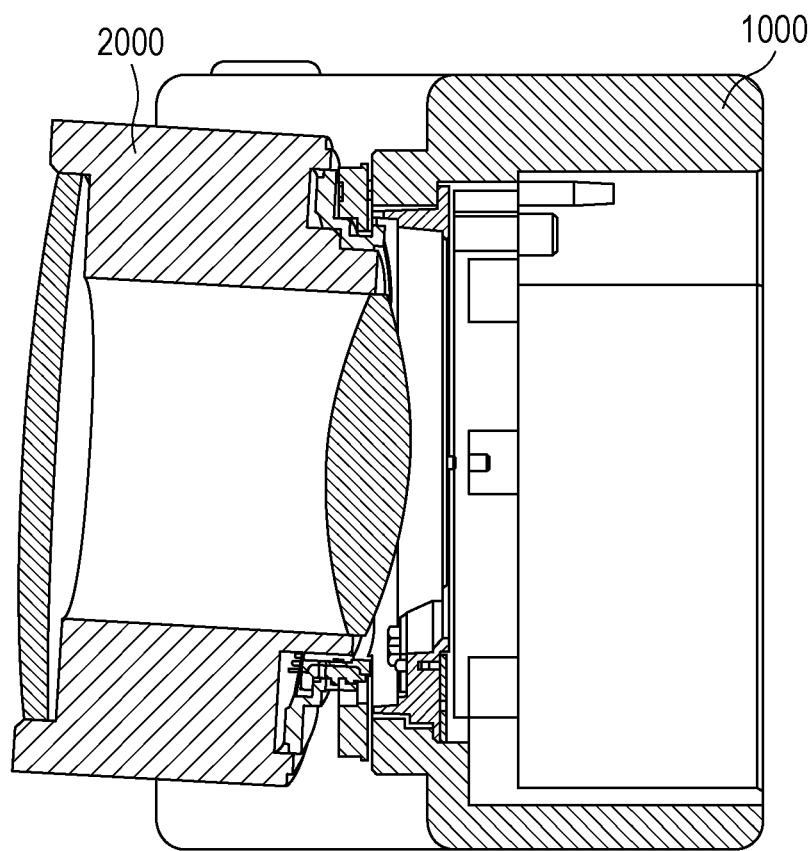

However, if only one claw portion and cutaway are interfering, there may be cases where claw portions of the camera mount side can be inserted into cutaways of the lens mount side. FIGS. 19A and 19B are diagrams exemplarily describing a mounting method of a predetermined imaging apparatus 1000 and a predetermined interchangeable lens assembly 2000 having claw portions and cutaways that interfere with each other. FIG. 15A is a diagram exemplarily describing a frontal view of partway through mounting a predetermined interchangeable lens assembly to a predetermined imaging apparatus that have claw portions and cutaways that interfere with each other. FIG. 19B is a cross-sectional view taken along cross-section XIXB-XIXB in FIG. 19A.

For example, in a state where the optical axis of the lens mount side is obliquely inclined as to the optical axis of the camera mount side, one end of a camera claw portion is inserted into a lens cutaway, and from this state, the lens mount and camera mount are rotated relatively to each other, as illustrated in FIGS. 15A and 15B. In this case, even if the camera claw portions and lens cutaways originally interfere with each other, this interference with each other is resolved during the relative rotation of the lens mount and camera mount, and transition can be made to a state where the camera claw portion is inserted into this lens cutaway. In this case, if there are no other camera claw portions and lens cutaways interfering, the interchangeable lens assembly can be mounted to the camera body.

Accordingly, the claw portions and cutaways on the lens mount 1301 side and camera mount 1401 side are disposed such that the angle of a predetermined lens cutaway adjacent to a reference lens claw portion is smaller than the angle of two camera claw portions adjacent to a reference camera cutaway. Specifically, in the present embodiment, the angles θA4 and θA5 of the first lens cutaway 1301a and second lens cutaway 1301b adjacent to the first lens claw portion 1301d are smaller than the angles θA1 and θA2 of the first camera claw portion 1401a and second camera claw portion 1401b adjacent to the first camera cutaway 1401d. That is to say, θA4 (520) is smaller than θA1 (560), and θA5 (440) is smaller than θA2 (620) (θA4<θA1, θA5<θA2). Accordingly, even if an attempt is made to insert the first lens claw portion 1301d into the first camera cutaway 1401d, the second lens claw portion 1301e interferes with the second camera claw portion 1401b in a sure manner, as well does the third lens claw portion 1301f with the first camera claw portion 1401a, as illustrated in FIGS. 20A and 20B.

Figure 20A:
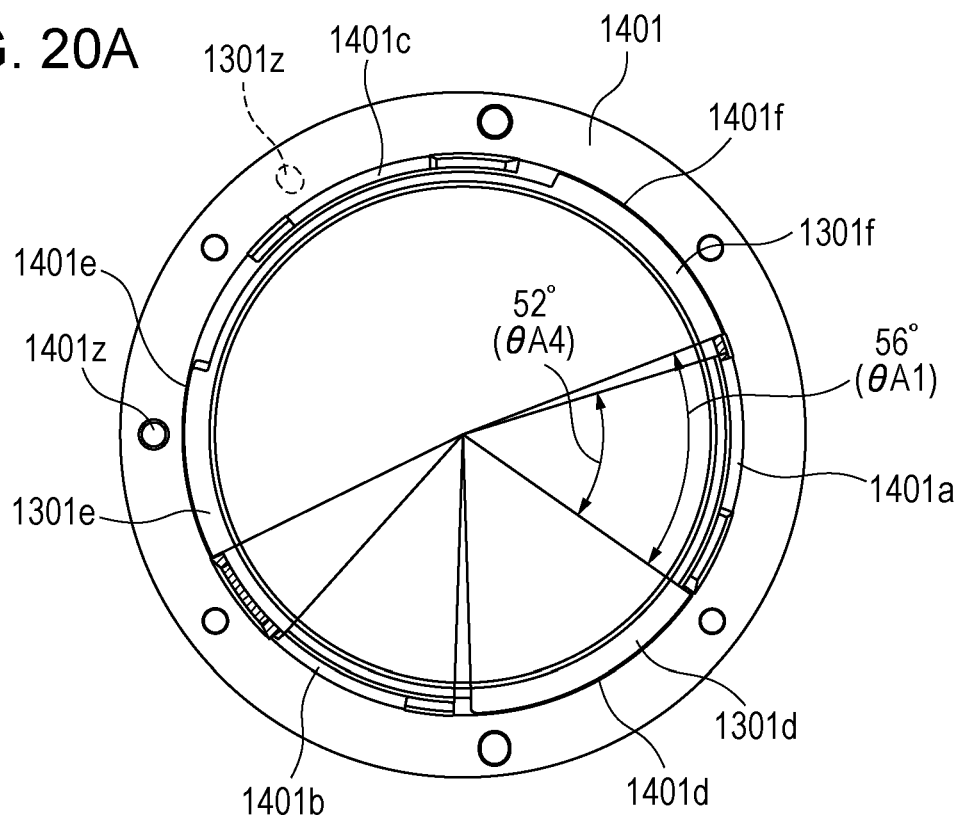
FIGS. 20A and 20B are diagrams exemplarily describing the way in which claw portions interfere with each other when attempting to mount the lens mount side to the camera mount side according to an embodiment of the present invention.
Figure 20B:
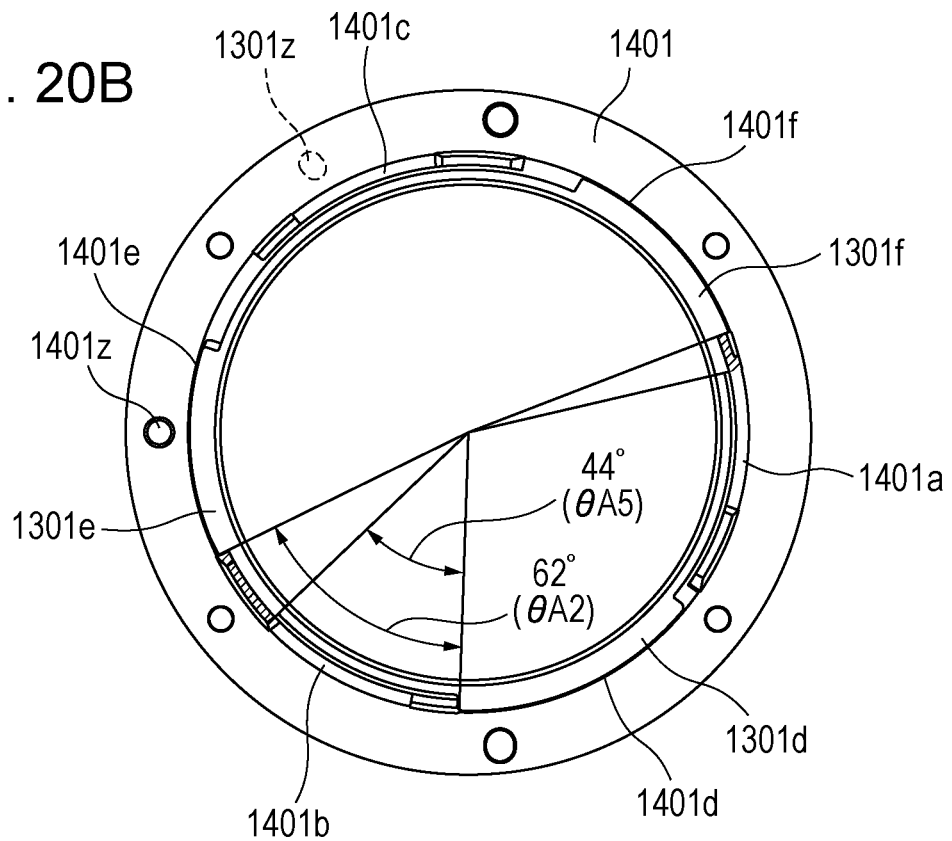

FIGS. 20A and 20B are diagrams exemplarily describing the way in which claw portions interfere with each other when attempting to mount the lens mount 1301 side to the camera mount 1401 side according to the embodiment of the present invention. FIG. 20A illustrates the way in which the third lens claw portion 1301f and the first camera claw portion 1401a interfere, and FIG. 16B illustrates the way in which the second lens claw portion 1301e and the second camera claw portion 1401b interfere.

As described above, incompatible interchangeable lens assemblies and imaging apparatuses, and the mount portions of conversion adapters are configured so that two claw portions of each other out of the claw portions that an incompatible interchangeable lens assembly and imaging apparatus have interfere with each other in the present embodiment. According to this configuration, the risk of an incompatible interchangeable lens assembly being erroneously mounted to an imaging apparatus, or an incompatible interchangeable lens assembly and imaging apparatus being erroneously mounted to mount units provided to both ends of a conversion adapter, can be reduced.

However, even in a case where the above conditions are satisfied, there may be cases where, when attempting to insert three claw portions into incompatible cutaways, for example, two claw portions are inserted into cutaways depending on the angles of the claw portions and cutaways. Accordingly, the present embodiment further takes a configuration where the angles of at least two adjacent lens cutaways are smaller than the angles of all camera claw portions. Specifically, in the present embodiment, the angles θA4 and θA5 of the first lens cutaway 1301*a* and second lens cutaway 1301*b* in the circumferential direction are smaller than the angles θA1 through θA3 of the first through third camera claw portions 1401*a* through 1401*c* in the circumferential direction. That is to say, the relation between the claw portions and cutaways at the lens mount 1301 side and the camera mount 1401 side according to the present embodiment satisfy θA4<θA1, θA4<θA2, θA4<θA3, θA5<θA1, θA5<θA2, and θA5<θA3.

Figure 21A:
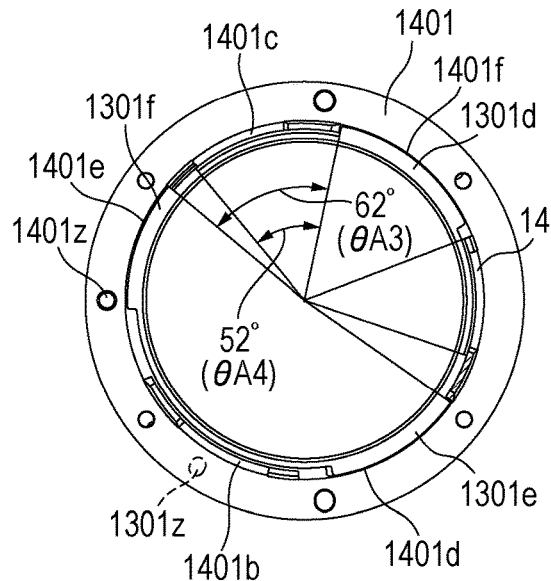
FIGS. 21A through 21D is a diagram exemplarily describing a case of attempting to insert incompatible claw portions into recesses at the lens mount side and camera mount side according to an embodiment of the present invention.
Figure 21C:
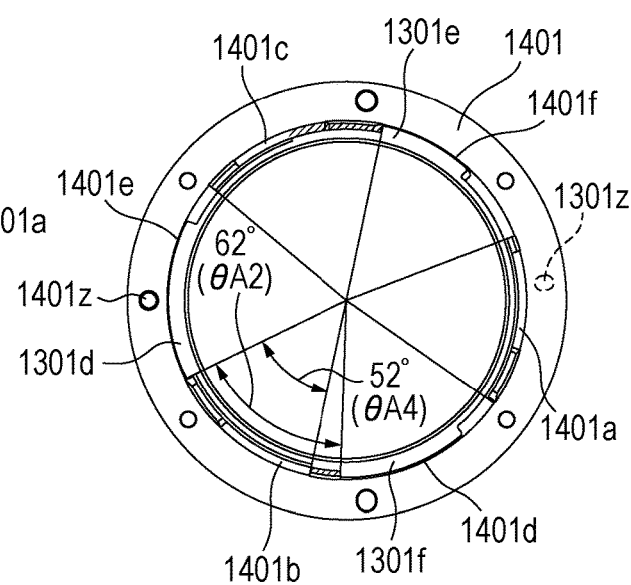
Figure 21B:
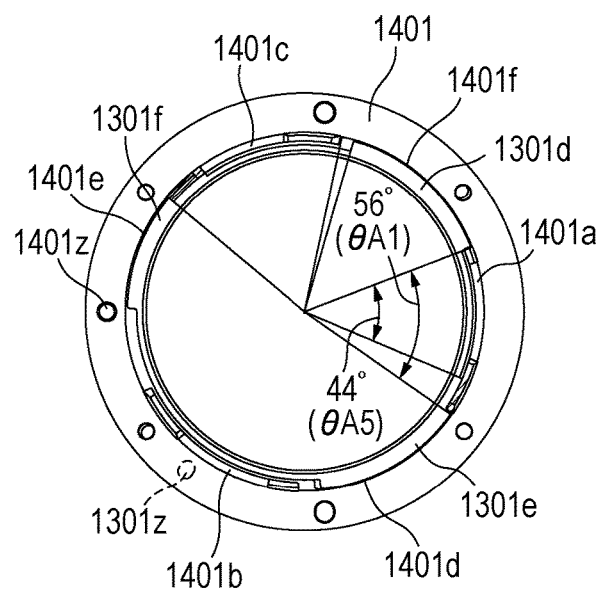
Figure 21D:
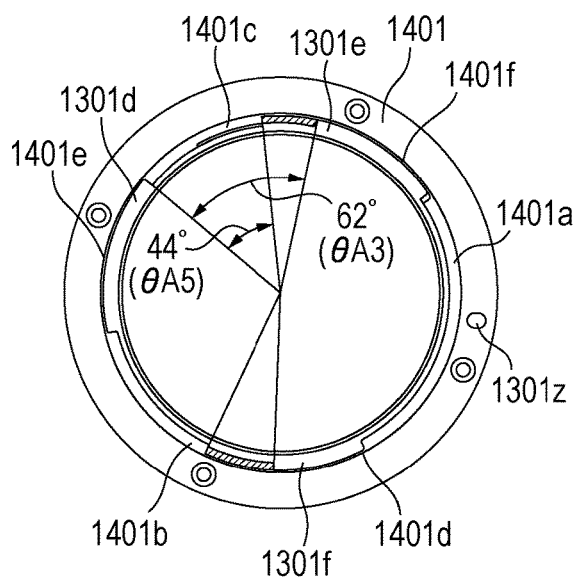

FIGS. 21A through 21D is a diagram exemplarily describing a case of attempting to insert incompatible claw portions into cutaways at the lens mount 1301 side and camera mount 1401 side according to the embodiment of the present invention. FIG. 21A illustrates the way in which the third lens claw portion 1301*f* and third camera claw portion 1401*c* interfere in a case of attempting to insert the first lens claw portion 1301*d* into the third camera cutaway 1401*f*. FIG. 21B illustrates the way in which second lens claw portion 1301*e* and first camera claw portion 1401*a* interfere in a case of attempting to insert the first lens claw portion 1301*d* into the third camera cutaway 1401*f*. FIG. 21C illustrates the way in which the third lens claw portion 1301*f* and second camera claw portion 1401*b* interfere in a case of attempting to insert the first lens claw portion 1301*d* into the second camera cutaway 1401*e*. FIG. 21D illustrates the way in which the second lens claw portion 1301*e* and third camera claw portion 1401*c* interfere in a case of attempting to insert the first lens claw portion 1301*d* into the second camera cutaway 1401*e*.

As illustrated in FIGS. 21A through 21D, the lens claw portions and camera claw portions interfere in at least two places in the present embodiment, regardless of the relative rotational angle of the lens mount 1301 and camera mount 1401. According to this configuration, erroneous mounting of an interchangeable lens assembly and conversion adapter having the lens mount 301 (1301) to an imaging apparatus and conversion adapter having the camera mount 401 (1401) can be prevented even more effectively.

Next, the angles (phases) at which bayonet claw portions are disposed on the circumferential direction of the camera mount and lens mount of the second conversion adapter 70 will be described with reference to FIGS. 22A through 26.

The second conversion adapter 70 is a mount adapter used for mounting the first lens 100 that has a short flange focal distance to the camera body 60 that has a long flange focal distance. The lens mount 1501 is provided at one end (third end) side of the second conversion adapter 70, and the camera mount 1201 is provided at the other end (fourth end). Note that the camera mount 1201 of the second conversion adapter 70 has the same configuration as the camera mount 201 of the camera body 10 that is the first imaging apparatus described above. Also, the lens mount 1501 of the second conversion adapter 70 has the same configuration as the lens mount 501 of the second lens 50 described above.

Accordingly, it is preferable for the second conversion adapter 70 to be configured such that the camera body 10 that has a short flange focal distance cannot be directly mounted to the lens mount 1501, and the second lens 50 that has a long flange focal distance cannot be directly mounted to the camera mount 201. This configuration can be realized by satisfying the positional relation of claw portions and cutaways so that the lens mount 1501 provided to one end (third end) of the second conversion adapter 70 and the camera mount 1201 provided to the other end (fourth end) cannot each be directly mounted.

Figure 22A:
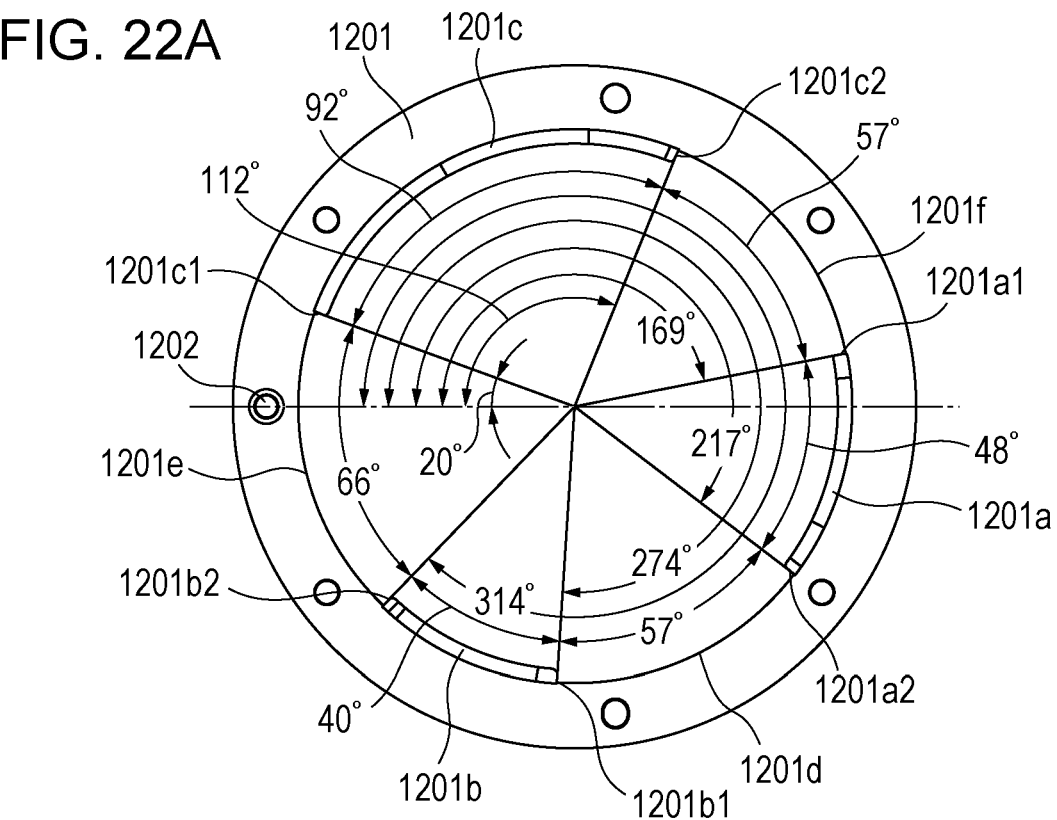
FIGS. 22A and 22B are diagrams exemplarily describing angle so disposing bayonet claw portions in the camera mount provided on one end of the second conversion adapter.
Figure 22B:
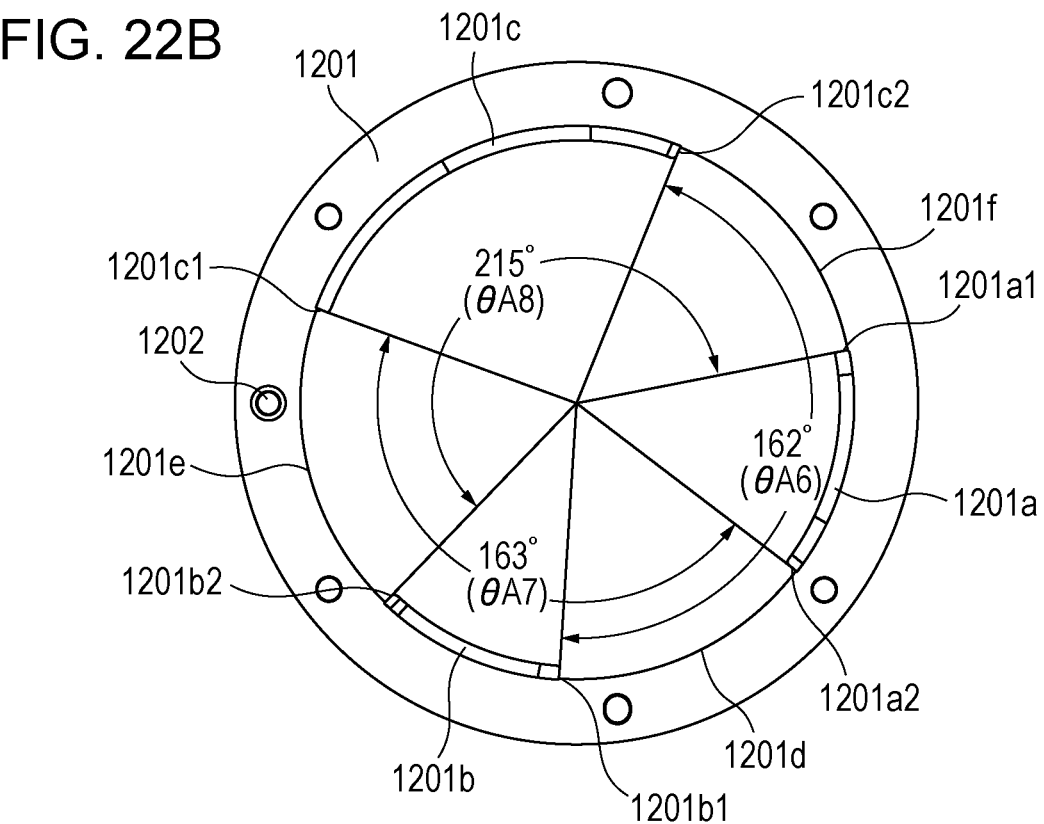

FIGS. 22A and 22B are diagrams exemplarily describing angles of disposing bayonet claw portions in the camera mount 1201 provided on one end of the second conversion adapter 70. FIG. 22A is a diagram illustrating angle ranges that camera claw portions and camera cutaways occupy in the circumferential direction of the camera mount 1201 with the lock pin 202 as a reference, as viewed from the rear face side. FIG. 22B is a diagram illustrating angle ranges that, regarding multiple camera claw portions 1201*a* through 1201*c*, the claw portions occupy in the circumferential direction of the camera mount 1201, as viewed from the rear face side. Note that the angles of disposing the claw portions and cutaways on the camera mount 1201 of the second conversion adapter 70 are the same as the camera mount 201 of the camera body 10 described earlier, so description will be omitted.

As illustrated in FIG. 22B, the angle from the sixth end 1201*c*2 of the third camera claw portion 1201*c* to the third end 1201*b*1 of the second camera claw portion 1201*b*, in the circumferential direction of the camera mount 1201 including the first camera claw portion 1201*a*, is θA6 (1620). The angle from the second end 1201*a*2 of the first camera claw portion 1201*a* to the fifth end 1201*c*1 of the third camera claw portion 1201*c*, in the circumferential direction of the camera mount 1201 including the second camera claw portion 1201*b*, is θA7 (1630). The angle from the fourth end 1201*b*2 of the second camera claw portion 1201*b* to the first end 1201*a*1 of the first camera claw portion 1201*a*, in the circumferential direction of the camera mount 1201 including the third camera claw portion 1201*c*, is θA8 (2150).

Figure 23A:
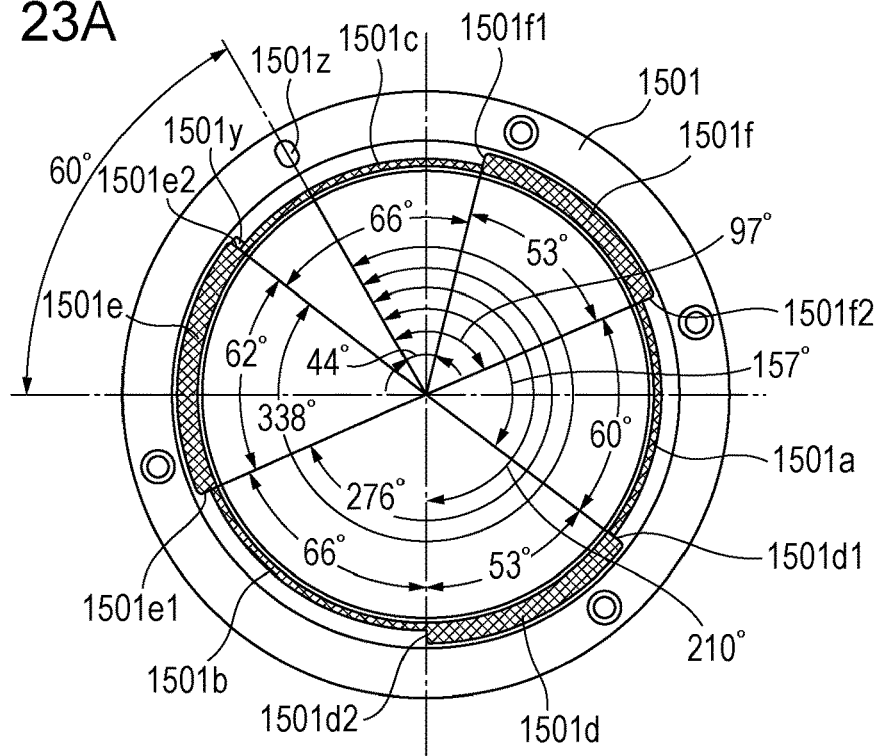
FIGS. 23A through 23C are diagrams exemplarily describing angle so disposing bayonet claw portions in a lens mount provided on the other end of the second conversion adapter.
Figure 23B:
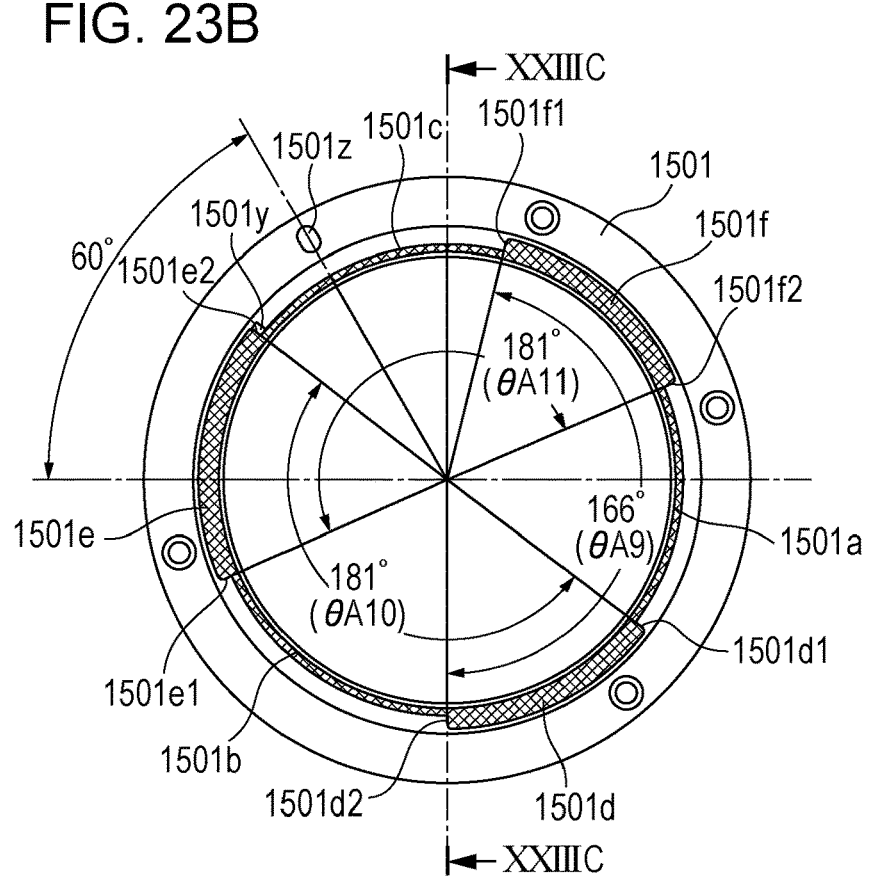
Figure 23C:
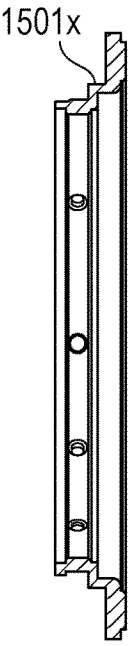

Next, FIGS. 23A through 23C are diagrams exemplarily describing angle so disposing bayonet claw portions in a lens mount 1501 provided on the other end of the second conversion adapter 70. FIG. 23A is a diagram illustrating angle ranges that lens claw portions and lens cutaways occupy in the circumferential direction of the lens mount 1501 with the lock pin 1501*z* as a reference, as viewed from the rear face side. FIG. 23B is a diagram illustrating angle ranges where cutaways are provided regarding the multiple lens cutaways 1501*a* through 1501*c* in the circumferential direction of the lens mount 1501, as viewed from the rear face side. FIG. 23C is a cross-sectional diagram taken along cross-section XXIIIC-XXIIIC in FIG. 23B.

A first lens claw portion 1501*d*, second lens claw portion 1501*e*, and third lens claw portion 1501*f*, are provided in order, to the camera mount 1501 in the circumferential direction (inner radial direction). Note that in a case of viewing the lens mount 1501 from the rear face side as illustrated in FIG. 23A, the lens claw portion that is provided at a position farthest from the lock groove 1501*z* is the first lens claw portion 1501*d*. The second lens claw portion 1501*e* and third lens claw portion 1501*f* are then consecutively provided in order from the first lens claw portion 1501*d* in a clockwise direction.

Also, cutaways which are a first lens cutaway 1501*a*, second lens cutaway 1501*b*, and third lens cutaway 1501*c* are provided in order, to the lens mount 1501 in the circumferential direction (inner radial direction). Note that in a case of viewing the lens mount 1501 from the rear face side as illustrated in FIG. 23A, the cutaway that is provided at a position nearest to the lock groove 1501*z* is the third lens cutaway 1501*c*. The first lens cutaway 1501*a* and second lens cutaway 1501*b* are then consecutively provided in order from the third lens cutaway 1501*c* in a clockwise direction.

Note that the end portions of the lens claw portions 1501*d*, 1501*e*, and 1501*f*, in the circumferential direction, will be referred to as first end portion 1501*d*1, second end portion 1501*d*2, third end portion 1501*e*1, fourth end portion 1501*e*2, fifth end portion 1501*f*1, and sixth end portion 1501*f*2, for the sake of description. The end portions are denoted with part numerals in order from the first lens claw portion 1501*d* in the clockwise direction, when viewing the lens mount 1501 from the rear face side, as described above.

As illustrated in FIG. 23A, the angles that the lens claw portions and lens cutaways occupy in the circumferential direction of the lens mount 1501 (angle ranges) are stipulated as follows. The angle of the first lens claw portion 1501*d* is 53°, the angle of the second lens claw portion 1501*e* is 62°, and the angle of the third lens claw portion 1501*f* is 53°. That is to say, the angles of the lens claw portions on the lens mount 1501 side are the same as the angles of the lens claw portions on the lens mount 1301 side described earlier.

On the other hand, the angles of the lens cutaways at the lens mount 1501 side differ from the angles of the lens cutaways at the lens mount 1301 side described above. Specifically, the angle of the first lens cutaway 1501*a* is 60°, the angle of the second lens cutaway 1501*b* is 66°, and the angle of the third lens cutaway 1501*c* is 66°.

Also, when viewing the lens claw portions from the rear face side of the camera body 10, the angles in the clockwise direction where the lens claw portions are disposed on the circumferential direction of the lens mount 1501 with the position of the lock groove 1501*z* (referred to as reference position) as a reference are stipulated as follows. The first lens claw portion 1501*d* is disposed between 157° to 210° with the reference position as a start point. The second lens claw portion 1501*e* is disposed between 276° to 338° with the reference position as a start point. The third lens claw portion 1501*f* is disposed between 44° to 97° with the reference position as a start point.

As illustrated in FIG. 23C, a fitting member 1501*x* that restricts movement of the imaging apparatus in a direction parallel to the optical axis when mounted to the imaging apparatus is provided to the lens mount 1501 side. In the present embodiment, the diameter of the fitting member 1501*x* in a direction orthogonal to the optical axis at the camera mount 1501 side is the mount diameter. The mount diameters of the camera mounts and lens mounts described above are generally the same length.

As illustrated in FIG. 23B, the angle from the fifth end 1501*f*1 of the third lens claw portion 1501*f* to the second end 1501*d*2 of the second lens claw portion 1501*d*, in the circumferential direction of the lens mount 1501 including the first lens cutaway 1501*a*, is θA9 (1660). The angle from the first end 1501*d*1 of the first lens claw portion 1501*d* to the fourth end 1501*e*2 of the second lens claw portion 1501*e*, in the circumferential direction of the lens mount 1501 including the second lens cutaway 1501*b*, is θA10 (1810).

The angle from the third end 1501*e*1 of the second lens claw portion 1501*e* to the sixth end 1501*f*2 of the third lens claw portion 1501*f*, in the circumferential direction of the lens mount 1501 including the third lens cutaway 1501*c*, is θA11 (1810).

The angles of the claw portions and cutaways in the circumferential direction will be compared between the camera mount 1201 and lens mount 1501 provided to the second conversion adapter 70. For example, the angle (920) of the third camera claw portion at the camera mount 1201 side is larger than the angles (660) of the second and third lens cutaways 1501*b* and 1501*c* that are the largest angle of the lens cutaways at the lens mount 1501 side. That is to say, the angle of at least one camera claw portion at the camera mount 1201 side is larger than the angle of the lens cutaway having the largest angle at the lens mount 1501 side.

In this case, of the claw portions at the camera mount 1201 side and cutaways at the lens mount 1501 side, at least one or more camera claw portion and lens cutaway interfere with each other. Accordingly, even if an attempt is made to mount the interchangeable lens assembly to the camera body so that the optical axis at the camera mount 1201 side and lens mount 1501 side are generally parallel to each other, the claw portions and cutaways interfere, so the interchangeable lens assembly cannot be mounted to the camera body.

However, if only one claw portion and cutaway are interfering, there may be cases where claw portions of the camera mount side can be inserted into cutaways of the lens mount side, in the same way as the description of the first conversion adapter made above. For example, there are cases where, in a state where the optical axis of the lens mount side is obliquely inclined as to the optical axis of the camera mount side, one end of a camera claw portion is inserted into a lens cutaway, and the lens mount and camera mount are rotated relative to each other, and the interchangeable lens assembly can be mounted to the camera body.

Figure 24A:
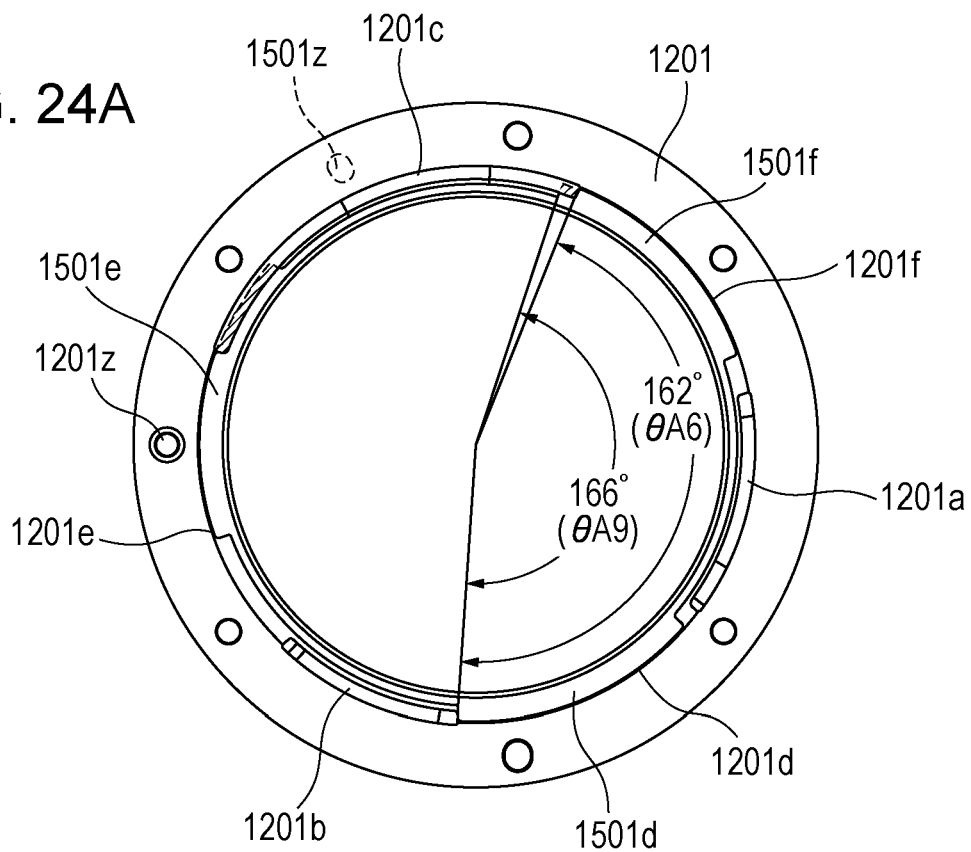
FIGS. 24A and 24B are diagrams exemplarily describing the way in which claw portions interfere with each other, when attempting to mount a reference claw at the lens mount side to a reference recess at the camera mount side according to an embodiment of the present invention.
Figure 24B:
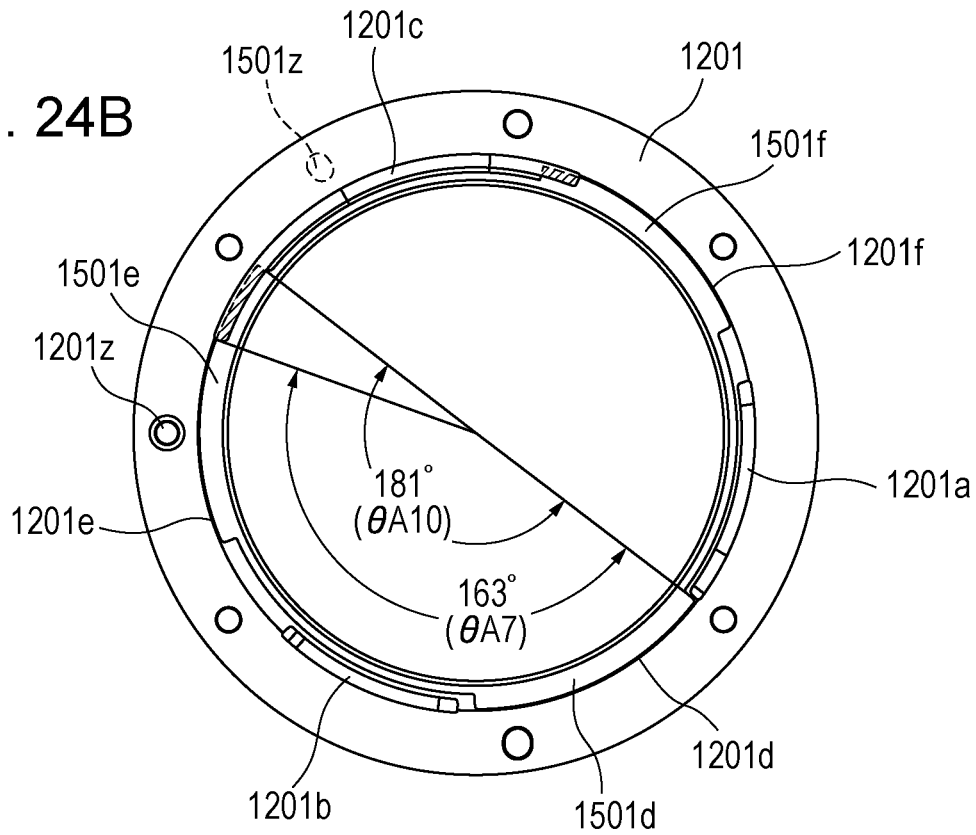

Accordingly, in the present embodiment, the claw portions and cutaways at the camera mount 1201 side and the lens mount 1501 side are disposed so as to satisfy θA6<θA9 and θA7<θA10 in the circumferential direction. FIGS. 24A and 24B are diagrams exemplarily describing the way in which claw portions interfere with each other, when attempting to mount a reference claw portion at the lens mount 1501 side to a reference cutaway at the camera mount 1201 side according to the embodiment of the present invention. FIG. 20A illustrates the way in which the third lens claw portion 1501*f* and the third camera claw portion 1201*c* interfere, and FIG. 20B illustrates the way in which the second lens claw portion 1501*e* and the third camera claw portion 1201*c* interfere.

As illustrated in FIGS. 24A and 24B, in a case where the reference first lens claw portion 1501*d* is attempted to be inserted into the reference camera cutaway 1201*d*, for example, the third camera claw portion 1201*c* interferes with the second and third lens claw portions 1501*e* and 1501*f*.

That is to say, as viewed from the rear face side, the total sum of the angles of one reference lens claw portion, another lens claw portion adjacent thereto in the clockwise direction, and a lens cutaway situated between these lens claw portions, is taken as a first angle. Also, as viewed from the rear face side, the total sum of the angles of one reference camera cutaway, another camera cutaway adjacent thereto in the clockwise direction, and a camera claw portion situated therebetween, is taken as a second angle. Also, as viewed from the rear face side, the total sum of the angles of one reference lens claw portion, another lens claw portion adjacent thereto in the counterclockwise direction, and a lens cutaway situated between these lens claw portions, is taken as a first angle. Also, as viewed from the rear face side, the total sum of the angles of one reference camera cutaway, another camera cutaway adjacent thereto in the counter-clockwise direction, and a camera claw portion situated therebetween, is taken as a fourth angle. According to the present embodiment, it is sufficient to layout the claw portions and cutaways at the camera mount 1201 side and lens mount 1501 side such that the first angle described above is larger than the second angle, and the third angle is larger than the fourth angle.

According to this configuration, at least two lens claw portions and one camera claw portion interfere with each other. Thus, the risk of an incompatible interchangeable lens assembly being erroneously mounted to an imaging apparatus, or an incompatible interchangeable lens assembly and imaging apparatus being erroneously mounted to mount units provided to both ends of a conversion adapter, can be reduced.

However, even in a case where the above conditions are satisfied, there may be cases where, when attempting to insert three claw portions into incompatible cutaways, for example, two claw portions are inserted into cutaways depending on the angles of the claw portions and cutaways. Accordingly, the claw portions and cutaways at the camera mount 1201 side and lens mount 1501 side are disposed in the circumferential direction so as to satisfy θA6<θA9, θA6<θA10, θA6<θA11, θA7<θA9, θA7<θA10, and θA7<θA11. That is to say, as viewed from the rear face side, the total sum of the angles of two claw portions other than the reference claw portion described above, and a lens cutaway situated therebetween, is taken as a fifth angle. According to the present embodiment, it is sufficient to layout the claw portions and cutaways at the camera mount 1201 side and lens mount 1501 side such that the second angle and fourth angle described above are smaller than any of the first angle, third angle, and fifth angle.

Figure 25A:
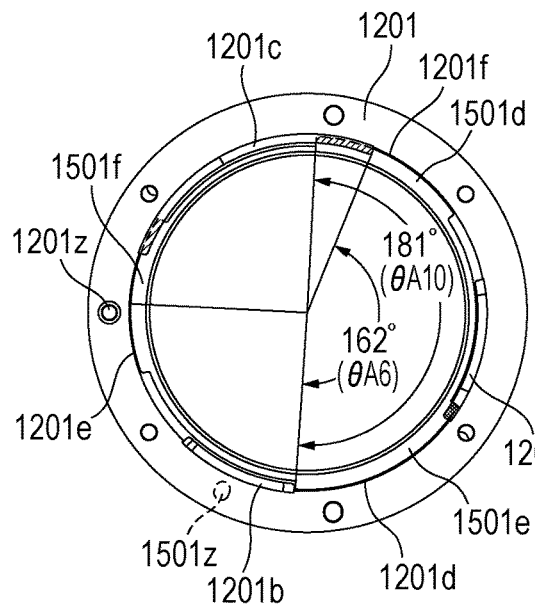
FIGS. 25A through 25D are diagrams exemplarily describing the way in which claw portions interfere with each other, when attempting to mount a claw other than the reference claw at the lens mount side to a reference recess at the camera mount side according to an embodiment of the present invention.
Figure 25C:
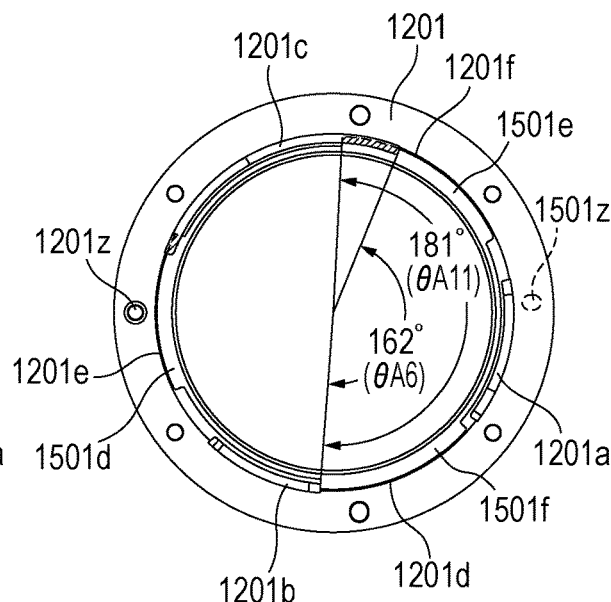
Figure 25B:
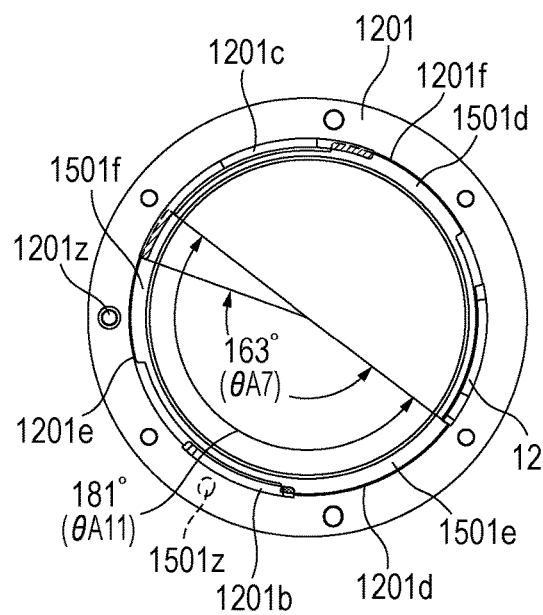
Figure 25D:
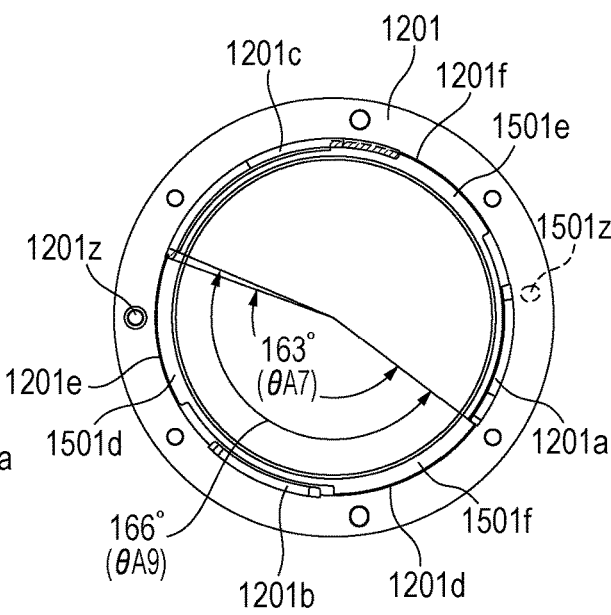

FIGS. 25A through 25D are diagrams exemplarily describing the way in which claw portions interfere with each other, when attempting to mount a claw portion other than the reference claw portion at the lens mount 1501 side to a reference cutaway at the camera mount 1201 side according to the embodiment of the present invention. FIG. 25A illustrates the way in which the first lens claw portion 1501d and the third camera claw portion 1201c interfere in a case of attempting to insert the second lens claw portion 1501e into the first camera cutaway 1201d. FIG. 25B illustrates the way in which the third lens claw portion 1501c and the third camera claw portion 1201c interfere in a case of attempting to insert the second lens claw portion 1501e into the first camera cutaway 1201d. FIG. 25C illustrates the way in which the second lens claw portion 1501e and the third camera claw portion 1201c interfere in a case of attempting to insert the third lens claw portion 1501f into the first camera cutaway 1201d. FIG. 25D illustrates the way in which the first lens claw portion 1501d and the third camera claw portion 1201c interfere in a case of attempting to insert the third lens claw portion 1501f into the first camera cutaway 1201d.

As illustrated in FIGS. 25A through 25D, at least two lens claw portions and one camera claw portion interfere, regardless of the relative rotation angle of the lens mount 1501 and camera mount 1201 according to the present embodiment. According to this configuration, erroneous mounting of an interchangeable lens assembly and conversion adapter having the lens mount 501 (1501) to an imaging apparatus and conversion adapter having the camera mount 201 (1201) can be prevented even more effectively.

Figure 26:
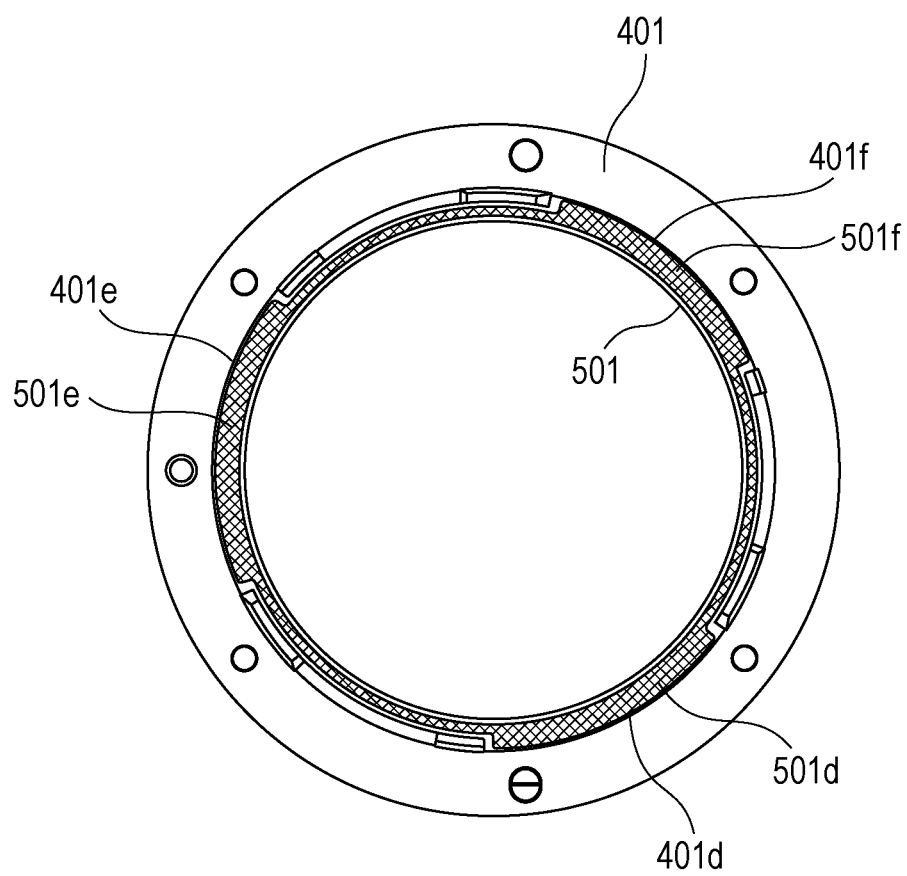
FIG. 26 is a diagram exemplarily describing a state in which claw portions provided to the camera mount side and lens mount side according to an embodiment of the present invention are engaged.

FIG. 26 is a diagram exemplarily describing a state in which claw portions provided to the camera mount 1401 side and lens mount 1501 side according to the embodiment of the present invention are engaged. Note that FIG. 26 illustrates a state in which the camera mount 401 of the camera body 60 is engaging with the lens mount 501 of the second lens 50. The first lens claw portion 1501d can be inserted into the first camera cutaway 1401d, as illustrated in FIG. 22. Also, the second lens claw portion 1501e can be inserted into the second camera cutaway 1401e. Further, the third lens claw portion 1501f can be inserted into the third camera cutaway 1401f. That is to say, the camera mount 1401 side and the lens mount 1501 side are a combination compatible with being directly mounted to each other. Note that the camera mount 201 side and the lens mount 301 side are a combination compatible to being directly mounted to each other, as illustrated in FIG. 10A.

As described above, the camera mount 401 (1401) corresponding to an imaging apparatus that has a long flange focal distance (e.g., the camera body 60), and the lens mount 501 (1501) corresponding to an interchangeable lens assembly that has a long flange focal distance (e.g., the second lens 50) can be directly mounted to each other. However, the camera mount 201 (1201) corresponding to an imaging apparatus having a short flange focal distance (e.g., the camera body 10) and the lens mount 501 (1501) corresponding to an interchangeable lens assembly that has a long flange focal distance (e.g., the second lens 50) cannot be directly mounted to each other. Also, the camera mount 201 (1201) corresponding to an imaging apparatus that has a short flange focal distance (e.g., the camera body 10) and the lens mount 301 (1301) corresponding to an interchangeable lens assembly that has a short flange focal distance (e.g., the first lens 100) can be directly mounted to each other. However, the camera mount 401 (1401) corresponding to an imaging apparatus that has a long flange focal distance (e.g., the camera body 60) and the lens mount 301 (1301) corresponding to an interchangeable lens assembly that has a short flange focal distance (e.g., the first lens 100) cannot be directly mounted to each other.

Accordingly, an imaging apparatus and camera accessory employing the configuration of the above-described embodiment can prevent erroneous mounting of an imaging apparatus and camera accessory that have generally the same mount diameter but are not mutually compatible.

While the present invention has been described with reference to exemplary embodiments, it is to be understood that the invention is not limited to the disclosed exemplary embodiments.

This application claims the benefit of Japanese Patent Application No. 2017-108262 filed May 31, 2017, which is hereby incorporated by reference herein in its entirety.

What is claimed is:

1. An accessory configured to be detachably mountable to an image pickup apparatus having a plurality of first terminals and a first mount portion that includes a plurality of first bayonet claw portions, the accessory comprising:
   a second mount portion including a plurality of second bayonet claw portions configured to enable engagement with the plurality of first bayonet claw portions; and
   a plurality of second terminals configured to contact with the plurality of first terminals when the accessory is mounted to the image pickup apparatus, wherein a determination terminal, among the plurality of second terminals, is configured to determine whether the accessory is mounted on the image pickup apparatus or not, wherein the plurality of second terminals are provided at positions that are different from positions of the plurality of second bayonet claw portions, and wherein, when viewed in a central axis direction of the second mount portion, a half line, that extends from a central axis of the second mount portion and passes through the determination terminal, passes through a predetermined bayonet claw portion among the plurality of second bayonet claw portions.

2. The accessory according to claim 1,
wherein, among the plurality of second terminals, a plurality of terminals are configured to be used in communication between the image pickup apparatus and the accessory, and
wherein, when viewed in the central axis direction, a plurality of half lines, that extends from the central axis and passes through the plurality of terminals, all pass through the predetermined bayonet claw portion.

3. The accessory according to claim 1, further comprising a terminal holding portion configured to hold the plurality of second terminals,
wherein either one of the terminal holding portion and the second mount portion includes a protrusion, and the other one of the terminal holding portion and the second mount portion includes a hole portion or a recess to which the protrusion engages.

4. The accessory according to claim 3,
wherein, when a reference terminal is the terminal configured to determine whether the accessory is mounted on the image pickup apparatus or not, a first adjacent terminal is a terminal adjacent to the reference terminal on one side with respect to the reference terminal, a second adjacent terminal is a terminal adjacent to the reference terminal on the other side with respect to the reference terminal, and a third adjacent terminal is a terminal adjacent to the second adjacent terminal, and
wherein, when viewed in the central axis direction, the protrusion and the hole portion or the recess are inside a region between a half line that extends from the central axis and passes through the first adjacent terminal, and a half line that extends from the central axis and passes through the third adjacent terminal.

5. The accessory according to claim 4, wherein, when viewed in the central axis direction, the protrusion and the hole portion or the recess are inside a region between a half line that extends from the central axis and passes through the reference terminal, and the half line that extends from the central axis and passes through the third adjacent terminal.

6. The accessory according to claim 3, wherein, when viewed in the central axis direction, a half line, that extends from the central axis and passes through the protrusion, passes through the predetermined bayonet claw portion.

7. The accessory according to claim 1, wherein the plurality of second terminals includes a distinguish terminal configured to distinguish a type of the accessory mounted on the image pickup apparatus.

8. The accessory according to claim 7, wherein, when viewed in the central axis direction, a half line, that extends from the central axis and passes through the distinguish terminal, passes through between the plurality of second bayonet claw portions.

9. The accessory according to claim 8, wherein the plurality of second terminals includes a terminal configured to connect the image pickup apparatus and a communication control system of the accessory to ground, and a terminal configured to supply power, used in operation of the communication control system, from the image pickup apparatus to the accessory.

10. The accessory according to claim 9, wherein the plurality of second terminals includes a terminal configured to connect the image pickup apparatus and a mechanical drive system of the accessory to the ground, and a terminal configured to supply power, used in operation of the mechanical drive system, from the image pickup apparatus to the accessory.

11. The accessory according to claim 10,
wherein the plurality of second terminals includes a first communication unit configured to perform a first communication, and
wherein the first communication unit includes a terminal configured to communicate a clock signal that is output from the image pickup apparatus to the accessory, a terminal configured to facilitate two-way communication between the image pickup apparatus and the accessory, and a terminal configured to communicate data that is output from the accessory to the image pickup apparatus.

12. The accessory according to claim 11,
wherein the plurality of second terminals includes a second communication unit configured to perform a second communication independent of the first communication, and
wherein the second communication unit includes a terminal configured to communicate data that is output from the accessory to the image pickup apparatus.

13. The accessory according to claim 12,
wherein the plurality of second terminals includes a third communication unit configured to perform a third communication independent of the first communication and the second communication, and
wherein the third communication unit includes a terminal configured to facilitate two-way communication between the image pickup apparatus and the accessory, and a terminal configured to communicate a communication request signal between the image pickup apparatus and the accessory.

14. The accessory according to claim 1, further comprising a lens.

15. The accessory according to claim 1, wherein the accessory is configured to be detachably mountable to a lens apparatus.

16. The accessory according to claim 15, further comprising a third mount portion including a plurality of third bayonet claw portions configured to enable engagement with the lens apparatus,
wherein a smallest angle of the plurality of third bayonet claw portions in a circumferential direction is larger than a smallest angle of a cutaway between the plurality of second bayonet claw portions in a circumferential direction.

17. The accessory according to claim 15,
wherein the second mount portion has a concave portion in which a pin provided to the image pickup apparatus is inserted when the accessory is mounted to the image pickup apparatus,
wherein a reference line passes through a center of the concave portion and the central axis of the second mount portion,
wherein a boundary line is a line that is orthogonal to the reference line and passes through the central axis of the second mount portion, wherein, when viewed in the central axis direction, a concave portion side is a side on which the concave portion is provided with respect to the boundary line, and wherein the plurality of second bayonet claw portions includes (i) first and second concave portion side bayonet claw portions each having at least a portion disposed on the concave portion side, and (ii) an opposite side bayonet claw portion in which both ends of the opposite side bayonet claw portion are provided on an opposite side of the concave portion side with respect to the boundary line.

18. The accessory according to claim 17, further comprising a third mount portion including a plurality of third bayonet claw portions configured to enable engagement with the lens apparatus, wherein an angle of a first cutaway adjacent to the opposite side bayonet claw portion in a circumferential direction is smaller than an angle of a third bayonet claw portion, of the plurality of third bayonet claw portions, that overlaps to the first cutaway when viewed in the central axis direction, and wherein an angle of a second cutaway adjacent to the opposite side bayonet claw portion in a circumferential direction is smaller than an angle of a third bayonet claw portion, of the plurality of third bayonet claw portions, that overlaps to the second cutaway when viewed in the central axis direction.

19. The accessory according to claim 17, further comprising a third mount portion including a plurality of third bayonet claw portions configured to enable engagement with the lens apparatus, wherein an angle of a first cutaway adjacent to the opposite side bayonet claw portion in a circumferential direction is smaller than an angle of each of the plurality of third bayonet claw portions in a circumferential direction, and wherein an angle of a second cutaway adjacent to the opposite side bayonet claw portion in a circumferential direction is smaller than an angle of each of the plurality of third bayonet claw portions in a circumferential direction.

20. The accessory according to claim 17, further comprising a third mount portion including a plurality of third bayonet claw portions configured to enable engagement with the lens apparatus, wherein, when viewed in the central axis direction, an angle, between most apart ends of the opposite side bayonet claw portion and the first concave portion side bayonet claw portion in a circumferential direction, is larger than an angle between most apart ends of a first cutaway of the third mount portion that overlaps to the opposite side bayonet claw portion and a second cutaway of the third mount portion that overlaps to the first concave portion side bayonet claw portion in a circumferential direction.

21. The accessory according to claim 17, further comprising a third mount portion including a plurality of third bayonet claw portions configured to enable engagement with the lens apparatus, wherein, when viewed in the central axis direction, an angle, between most apart ends of a first cutaway of the third mount portion that overlaps to the opposite side bayonet claw portion and a second cutaway of the third mount portion that overlaps to the first concave portion side bayonet claw portion in a circumferential direction, is smaller than an angle between most apart ends of the two second bayonet claw portions adjacent with each other among the plurality of second bayonet claw portions in a circumferential direction, and wherein, when viewed in the central axis direction, an angle, between most apart ends of the first cutaway and a third cutaway of the third mount portion that overlaps to the second concave portion side bayonet claw portion in a circumferential direction, is smaller than an angle between most apart ends of the two second bayonet claw portions.

22. An image pickup apparatus comprising:
plural first bayonet claw portions; and
a first mount portion including a plurality of first terminals,
wherein the image pickup apparatus is configured such that the accessory according to claim 1 is detachably mountable to the image pickup apparatus.

23. A camera system comprising:
the accessory according to claim 1; and
an image pickup apparatus having plural first bayonet claw portions and a first mount portion including a plurality of first terminals,
wherein the image pickup apparatus is configured such that the accessory is detachably mountable to the image pickup apparatus.

* * * * *